US009179149B2

(12) United States Patent
Kitahara et al.

(10) Patent No.: US 9,179,149 B2
(45) Date of Patent: *Nov. 3, 2015

(54) VIDEO ENCODING CONTROL METHOD, VIDEO ENCODING APPARATUS, AND VIDEO ENCODING PROGRAM

(75) Inventors: Masaki Kitahara, Yokosuka (JP); Atsushi Shimizu, Yokosuka (JP); Naoki Ono, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 348 days.

This patent is subject to a terminal disclaimer.

(21) Appl. No.: 13/695,865

(22) PCT Filed: May 2, 2011

(86) PCT No.: PCT/JP2011/060522
§ 371 (c)(1),
(2), (4) Date: Nov. 2, 2012

(87) PCT Pub. No.: WO2011/142291
PCT Pub. Date: Nov. 17, 2011

(65) Prior Publication Data
US 2013/0051458 A1 Feb. 28, 2013

(30) Foreign Application Priority Data

| May 12, 2010 | (JP) | 2010-109874 |
| May 12, 2010 | (JP) | 2010-109875 |
| May 12, 2010 | (JP) | 2010-109876 |
| May 12, 2010 | (JP) | 2010-109877 |
| May 12, 2010 | (JP) | 2010-109878 |

(51) Int. Cl.
*H04N 7/12* (2006.01)
*H04N 19/117* (2014.01)
(Continued)

(52) U.S. Cl.
CPC .......... *H04N 19/117* (2014.11); *H04N 19/124* (2014.11); *H04N 19/15* (2014.11);
(Continued)

(58) Field of Classification Search
CPC ... H04N 19/117; H04N 19/124; H04N 19/15; H04N 19/172; H04N 19/177; H04N 19/114; H04N 19/132; H04N 19/152; H04N 19/192; H04N 19/194; H04N 19/196; H04N 19/198; H04N 19/61; H04N 19/80; H04N 19/85; H04N 7/50; H04N 7/26244; H04N 7/26085; H04N 7/26164; H04N 7/26127
USPC .................................................... 375/240.04
See application file for complete search history.

(56) References Cited

U.S. PATENT DOCUMENTS
5,134,476 A 7/1992 Aravind et al.
(Continued)

FOREIGN PATENT DOCUMENTS
CN 1353547 A 6/2002
(Continued)

OTHER PUBLICATIONS
Notice of Allowance of Patent, Korean Patent Application No. 10-2012-7029220, Feb. 5, 2014.
(Continued)

*Primary Examiner* — Shan Elahi
(74) *Attorney, Agent, or Firm* — Harness, Dickey & Pierce, P.L.C.

(57) ABSTRACT

A video encoding control method encodes an input video signal by controlling a generated bit rate so a hypothetical buffer in a decoder does not overflow or underflow includes: sequentially encoding each picture in an encoding-order picture group in accordance with a predetermined encoding parameter, the encoding-order picture group including a predetermined number of pictures and being a collection of successive pictures in the order of encoding; calculating a quantization statistic of each picture based on quantization parameter information used to encode each picture each time each picture is encoded, and checking whether the quantization statistic exceeds a predetermined threshold value, and if the quantization statistic exceeds the predetermined threshold value, changing the encoding parameter so the generated bit rate resulting from encoding is reduced and performing re-encoding from a first picture of an encoding-order picture group that is being encoded using the changed encoding parameter.

19 Claims, 26 Drawing Sheets

(51) Int. Cl.
*H04N 19/172* (2014.01)
*H04N 19/196* (2014.01)
*H04N 19/15* (2014.01)
*H04N 19/124* (2014.01)
*H04N 19/177* (2014.01)
*H04N 19/192* (2014.01)

(52) U.S. Cl.
CPC .......... *H04N 19/172* (2014.11); *H04N 19/177* (2014.11); *H04N 19/192* (2014.11); *H04N 19/196* (2014.11); *H04N 19/198* (2014.11)

(56) References Cited

U.S. PATENT DOCUMENTS

| | | | |
|---|---|---|---|
| 5,589,884 A | | 12/1996 | Ohguchi |
| 5,606,369 A * | | 2/1997 | Keesman et al. ........ 375/240.01 |
| 5,786,858 A | | 7/1998 | Yagasaki et al. |
| 6,167,088 A * | | 12/2000 | Sethuraman .............. 375/240.1 |
| 6,208,691 B1 | | 3/2001 | Balakrishnan et al. |
| 6,300,973 B1 | | 10/2001 | Feder et al. |
| 6,301,428 B1 * | | 10/2001 | Linzer .......................... 386/278 |
| 6,310,915 B1 | | 10/2001 | Wells et al. |
| 6,493,402 B1 | | 12/2002 | Fimoff |
| 6,522,693 B1 | | 2/2003 | Lu et al. |
| 6,553,150 B1 * | | 4/2003 | Wee et al. ..................... 382/243 |
| 6,674,797 B1 * | | 1/2004 | Golin ........................ 375/240.01 |
| 6,944,221 B1 | | 9/2005 | Keesman |
| 7,099,389 B1 | | 8/2006 | Yu et al. |
| 7,346,106 B1 | | 3/2008 | Jiang et al. |
| 7,356,079 B2 | | 4/2008 | Laksono et al. |
| 7,613,345 B2 | | 11/2009 | Kajiwara et al. |
| 8,406,309 B2 * | | 3/2013 | Lee et al. ................. 375/240.26 |
| 8,548,048 B2 * | | 10/2013 | El-Maleh et al. ........ 375/240.05 |
| 2001/0003534 A1 | | 6/2001 | Saunders et al. |
| 2002/0039384 A1 | | 4/2002 | Kato |
| 2002/0094031 A1 | | 7/2002 | Ngai et al. |
| 2002/0159528 A1 | | 10/2002 | Graziani et al. |
| 2002/0186774 A1 | | 12/2002 | Pau et al. |
| 2003/0012290 A1 | | 1/2003 | Fimoff et al. |
| 2003/0039308 A1 | | 2/2003 | Wu et al. |
| 2003/0112864 A1 * | | 6/2003 | Karczewicz et al. .... 375/240.01 |
| 2004/0013195 A1 * | | 1/2004 | Panusopone et al. ...... 375/240.2 |
| 2004/0114817 A1 | | 6/2004 | Jayant et al. |
| 2005/0053302 A1 * | | 3/2005 | Srinivasan et al. ............ 382/248 |
| 2005/0074061 A1 * | | 4/2005 | Ribas-Corbera et al. ........................ 375/240.01 |
| 2005/0105883 A1 | | 5/2005 | Holcomb et al. |
| 2005/0152448 A1 | | 7/2005 | Crinon et al. |
| 2005/0175093 A1 | | 8/2005 | Haskell et al. |
| 2005/0193408 A1 | | 9/2005 | Sull et al. |
| 2005/0210145 A1 | | 9/2005 | Kim et al. |
| 2005/0220353 A1 * | | 10/2005 | Karczewicz et al. ......... 382/238 |
| 2005/0286631 A1 | | 12/2005 | Wu et al. |
| 2006/0126728 A1 * | | 6/2006 | Yu et al. ................... 375/240.03 |
| 2006/0188020 A1 * | | 8/2006 | Wang ....................... 375/240.16 |
| 2006/0256868 A1 | | 11/2006 | Westerman |
| 2007/0025441 A1 | | 2/2007 | Ugur et al. |
| 2007/0025446 A1 * | | 2/2007 | Matsumoto et al. ..... 375/240.21 |
| 2007/0064815 A1 | | 3/2007 | Alvarez et al. |
| 2007/0074266 A1 | | 3/2007 | Raveendran et al. |
| 2007/0081586 A1 | | 4/2007 | Raveendran et al. |
| 2007/0081587 A1 | | 4/2007 | Raveendran et al. |
| 2007/0081588 A1 | | 4/2007 | Raveendran et al. |
| 2007/0140345 A1 * | | 6/2007 | Osamoto et al. ......... 375/240.16 |
| 2007/0153914 A1 | | 7/2007 | Hannuksela et al. |
| 2008/0055119 A1 * | | 3/2008 | Sadowski et al. ............... 341/50 |
| 2008/0059823 A1 * | | 3/2008 | Balatsos et al. ................ 713/323 |
| 2008/0069203 A1 * | | 3/2008 | Karczewicz et al. .... 375/240.01 |
| 2008/0080619 A1 | | 4/2008 | Heng et al. |
| 2008/0101466 A1 | | 5/2008 | Swenson et al. |
| 2008/0120676 A1 * | | 5/2008 | Morad et al. .................. 725/127 |
| 2009/0161766 A1 | | 6/2009 | Bronstein et al. |
| 2009/0168866 A1 * | | 7/2009 | Takahashi et al. ........ 375/240.01 |
| 2009/0168900 A1 * | | 7/2009 | Shimoyama et al. .... 375/240.26 |
| 2010/0232720 A1 | | 9/2010 | Tsai et al. |
| 2010/0322318 A1 * | | 12/2010 | Sadowski et al. ........ 375/240.25 |
| 2011/0051806 A1 * | | 3/2011 | Lee ........................... 375/240.03 |
| 2011/0199504 A1 * | | 8/2011 | Oka ............................. 348/222.1 |
| 2011/0292995 A1 | | 12/2011 | Kubota |

FOREIGN PATENT DOCUMENTS

| | | | |
|---|---|---|---|
| CN | 1617591 | A | 5/2005 |
| CN | 1668107 | A | 9/2005 |
| CN | 1926863 | A | 3/2007 |
| CN | 1937777 | A | 3/2007 |
| CN | 101087408 | A | 12/2007 |
| CN | 101233757 | A | 7/2008 |
| CN | 101253777 | A | 8/2008 |
| EP | 1030523 | B1 | 4/2010 |
| JP | 10-304311 | A | 11/1998 |
| JP | 2003-018603 | A | 1/2003 |
| JP | 2006-295535 | A | 10/2006 |
| JP | 2008-109259 | A | 5/2008 |
| JP | 2008-258858 | A | 10/2008 |
| JP | 2009-260595 | A | 11/2009 |
| KR | 10-1995-0030491 | A | 11/1995 |
| KR | 10-1996-0009752 | A | 3/1996 |
| KR | 10-1997-0019622 | A | 4/1997 |
| KR | 10-2001-0030362 | A | 4/2001 |
| KR | 10-2008-0061744 | A | 7/2008 |
| RU | 2310290 | C2 | 11/2007 |
| RU | 2385541 | C2 | 3/2010 |
| WO | 91/14295 | A1 | 9/1991 |

OTHER PUBLICATIONS

Kadono, Kikuchi, and Suzuki, "H.264/AVC Textbook, Third revised Version" issued by Impress R & D, 2009, pp. 189-191, with partial translation.

Okutomi, Ozawa, Shimizu, and Hori, "Digital Image Processing," Corporation Picture Information Education Advancement Association, 2004, pp. 108-110, with partial translation.

International Search Report for Pct/JP2011/060522, ISA/JP, mailed Jun. 21, 2011.

Decision on Grant, Russian Patent Application No. 2012147239, Apr. 28, 2014.

Office Action, Taiwanese Patent Application No. 100115900, Oct. 13, 2014.

First Office Action, Chinese Patent Application No. 201180022987. 1, Nov. 26, 2014.

Westerink, P. H., et al., "Two-pass MPEG-2 variable-bit-rate encoding," IBM Journal of Research and Development, vol. 43, No. 4, Jul. 1999, pp. 471-488.

Ma, Siwei, et al., "Rate Control for JVT Video Coding Scheme with HRD Considerations," Proceedings of 2003 International Conference on Image Processing, Sep. 14-17, 2003, pp. III-793-796.

International Search Report, Application No. PCT/JP2011/060364, Jun. 21, 2011.

Notice of Allowance of Patent, Korean Patent Application No. 10-2012-7028798, Jan. 28, 2014. .

Search Report, European Patent Application No. 11777442.2, Mar. 6, 2014.

Decision on Grant, Russian Patent Application No. 2012146537, May 26, 2014.

Office Action, U.S. Appl. No. 13/695,700, Jan. 5, 2015.

Office Action, Chinese Patent Application No. 201180022113.6, Feb. 2, 2015.

Notice of Allowance, Taiwanese Patent Application No. 100115438, Feb. 26, 2015.

Notice of Allowance, U.S. Appl. No. 13/695,700, Jul. 7, 2015.

Office Action, Canadian Patent Application No. 2,798,012, Aug. 7, 2015.

* cited by examiner

DISPLAY ORDER

VIDEO ENCODING CONTROL METHOD, VIDEO ENCODING APPARATUS, AND VIDEO ENCODING PROGRAM

TECHNICAL FIELD

The present invention relates to video encoding technology for encoding a video signal so that a hypothetical buffer such as a coded picture buffer (CPB) in a hypothetical decoder does not fail and deterioration in image quality does not increase.

Priority is claimed on Japanese Patent Application Nos. 2010-109874, 2010-109875, 2010-109876, 2010-109877, and 2010-109878, filed May 12, 2010, the contents of which are incorporated herein by reference.

BACKGROUND ART

In encoding of a video signal, it is necessary to perform the encoding so that a decoder does not fail. In an H.264 encoding scheme, a hypothetical decoder, a hypothetical reference decoder (HRD), obtained by modeling a decoder is defined. An H.264 encoder need perform encoding so that the hypothetical decoder does not fail. The present invention is technology for reducing deterioration in image quality while suppressing the failure of a CPB of a hypothetical decoder, specifically, underflow of the CPB.

In FIG. 1, a conceptual diagram of the underflow of the CPB is illustrated. In the case of a constant bit rate, an encoded stream is input to the CPB at that bit rate (reference symbol RS1 in FIG. 1). The data amount of encoded streams in the CPB in each time is referred to as a "residual bit rate". The hypothetical decoder extracts the encoded stream corresponding to each picture from the CPB. In this case, the CPB residual bit rate is instantly reduced by the bit rate corresponding to each picture. FIG. 1 illustrates an exemplary case of the constant bit rate, but the same applies to a case of a variable bit rate.

The CPB underflow refers to a situation in which an encoded stream of a picture is insufficient in the CPB when the hypothetical decoder attempts to extract the encoded stream of the picture from the CPB, as illustrated in FIG. 1. In H.264-based encoding, the state of the CPB need be verified while encoding is being performed to produce a stream that does not cause the CPB underflow. As described above, the CPB of the hypothetical decoder is standardized in H.264 and further details are described, for example, in Non-Patent Document 1 described later.

It is to be noted that the same concept as the CPB is also defined in other encoding standards. For example, in Moving Picture Experts Group (MPEG)-2, there is a video buffering verifier (VBV), and a buffer model of such a decoder is herein referred to as "a hypothetical buffer". In the following description, a "CPB" can be read as the words "hypothetical buffer" for interpretation in a broad sense.

Methods for encoding a video signal include 1-pass encoding technology and multi-pass encoding technology. In the 1-pass encoding, generally, pictures of an input video are sequentially encoded. In contrast, in the multi-pass encoding, an input video is encoded a plurality of times. In 2-pass encoding, second encoding is performed using a result of first encoding. In the following description, the conventional art of the 1-pass encoding is referred to as "conventional art a" and the conventional art of the 2-pass encoding is referred to as "conventional art b".

<Conventional Art a>

In the 1-pass encoding, since input pictures are sequentially encoded, the nature of a future picture after an encoding target picture is not known. Therefore, the degree of complexity of the future picture is estimated, for example, from the generated bit rate of a picture encoded in the past to suppress CPB underflow. For example, in the technology of Patent Document 1, prior to encoding of each picture, the degree of complexity of a video obtained from a result of encoding in the past is determined as an estimated value of the degree of complexity of the remaining videos of a group of pictures (GOP). Under the premise of the estimated value of the degree of complexity, a quantization parameter generating the maximum bit rate that is available to encoding of the remaining videos of the GOP is estimated from the residual bit rate of the CPB, and it is used as a lower limit value of a quantization parameter in encoding of the encoding target picture, thereby suppressing CPB underflow. For this reason, in the case of a transition from a simple scene to a complex scene, in encoding of the simple scene, a bit rate is generated assuming that the bit rate is the same even in the future, and in encoding of the complex scene, the CPB does not have a residual bit rate that is required to maintain the image quality and a large quantization parameter is used. As a result, there is a problem in that the image quality is greatly deteriorated.

<Conventional Art b>

In 2-pass encoding, all pictures of an input video are encoded, and the bit rate of each picture generated at this time is used for second encoding. In this method, since the complexity of each portion of the video is known at the time of the second encoding, unlike the case of the 1-pass encoding, the CPB underflow is expected to be suppressed with deterioration in image quality being suppressed. For example, in the technology of Patent Document 2, in first encoding, the degree of complexity of each frame is obtained and an allocation bit rate of each frame is obtained. A check is made as to whether or not this allocation bit rate results in the CPB underflow. If the CPB underflow occurs, the allocation bit rate is modified. In this way, since the degree of complexity of each frame is known, the image quality can be expected to be maintained while the CPB underflow is suppressed. However, in this method, since all frames of the input video are twice encoded, there is a problem in that a large calculation amount is required.

PRIOR ART DOCUMENTS

Patent Documents

Patent Document 1: Japanese Unexamined Patent Application, First Publication No. 2006-295535

Patent Document 2: Japanese Unexamined Patent Application, First Publication No. 2003-018603

Non-Patent Document

Non-Patent Document 1: Kadono, Kikuchi, and Suzuki, "Third Revised Edition H.264/AVC Textbook" issued by Impress R & D, 2009, pp. 189-191.

SUMMARY OF INVENTION

Problems to be Solved by the Invention

In conventional art a described above, since encoding control is performed using only already encoded information, there is a problem in that great deterioration in image quality due to suppression of CPB underflow cannot be avoided. As a simple method for avoiding the deterioration in image quality, setting an upper threshold value of a quantization parameter may also be considered. However, this countermeasure causes the CPB underflow.

On the other hand, in accordance with conventional art b, although the CPB underflow can be suppressed while suppressing the deterioration in image quality, there is a problem in that the calculation amount is large.

An object of the present invention is to reduce the great deterioration in image quality occurring in conventional 1-pass encoding (conventional art a) while suppressing the CPB underflow with a smaller calculation amount than conventional 2-pass encoding (conventional art b), to thereby solve the above-described problems.

Means for Solving the Problems

Prior to describing the present invention, an "encoding-order picture group" and a "quantization statistic" are defined. The encoding-order picture group includes a predetermined number of pictures, and it is a collection of successive pictures in the order of encoding. A typical example of the encoding-order picture group is a group of pictures (GOP).

Conceptual diagrams of the encoding-order picture group are illustrated in FIGS. 2A to 2C. In FIGS. 2A to 2C, I indicates a picture that is a target of an intra-predictive encoding (an I picture), P indicates a picture that is a target of a forward predictive encoding (a P picture), and B indicates a picture that is a target of a bidirectional predictive encoding (a B picture).

A display order of the pictures is assumed to be, for example, an order of I→B→P→B→P→B, . . . , as illustrated in FIG. 2A. When the encoding-order picture group in the present invention is assumed to be a GOP, the encoding-order picture group becomes a picture group of I→P→B→P→ . . . B→P (immediately before I), as illustrated in FIG. 2B. For example, when the encoding-order picture group includes 13 pictures, 13 successive pictures in the order of encoding as illustrated in FIG. 2C form the encoding-order picture group of the present invention.

As described above, a collection of pictures in which a picture sequence of an input video is divided into groups of a predetermined number of successive pictures in the order of encoding is referred to as the encoding-order picture group. It is to be noted that the "picture" herein refers to a frame when a video has a progressive format or it refers to a frame of one field or a frame obtained by uniting a top field and a bottom field when a video has an interlaced format.

Further, the quantization statistic is a statistic obtained from a quantization parameter or a quantization step used to encode each macro block in a picture. For example, it is the average or the median of quantization parameters or quantization steps of macro blocks in a picture.

In a first aspect of the present invention, encoding of an input video is carried out in units of encoding-order picture groups. However, it is checked as to whether or not a quantization statistic of an input picture exceeds a predetermined threshold value each time the input picture is encoded, and if the quantization statistic exceeds the predetermined threshold value, an encoding parameter is changed so that a generated bit rate becomes small, and then an encoding-order picture group that is being encoded is re-encoded. It is assumed that when the encoding of the encoding-order picture group is completed, an encoding result is output from an output buffer.

Examples of encoding parameters to be changed include a quantization parameter and pre-filter strength, and one or both of them are changed. For example, in the case of the quantization parameter, the step size of the quantization parameter increases so that an encoding parameter causes the generated bit rate to be small. Further, when the filter strength of a pre-filter for an input video is changed, a blurring degree is changed to be greater, so that the generated bit rate can be small.

When the re-encoding of the encoding-order picture group is completed, the encoding parameter is restored to the value of an encoding parameter at the time of normal encoding. As a result, deterioration in image quality due to the change in the encoding parameter so as to reduce the generated bit rate is suppressed from affecting the next encoding-order picture group. Here, the encoding parameter at the time of normal encoding refers to an encoding parameter determined in a state in which re-encoding is not performed.

Alternatively, when the re-encoding of the encoding-order picture group is completed, instead of always restoring the encoding parameter to the value at the time of normal encoding, a residual bit rate of a CPB may be checked, only if the residual bit rate is larger than or equal to a predetermined threshold value, the encoding parameter may be restored to the value at the time of normal encoding, and if the residual bit rate is smaller, the encoding parameter may not be restored to the value at the time of normal encoding. This makes it possible to reduce the possibility of continuous occurrence of the re-encoding.

Further, in the first aspect of the present invention, the encoding parameter may be basically restored to the value of an encoding parameter at the time of normal encoding, but even at the time of re-encoding of the encoding-order picture group, it may be checked as to whether or not the quantization statistic of each picture exceeds a predetermined threshold value each time each picture is encoded, and if the quantization statistic exceeds the predetermined threshold value, the encoding parameter may be changed and then re-encoding may be performed from the first picture in an encoding-order picture group that is being currently encoded. In other words, encoding of the same encoding-order picture group is repeatedly performed a plurality of times as long as a re-encoding condition that the quantization statistic exceeds the predetermined threshold value is satisfied.

In this case, the number of times one encoding-order picture group is re-encoded is managed with a parameter called a retry count, the value of the retry count is incremented if re-encoding occurs, and the value of the retry count is decremented when encoding of the encoding-order picture group is completed. The value of the encoding parameter described above is set depending on the size of the retry count, and a value with which the generated bit rate becomes smaller as the retry count increases is used. When the encoding parameter is a quantization parameter, the step size increases as the retry count increases. When the encoding parameter is filter strength of a pre-filter, a blurring degree increases as the retry count increases.

Usually, a video as an encoding target includes a complex portion and a simple portion. Generally, a change amount of the generated bit rate due to a change in the encoding parameter increases particularly in the complex portion of the video. Further, a change amount in image quality also increases. If re-encoding of one encoding-order picture group is determined to be performed once, it is necessary for an encoding parameter at the time of re-encoding to be greatly changed from an encoding parameter before the re-encoding so that when re-encoding is performed due to satisfaction of a re-encoding condition that a quantization statistic exceeds a predetermined threshold value, the re-encoding condition is not satisfied again. In this case, when a relatively complex portion of the video is a re-encoding target, great deterioration in image quality may occur.

Therefore, as described above, as long as the re-encoding condition is satisfied, the encoding-order picture group is repeatedly encoded, the retry count is managed, and the encoding parameter is set depending on the size of the retry count. Accordingly, a change amount of the encoding parameter is made to be small and encoding is performed with an appropriate encoding parameter. As a result, it is possible to further reduce deterioration in image quality.

Alternatively, the number of times one encoding-order picture group is re-encoded is managed with a parameter called a retry count, the value of the retry count is incremented if re-encoding occurs, and the retry count is decremented when encoding of the encoding-order picture group is completed, similar to the above.

However, when encoding of the encoding-order picture group is completed, instead of unconditionally decrementing the value of the retry count, the retry count may be decremented only if a CPB residual bit rate is larger than or equal to a predetermined threshold value at a time when encoding of the encoding-order picture group is completed.

In other words, at the time of re-encoding, the retry count is incremented and encoding is performed, and then the retry count is basically decremented at a time when the encoding of the encoding-order picture group is completed, thereby an influence of deterioration in image quality on the next encoding-order picture group is reduced. However, if the CPB residual bit rate is smaller than the predetermined amount, the retry count is not decremented. As a result, re-encoding is less likely to occur even in encoding of the next encoding-order picture group.

In a second aspect of the present invention, an encoding-order picture group includes a predetermined number of pictures, with the first picture being an intra-predictive encoded picture (an I picture), and it is a collection of successive pictures in the order of encoding.

In the second aspect of the present invention, the encoding-order picture group may not be necessarily a GOP, but the first picture in the encoding-order picture group is the intra predictive encoded picture (an I picture). FIG. 2D illustrates an example in which the encoding-order picture group includes 20 pictures corresponding to 2 GOPs.

In the second aspect of the present invention, encoding of an input video is carried out in units of encoding-order picture groups. However, it is checked as to whether or not a quantization statistic of an input picture exceeds a predetermined threshold value each time the picture is encoded, if the quantization statistic exceeds the predetermined threshold value, the encoding parameter is changed so that a generated bit rate becomes small, and re-encoding is performed from a position of the encoding-order picture group set as a retry point (which will be described below). It is assumed that an encoding result is output from an output buffer, when encoding of the encoding-order picture group is completed and if it is determined that re-encoding is not to be performed.

Examples of the encoding parameters to be changed include a quantization parameter and pre-filter strength, and one or both of them are changed. For example, in the case of the quantization parameter, the step size of the quantization parameter increases so that an encoding parameter causes the generated bit rate to be small. Further, when the filter strength of a pre-filter for an input video is changed, a blurring degree is changed to be greater, so that the generated bit rate can be small.

When re-encoding of the encoding-order picture group is completed, the encoding parameter is restored to the value of an encoding parameter at the time of normal encoding. As a result, deterioration in image quality due to a change in the encoding parameter so as to reduce the generated bit rate is suppressed from affecting the next encoding-order picture group. Here, the encoding parameter at the time of normal encoding refers to an encoding parameter determined in a state in which re-encoding is not performed.

Alternatively, when re-encoding of the encoding-order picture group is completed, instead of always restoring the encoding parameter to the value at the time of normal encoding, a residual bit rate of a CPB may be checked, only if the residual bit rate is larger than or equal to a predetermined threshold value, the encoding parameter may be restored to the value at the time of normal encoding, and if the residual bit rate is smaller, the encoding parameter may not be restored to the value at the time of normal encoding. This makes it possible to reduce the possibility that re-encoding continuously occurs.

Through the above process, for example, even when an encoding process proceeds from a simple scene of a video to a complex scene and the image quality is deteriorated due to an insufficient CPB residual bit rate, re-encoding is performed from a position in the encoding-order picture group that is set as a retry point so that the CPB residual bit rate further increases. Thus, the deterioration in the image quality in the complex scene can be reduced.

The retry point described above refers to position information indicating a picture from which re-encoding starts when the re-encoding is necessary due to the quantization statistic in a certain picture exceeding the predetermined threshold value.

The retry point is basically the first picture in a currently encoded encoding-order picture group, but it may be the first picture in an immediately previously encoded encoding-order picture group. The retry point is updated in the following cases.

(1) If the CPB residual bit rate is larger than or equal to a predetermined threshold value at a time when the encoding of the encoding-order picture group is completed, the retry point is set as the first picture (an I picture) in the next encoding-order picture group.

(2) If the CPB residual bit rate is smaller than the predetermined threshold value at a time when the encoding of the encoding-order picture group is completed, the retry point remains unchanged and encoding is performed on the first picture in the next encoding-order picture group. If the quantization statistic does not exceed the predetermined threshold value in encoding of the first picture in the encoding-order picture group, the retry point is set to the first picture in the current encoded encoding-order picture group.

A reason for setting of the retry point as described above will be described. If the retry point is always set to the head of the currently encoded encoding-order picture group, a processing configuration is simpler than the present invention. Hereinafter, this technology is referred to as "related art". Even in the case of the related art, the deterioration in image quality can be reduced by re-encoding only an encoding-order picture group including a picture in which a quantization statistic exceeds a predetermined threshold value only if this situation occurs. In the second aspect of the present invention, deterioration in image quality of decoded pictures can be more effectively reduced as compared to the related art.

As is well known, the generated bit rate of an I picture is larger than those of other picture types. Accordingly, in rate control that has been conventionally carried out, if a CPB residual bit rate at a time when encoding of a certain encoding-order picture group is completed is small, the value of the quantization parameter to be used to encode the next I picture is increased in order to reduce the generated bit rate. In this case, in the above related art, re-encoding occurs due to the quantization parameter of the I picture being increased, but since the re-encoding begins with the first picture in the encoding-order picture group that is being currently encoded, it is necessary, in encoding, to avoid a re-encoding condition from being satisfied only with the I picture itself. In this case, there is a problem in that the image quality of the I picture itself is greatly deteriorated. Further, since the I picture is referred to in encoding of subsequent P and B pictures, encoding efficiency of the P picture and the B picture is also deteriorated.

Accordingly, in the second aspect of the present invention, if the CPB residual bit rate is small and the re-encoding condition is satisfied in the first I picture of the next encoding-order picture group, an immediately previous encoding-order picture group is re-encoded from its head in accordance with a set retry point. Therefore, great deterioration in image quality in the first picture in the encoding-order picture group can be avoided, and the deterioration in the image quality can be reduced.

In a third aspect of the present invention, instead of always encoding a frame of an input video twice so as to suppress the CPB underflow like the conventional 2-pass encoding, 1-pass encoding is basically used, and only if a re-encoding condition that a quantization statistic exceeds a predetermined threshold value is satisfied in encoding of a certain picture, a plurality of pictures are traced back and re-encoded.

In the third aspect of the present invention, if the quantization statistic exceeds the predetermined threshold value in encoding of a picture in an encoding-order picture group, re-encoding is performed after tracing back to a certain picture of the encoding-order picture group. The picture to which trace-back is performed and from which re-encoding is performed is determined by the available memory amount in advance. In the description here, the number of maximum pictures that can be traced back at the time of re-encoding is defined as "the maximum inter-picture distance".

A process overview in the third aspect of the present invention is as follows. First, the number of maximum pictures that can be traced back at the time of re-encoding is obtained based on information of the available memory amount given from the outside, and this value is stored as the maximum inter-picture distance.

This is for the following reason. For re-encoding, it is necessary to hold a video signal of an encoding target picture in an input buffer and to hold encoded streams of an encoding result in an output buffer until it is determined that re-encoding is not performed and output of the encoding result from the output buffer ends. If the available memory amount is sufficient, each of the input buffer and the output buffer has a memory capacity corresponding to the number of pictures in the encoding-order picture group, so that re-encoding at the time of the satisfaction of the re-encoding condition can be performed from the head of the encoding-order picture group in units of encoding-English order picture groups.

However, since the memory cannot be necessarily used as needed, the maximum inter-picture distance, which is the number of maximum pictures that can be traced back at the time of re-encoding, is calculated from the available memory amount in advance.

In the third aspect of the present invention, encoding of an input video is carried out in units of encoding-order picture groups. However, each time an input picture is encoded, it is checked as to whether or not a quantization statistic of the picture exceeds a predetermined threshold value, and if the quantization statistic exceeds the predetermined threshold value, the encoding parameter is changed so that the generated bit rate becomes small, and the encoding-order picture group that is being encoded is re-encoded. However, the picture in the encoding-order picture group that is being encoded to which trace-back is performed and from which re-encoding is performed is a picture satisfying the following three conditions.

Condition 1: The picture is included in the encoding-order picture group that is being encoded.

Condition 2: The picture is included within the maximum inter-picture distance from a picture whose quantization statistic exceeds the predetermined threshold value.

Condition 3: The picture is a picture that is farthest from the picture whose quantization statistic exceeds the predetermined threshold value, among pictures satisfying conditions 1 and 2.

A picture from which re-encoding starts is referred to as a retry point. For example, if the first picture in the maximum inter-picture distance is in an immediately previous encoding-order picture group, the retry point is the first picture in the encoding-order picture group that is being currently encoded; otherwise, the retry point is the first picture in the maximum inter-picture distance, i.e., the oldest encoded picture separated by the maximum inter-picture distance.

Examples of the encoding parameters to be changed at the time of re-encoding include a quantization parameter and pre-filter strength, and one or both of them are changed. For example, in the case of the quantization parameter, the step size of the quantization parameter is increased so that an encoding parameter causes the generated bit rate to be small. Further, when the filter strength of a pre-filter for an input video is changed, a blurring degree is changed to be greater, so that the generated bit rate can be small.

When the encoding of the encoding-order picture group that is being currently encoded is completed by re-encoding, the encoding parameter is restored to the value of an encoding parameter at the time of normal encoding, thus suppressing deterioration in image quality from affecting the next encoding-order picture group. Here, the encoding parameter at the time of normal encoding refers to an encoding parameter determined in a state in which re-encoding is not performed.

Alternatively, when re-encoding of the encoding-order picture group is completed, the encoding parameter is not necessarily restored to the value at the time of normal encoding, but a residual bit rate of a CPB may be checked, the encoding parameter may be restored to the value at the time of normal encoding only if the residual bit rate is larger than or equal to a predetermined threshold value, and the encoding parameter may not be restored to the value at the time of normal encoding if the residual bit rate is smaller. This makes it possible to reduce the possibility that re-encoding continuously occurs.

Effects of the Invention

In accordance with the present invention, even when an encoding process proceeds from a simple scene of a video to a complex scene and the image quality is deteriorated due to an insufficient CPB residual bit rate, re-encoding is performed from the first picture of an encoding-order picture group so as to increase the CPB residual bit rate, and thus deterioration in image quality in the complex scene can be reduced as compared to conventional art a of 1-pass encoding. Further, since the present invention reduces the deterioration in image quality by partially performing re-encoding only when necessary, a calculation amount is small as compared to conventional art b of 2-pass encoding in which all frames of an input video are twice encoded.

In particular, the present invention makes a change amount of an encoding parameter at the time of re-encoding to be small by managing the retry count, thus reducing deterioration in image quality due to the re-encoding.

Further, if the CPB residual bit rate after the re-encoding is small, the encoding parameter is maintained to be the same as that at the time of the re-encoding, thereby suppressing re-occurrence of the re-encoding.

Further, in accordance with the present invention, even when an encoding process proceeds from a simple scene of a video to a complex scene and the image quality is deteriorated due to an insufficient CPB residual bit rate, re-encoding is performed from the head of the encoding-order picture group set as the retry point so as to further increase the CPB residual bit rate, and thus deterioration in image quality in the complex scene can be reduced as compared to conventional art a of 1-pass encoding. Further, since the present invention reduces the deterioration in image quality by partially performing re-encoding only when necessary, a calculation amount is small as compared to conventional art b of 2-pass encoding in which all frames of an input video are twice encoded.

In particular, in the present invention, it is possible to prevent the image quality of the first I picture in the encoding-order picture group from being greatly deteriorated even if the CPB residual bit rate is small when encoding of the encoding-order picture group is completed.

Furthermore, in accordance with the present invention, even when an encoding process proceeds from a simple scene of a video to a complex scene and the image quality is deteriorated due to an insufficient CPB residual bit rate, re-encoding is performed from the picture in the encoding-order picture group set as the retry point so as to increase the CPB residual bit rate, and thus deterioration in image quality in the complex scene can be reduced as compared to conventional art a of 1-pass encoding. Further, since the present invention reduces the deterioration in image quality by partially performing re-encoding only when necessary, the calculation amount is small as compared to conventional art b of 2-pass encoding in which all frames of an input video are twice encoded. Further, since the re-encoding is performed from the retry point determined depending on a memory amount required for the re-encoding, the memory can be effectively used.

BRIEF DESCRIPTION OF DRAWINGS

Figure 2A:
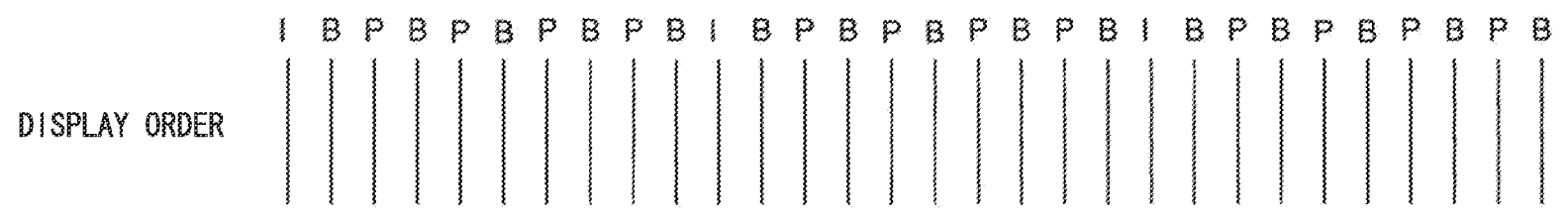

FIG. 2A is a conceptual diagram of an encoding-order picture group.

MODES FOR CARRYING OUT THE INVENTION

First Embodiment

Figure 1:
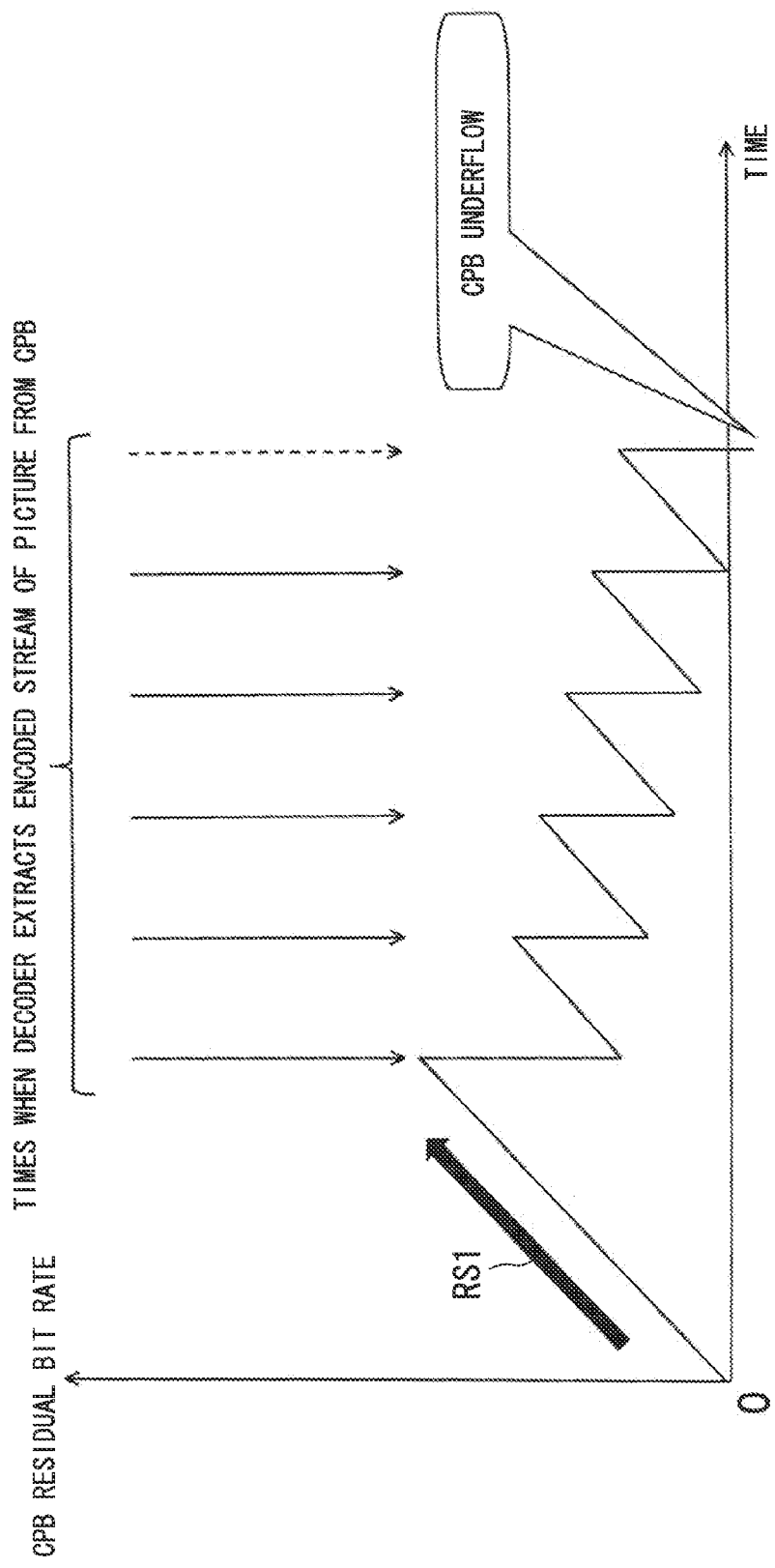
FIG. 1 is a diagram for describing CPB underflow.
Figure 2B:
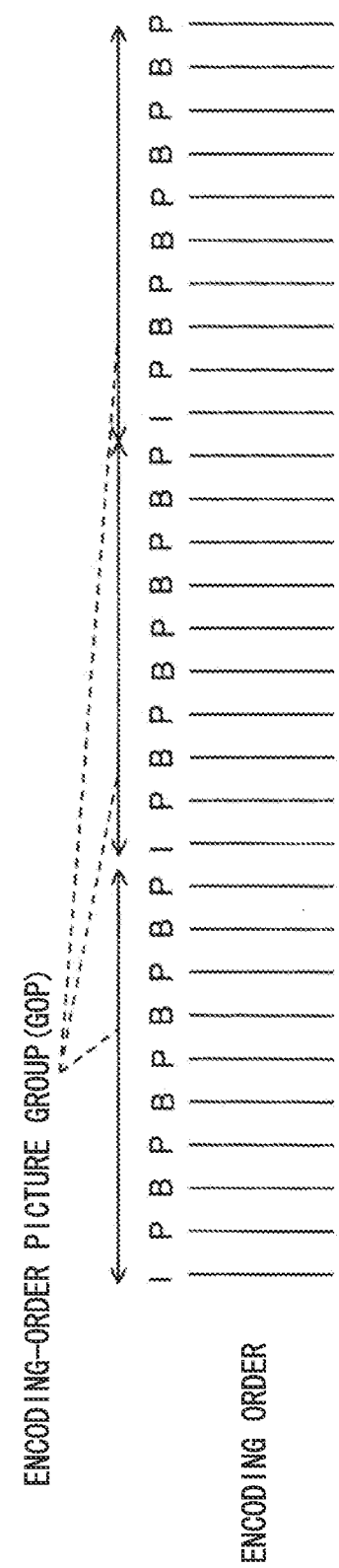
FIG. 2B is a conceptual diagram of an encoding-order picture group.
Figure 2C:
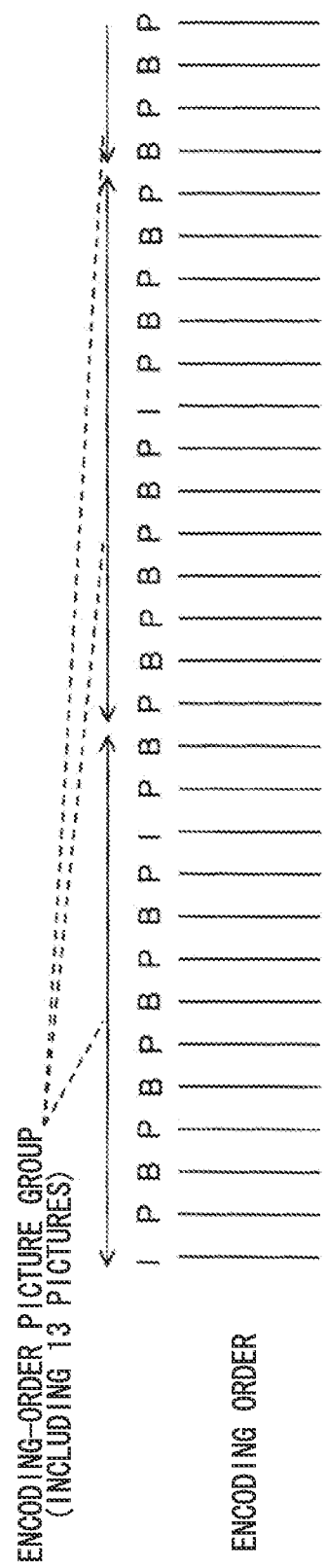
FIG. 2C is a conceptual diagram of an encoding-order picture group.
Figure 2D:
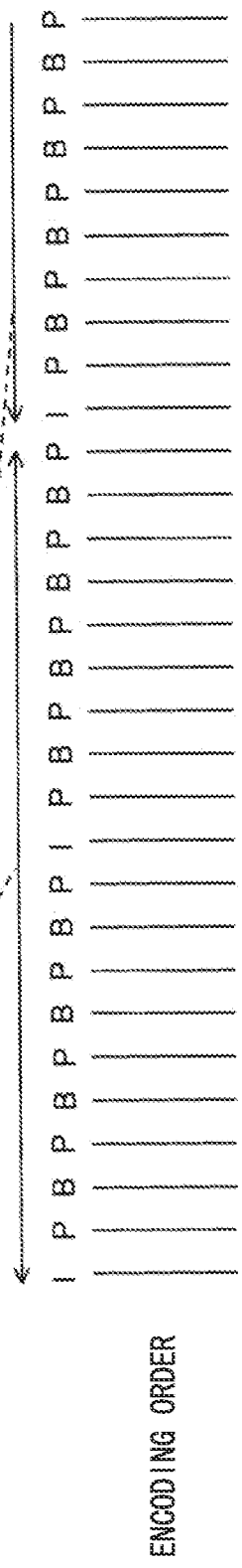
FIG. 2D is a conceptual diagram of an encoding-order picture group.
Figure 3:
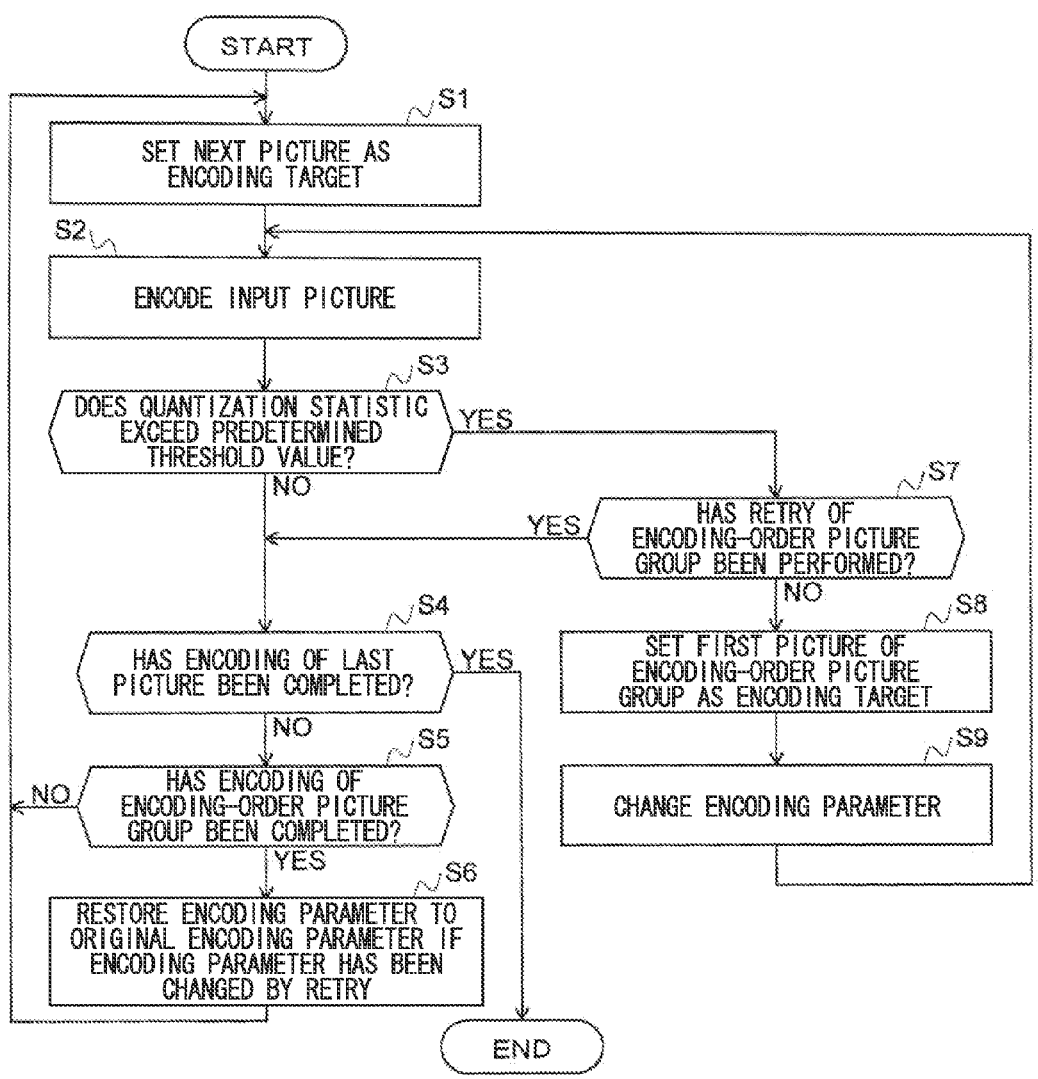
FIG. 3 is a process flowchart illustrating a video encoding control method in accordance with a first embodiment of the present invention.

Hereinafter, a first embodiment of the present invention will be described in detail with reference to the drawings. FIG. 3 is a process flowchart illustrating a video encoding control method in accordance with the first embodiment of the present invention.

First, a picture next to a picture for which encoding has ended in an input video signal is set as an encoding target (step S1). The input picture set as the encoding target is encoded using H.264 or any of other predetermined encoding schemes (step S2). A determination is made as to whether or not a quantization statistic of the input picture when the input picture is encoded exceeds a predetermined threshold value (step S3), and if the quantization statistic exceeds the predetermined threshold value, the process proceeds to step S7.

If the quantization statistic does not exceed the predetermined threshold value, a determination is made as to whether or not encoding of the last picture is completed (step S4), and if encoding of the last picture is completed, the encoding process ends.

Otherwise, a determination is made as to whether or not encoding of an encoding-order picture group is completed (step S5). If the encoding of the encoding-order picture group is not completed, the process returns to step S1, and a similar encoding process continues for the next picture. An encoding parameter is restored to a value at the time of normal encoding if the encoding parameter has been changed by re-encoding (retry) of the encoding-order picture group when the encoding of the encoding-order picture group is completed (step S6), the process returns to step S1, and the encoding process is performed from the first picture of the next encoding-order picture group.

If it is detected in step S3 that the quantization statistic exceeds the predetermined threshold value, a determination is made as to whether or not the current encoding-order picture group has been re-encoded (the retry has already been performed) (step S7). If the retry has already been performed, no further re-encoding is performed, the process proceeds to step S4, and the encoding process is just continued.

If the retry has not yet been performed, the first picture in the current encoding-order picture group is set as an encoding target in order to re-encode the current encoding-order picture group (step S8). Then, one or both of two encoding parameters (a quantization parameter and pre-filter strength) are changed (for the quantization parameter, the step size is changed to be greater, and for the filter strength, a blurring degree is changed to be greater) (step S9), the process returns to step S2, and the encoding-order picture group that is being encoded is re-encoded.

In other words, the encoding-order picture group (e.g., a GOP) is twice encoded only if the quantization statistic of the encoded picture is too large, unlike conventional art b in which all frames of an input video are twice encoded. At the time of second encoding, only the encoding-order picture group that is being currently encoded is re-encoded using an encoding parameter with which the CPB residual bit rate further increases, and thus the deterioration in image quality at the time of a transition of the video from a simple scene to a complex scene can be reduced and a calculation amount can be reduced, as compared to conventional art b in which all pictures of an input video are twice encoded.

Figure 4:
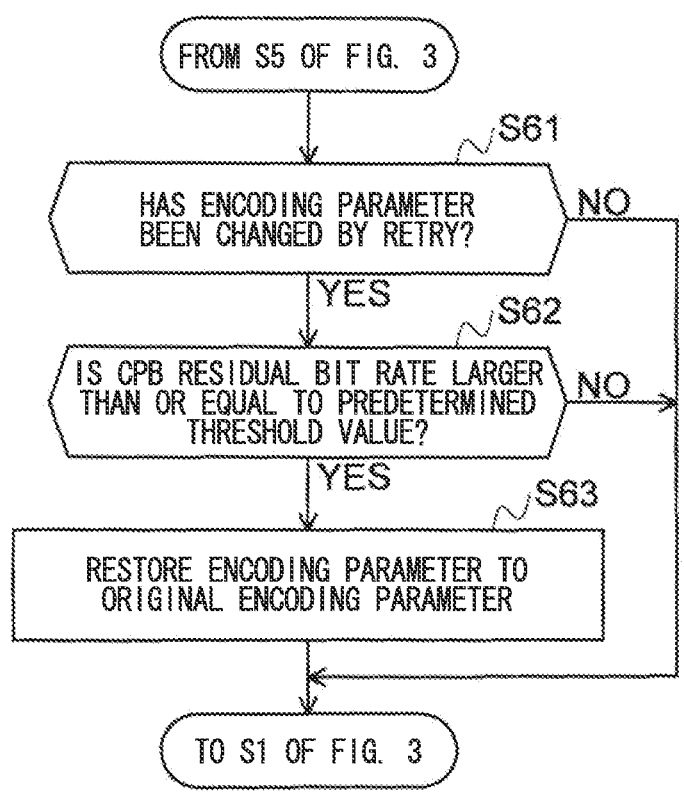
FIG. 4 is a process flowchart of a variant of the video encoding control method in accordance with the first embodiment of the present invention.

FIG. 4 is a process flowchart illustrating a video encoding control method in accordance with a variant of the present embodiment. The present embodiment may be implemented by replacing the process of step S6 illustrated in FIG. 3 with a process of steps S61 to S63 illustrated in FIG. 4. Processes other than step S6 are similar to those in FIG. 3.

After the process of step S5 in FIG. 3, a determination is made as to whether or not the encoding parameter has been changed by the retry (step S61). If the encoding parameter has not been changed by the retry, the process returns to step S1 in FIG. 3. If the encoding parameter has been changed by the retry, a determination is made as to whether or not the CPB residual bit rate is larger than or equal to a predetermined threshold value (step S62). If the CPB residual bit rate is smaller than the predetermined threshold value, the encoding parameter is maintained as that used for the re-encoding, and only if the CPB residual bit rate is larger than or equal to the predetermined threshold value, the encoding parameter is restored to an original default encoding parameter (step S63).

Then, the process returns to step S1 in FIG. 3 to proceed to the encoding of the next encoding-order picture group.

As described above, in the variant illustrated in FIG. 4, the encoding parameter is restored to the value at the time of normal encoding only if the CPB residual bit rate exceeds a predetermined amount at a time when the encoding of the encoding-order picture group is completed. This is for the following reason. Even if the CPB residual bit rate is small when the encoding of an encoding-order picture group is completed, restoration of the encoding parameter to the value at the time of normal encoding further increases the generated bit rate, and thus the quantization statistic of the encoded picture is highly likely to exceed the predetermined threshold value again in encoding of the next encoding-order picture group. In the process of FIG. 4, if the CPB residual bit rate is small, the encoding parameter is not changed, so that occurrence of the re-encoding is suppressed in encoding of the next encoding-order picture group and a calculation amount is further reduced, as compared to the process of FIG. 3.

As described above, the present embodiment changes the encoding parameter at the time of re-encoding. Here, it is assumed that a pre-filter is applied to the input video at the time of encoding, and the encoding parameters to be changed are a quantization parameter and pre-filter strength. Both of the two encoding parameters may be changed or only any one of them may be changed.

For the quantization parameter, a predetermined offset value is added to the value of a quantization parameter at the time of normal encoding, and re-encoding is performed using such a greater quantization parameter.

For the pre-filter, it is assumed that a Gaussian filter is used in the present embodiment. The Gaussian filter can be produced by sampling a Gaussian distribution shown in the following equation with respect to x and y.

$$g(x,y) = \{1/(2\pi\sigma^2)\} \times \exp\{-(x^2-y^2)/(2\sigma^2)\}$$

As can be seen from the above equation, a blurring degree increases as the value of σ increases. Since a high frequency component is reduced as the blurring degree increases, the generated bit rate at the time of encoding is reduced. Details of the Gaussian filter are described, for example, in the following Non-Patent Document 2. [Non-Patent Document 2]: Okutomi, Ozawa, Shimizu, and Hori, "Digital Image Processing", Computer Graphic Arts Society, 2006, pp. 108-110.

When σ is equal to 0, the Gaussian filter is not applied and for example, a default encoding parameter $\sigma_0 = 0$ and an encoding parameter for re-encoding $\sigma_1 > 0$ are used. It is to be noted that, in the present embodiment, the type of a low pass filter does not matter. Further, how to strengthen the blurring degree at the time of re-encoding may be arbitrarily determined in advance. For example, it is acceptable to employ the structure in which the default encoding parameter $\sigma_0$ is changed depending on the degree of complexity of each picture and $\sigma_1$ is set to the sum of a predetermined offset and $\sigma_0$.

Further, in the present embodiment, it is assumed that the average value of the quantization parameters of macro blocks of a picture is used as the quantization statistic.

Figure 5:
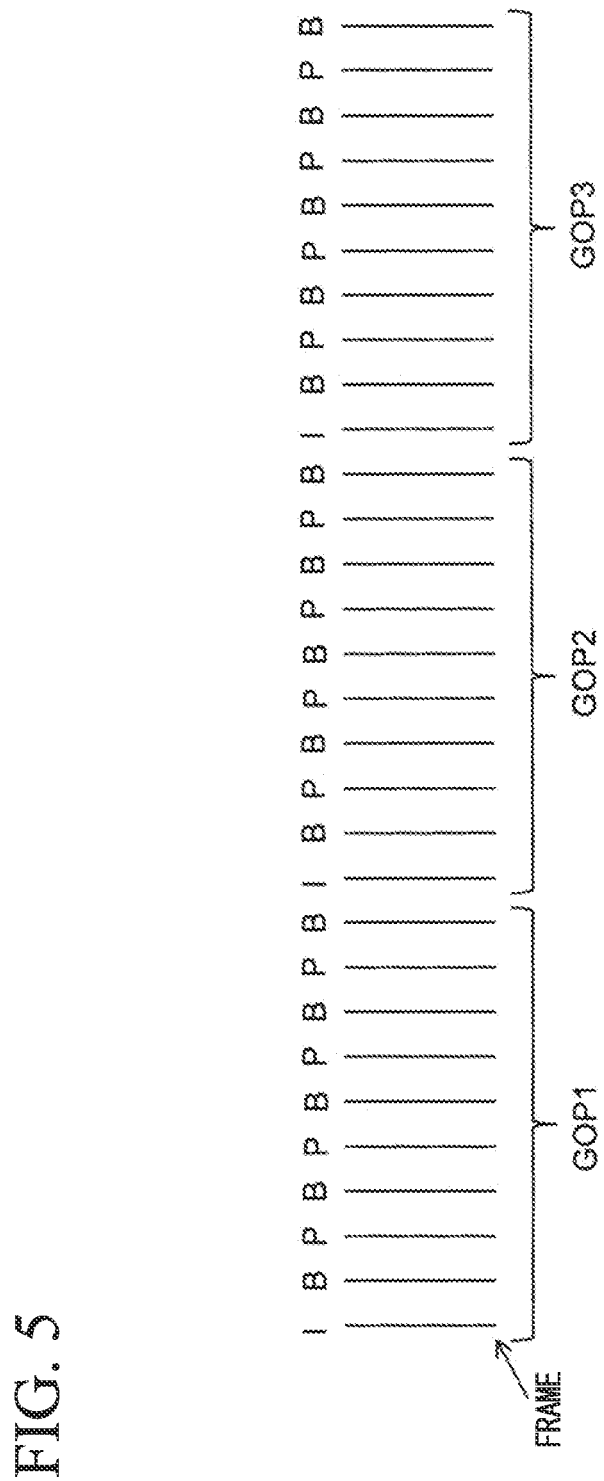
FIG. 5 is a conceptual diagram of a GOP.

For encoding, it is assumed that encoding in accordance with the H.264 standard is performed. Further, in the present embodiment, the encoding-order picture group is a GOP, and a conceptual diagram of the GOP when encoded is illustrated in FIG. 5. It is assumed that one GOP includes 10 pictures, and a B picture and a P picture are alternately lined up in display order, with an I picture being the first picture.

Figure 6:
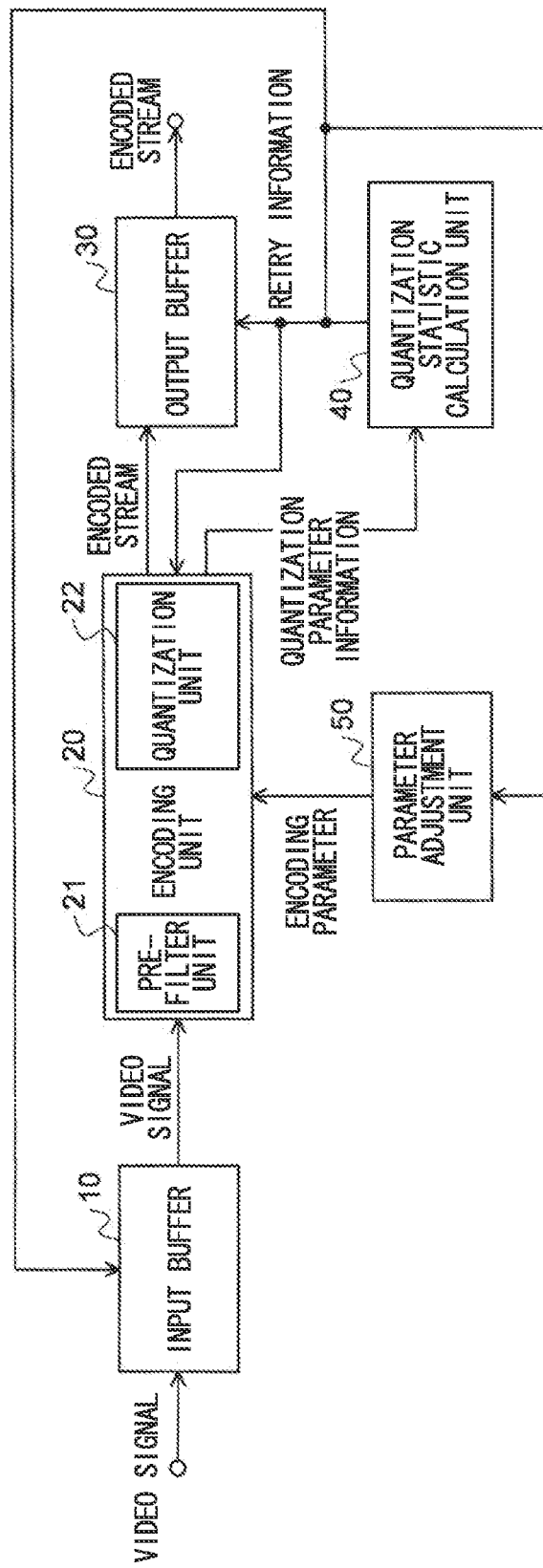
FIG. 6 is a diagram illustrating a configuration example of a video encoding apparatus in accordance with the first embodiment of the present invention.

An example of the configuration of the apparatus of the present embodiment is illustrated in FIG. 6. An input buffer 10 stores an input video signal and outputs a video signal that is an encoding target to an encoding unit 20. Further, if the input buffer 10 receives information indicating that re-encoding is to be performed (retry information) due to the quantization statistic of a picture exceeding the predetermined threshold value, from a quantization statistic calculation unit 40, which will be described below, the input buffer 10 outputs the video signal from the first picture in a GOP that is being encoded to the encoding unit 20 again. Further, if the encoding of the GOP is completed without reception of the retry information, the input buffer 10 discards the stored video signal of the GOP.

The encoding unit 20 encodes the video signal input from the input buffer 10, and outputs an encoded stream to an output buffer 30. Further, the encoding unit 20 outputs a quantization parameter (quantization parameter information) of each macro block when having encoded the input video signal to the quantization statistic calculation unit 40. Further, if the encoding unit 20 receives the retry information from the quantization statistic calculation unit 40, the video signal from the first picture in the GOP that is being encoded is input from the input buffer 10 again and an encoding parameter for re-encoding is input from a parameter adjustment unit 50, and thus the encoding unit 20 performs re-encoding using the input encoding parameter for re-encoding.

The output buffer 30 outputs encoded streams of the GOP when all the encoded streams of the GOP have been stored, and the output buffer 30 discards the stored encoded streams of the GOP that is being encoded if the retry information is received from the quantization statistic calculation unit 40.

The quantization statistic calculation unit 40 obtains a quantization statistic which changes in units of pictures using the quantization parameter information input from the encoding unit 20. Then, if the quantization statistic exceeds the predetermined threshold value, the quantization statistic calculation unit 40 outputs the retry information to the input buffer 10, the encoding unit 20, the parameter adjustment unit 50, and the output buffer 30 in order to notify that the quantization statistic exceeds the predetermined threshold value.

If the parameter adjustment unit 50 receives the retry information from the quantization statistic calculation unit 40, the parameter adjustment unit 50 inputs the encoding parameter for re-encoding to the encoding unit 20 as described above. As a result, at the time of re-encoding, the encoding unit 20 performs encoding of the same GOP using the encoding parameter with which the generated bit rate decreases.

The flow of the encoding process in the present embodiment will be described with reference to the flowchart of FIG. 3. In the following description, correspondence with the flowchart of FIG. 3 like S1, S2, . . . is recited in sentences.

A process of encoding a certain GOP will be described with respect to the following three cases separately.

[Case 1]: The quantization statistic has not exceeded a predetermined threshold value in encoding of the GOP.

[Case 2]: The quantization statistic has exceeded the predetermined threshold value in encoding of the GOP, but the quantization statistic exceeding the threshold value could have been avoided by re-encoding.

[Case 3]: The quantization statistic has exceeded the predetermined threshold value in encoding of the GOP, and the quantization statistic exceeding the threshold value could not have been avoided even by re-encoding.

[Process Example of Case 1]

First, case 1 in which the quantization statistic has not exceeded a predetermined threshold value in encoding of the GOP will be described. When a picture of the GOP is input to the input buffer 10, the input buffer 10 stores the picture and inputs the picture to the encoding unit 20 as an encoding target picture (S1). Then, the encoding unit 20 encodes the picture, outputs an encoded stream to the output buffer 30 (the output buffer 30 does not output the encoded stream but stores the encoded stream), and outputs quantization parameter information about the picture to the quantization statistic calculation unit 40 (S2).

Here, a default encoding parameter is used for encoding, and a filtering process in a pre-filter unit 21 is applied to the encoding target picture with pre-filter strength corresponding to the default encoding parameter, and a discrete cosine transform (DCT) coefficient generated in the present picture is quantized by a quantization unit 22 using the quantization parameter in accordance with the default encoding parameter.

The quantization statistic calculation unit 40 calculates a quantization statistic for the picture based on the quantization parameter information input from the encoding unit 20. In this example, since the quantization statistic has not exceeded the predetermined threshold value, the quantization statistic calculation unit 40 does not output retry information (S3). If the encoding target picture is the last picture of the input video signal, the output buffer 30 outputs stored encoded streams, and the encoding process is completed (S4). On the other hand, if the encoding target picture is the last picture of the GOP, the output buffer 30 outputs the stored encoded streams, the input buffer 10 discards the stored pictures, and the process proceeds to the encoding process of the first picture in the next GOP (S5). Here, since re-encoding has not occurred in the GOP, the encoding parameter is not changed, and the process proceeds to the encoding process of the first picture in the next GOP (S6).

[Process Example of Case 2]

Next, case 2 in which the quantization statistic has exceeded the predetermined threshold value in encoding of the GOP, but the quantization statistic exceeding the threshold value could have been avoided by re-encoding will be described. When a picture of the GOP is input to the input buffer 10, the input buffer 10 stores the picture and inputs the picture to the encoding unit 20 as an encoding target picture (S1). Then, the encoding unit 20 encodes the picture, outputs an encoded stream to the output buffer 30 (the output buffer 30 does not output the encoded stream but stores the encoded stream), and outputs quantization parameter information about the picture to the quantization statistic calculation unit 40 (S2). Here, a default encoding parameter is used in the encoding.

The quantization statistic calculation unit 40 calculates a quantization statistic for the picture based on the quantization parameter information input from the encoding unit 20. As a result, if the quantization statistic calculation unit 40 detects that the quantization statistic for the picture exceeds the predetermined threshold value, the quantization statistic calculation unit 40 outputs the retry information to the encoding unit 20, the parameter adjustment unit 50, the input buffer 10, and the output buffer 30 (S3).

If the retry has not yet occurred for the GOP that is being encoded (S7), the input buffer 10 outputs the first picture of the stored GOP that is being encoded to the encoding unit 20 (S8), and the parameter adjustment unit 50 outputs an encoding parameter for re-encoding to the encoding unit 20 (S9). Further, the output buffer 30 discards encoded streams of the GOP that is being encoded. Then, the encoding unit 20 encodes the input first picture in the GOP using the encoding parameter for re-encoding.

Here, the encoding parameter for re-encoding is used in the encoding, and a pre-filtering process in the pre-filter unit 21 is applied to the encoding target picture with pre-filter strength corresponding to the encoding parameter for re-encoding (a blurring degree is greater than the default encoding parameter). Further, a DCT coefficient generated in the present picture is quantized by the quantization unit 22 using the quantization parameter in accordance with the encoding parameter for re-encoding (the quantization step size is greater than the default encoding parameter).

Thereafter, the pictures of the GOP are sequentially input from the input buffer 10 to the encoding unit 20, and the encoding process is performed by the encoding unit 20. Then, when encoding of the last picture of the GOP is completed (S5), encoded streams of the GOP are output from the output buffer 30, the encoding unit 20 sets the encoding parameter to the default encoding parameter (S6), and the process proceeds to the encoding process of the next GOP. It is to be noted that an operation when encoding of the last picture of the input video is completed is performed similar to that in case 1 described above.

Figure 7:
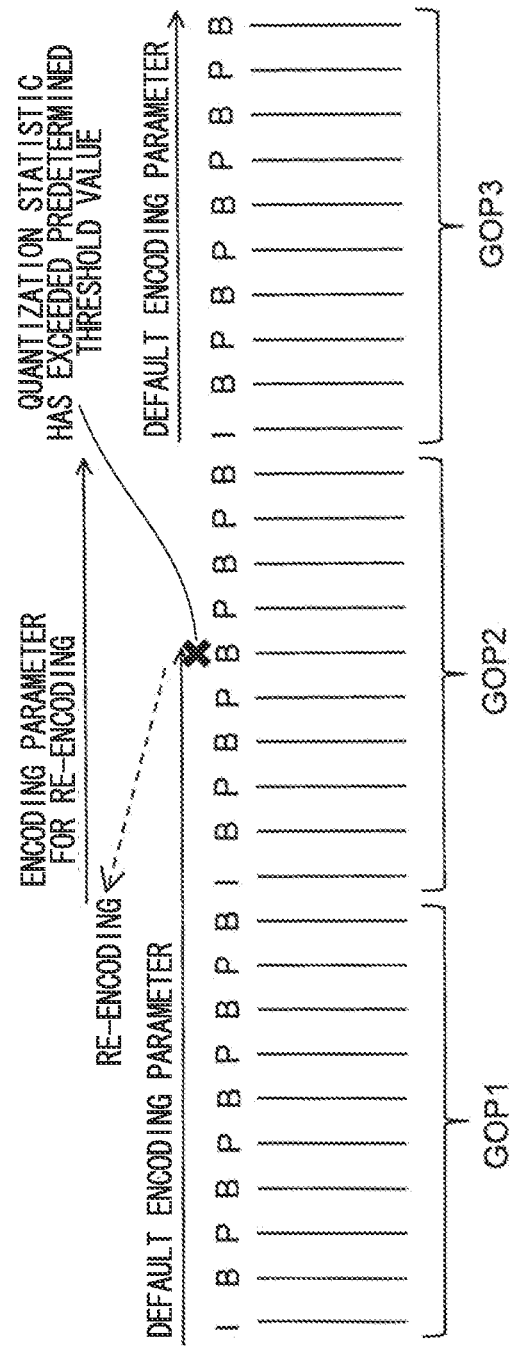
FIG. 7 is a conceptual diagram of a change in an encoding parameter when re-encoding is performed.

A conceptual diagram of a change in the encoding parameter when re-encoding is performed is illustrated in FIG. 7. In the example of FIG. 7, since the quantization statistic exceeds the predetermined threshold value in encoding the sixth picture of second GOP2, the encoding parameter for re-encoding to reduce the generated bit rate is set and GOP2 is re-encoded from its first I picture. Thereafter, since the quantization statistic does not exceed the predetermined threshold value by the re-encoding, the encoding parameter for re-encoding is restored to the default encoding parameter in encoding next GOP3, and the encoding process is continued.

Figure 8:
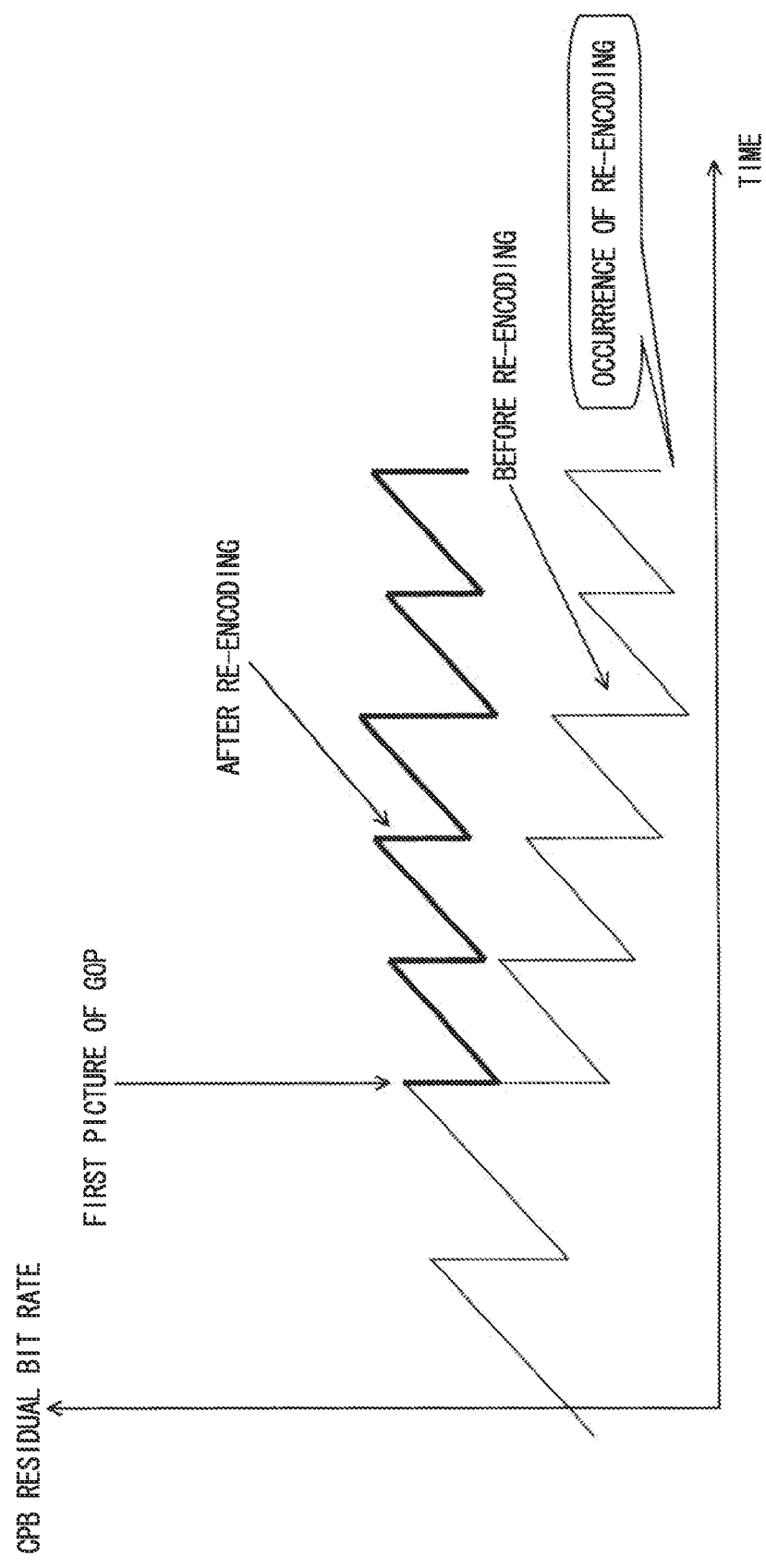
FIG. 8 is a conceptual diagram of a transition of a CPB residual bit rate when re-encoding is performed.

A conceptual diagram of a transition of a CPB residual bit rate when the re-encoding is performed is illustrated in FIG. 8. A portion indicated by a bold line is a CPB residual bit rate after re-encoding. In re-encoding, since a blurring degree is strengthened by a pre-filter and a quantization parameter is greater than the default encoding parameter, the generated bit rate is reduced and the transition of the CPB residual bit rate is that as illustrated, for example, in FIG. 8. As a result, the CPB residual bit rate in a picture for which the re-encoding has occurred increases at the time of the re-encoding, and the occurrence of great deterioration in image quality of the picture can be avoided.

Figure 9:
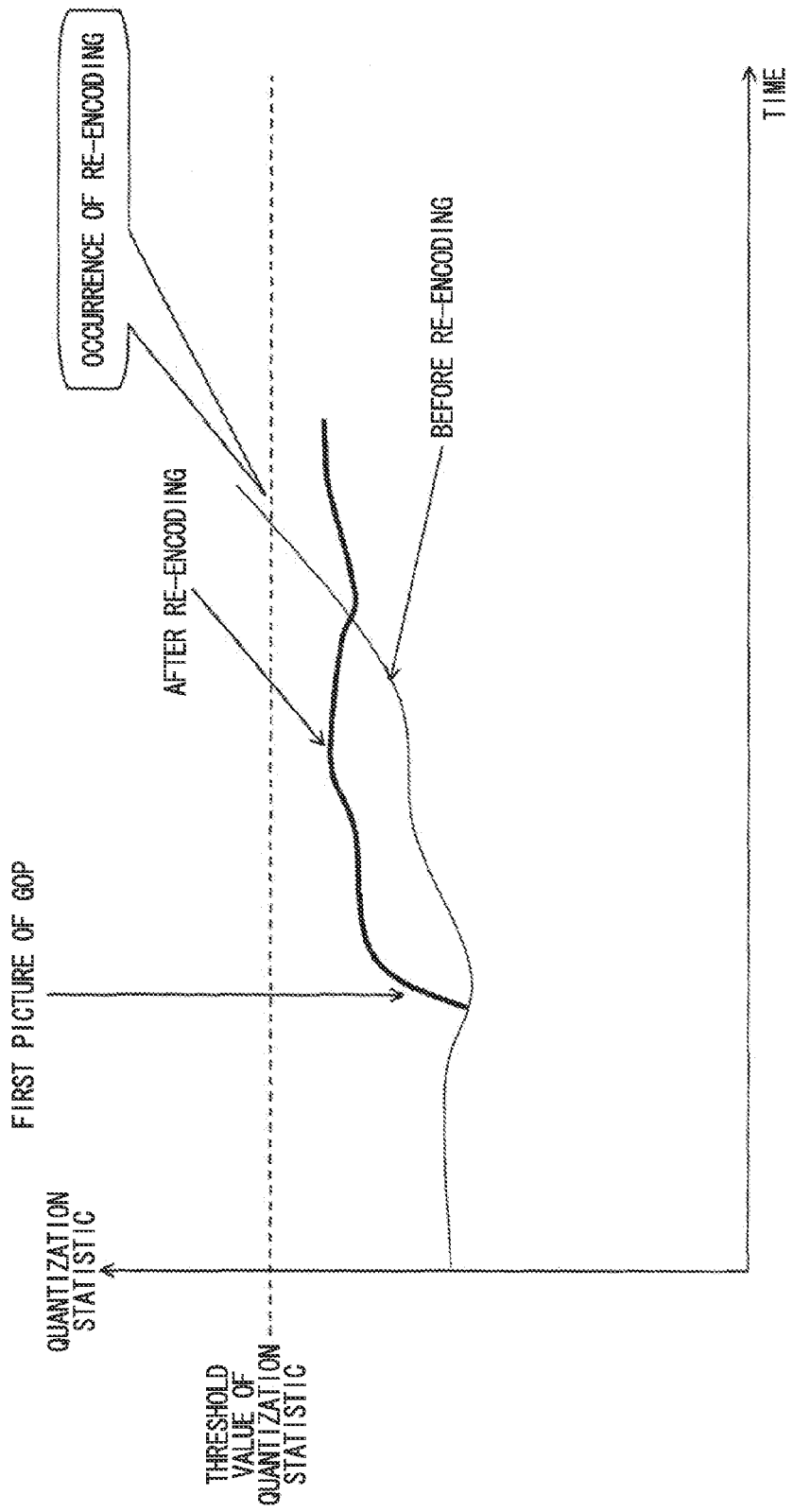
FIG. 9 is a conceptual diagram of a transition of a quantization statistic when re-encoding is performed.

Further, a conceptual diagram of a transition of the quantization statistic when re-encoding is performed is as illustrated in FIG. 9. As illustrated in FIG. 9, the quantization statistics of the pictures for which re-encoding has started increase because the encoding parameter at the time of re-encoding is changed, but this leaves a margin in the CPB residual bit rate as illustrated in FIG. 8, and thus the quantization statistic in the picture for which re-encoding has occurred becomes smaller than that before re-encoding.

[Process Example of Case 3]

Lastly, case 3 in which the quantization statistic has exceeded the predetermined threshold value in encoding of the GOP and the quantization statistic exceeding the threshold value could not have been avoided even by re-encoding will be described.

Figure 10:
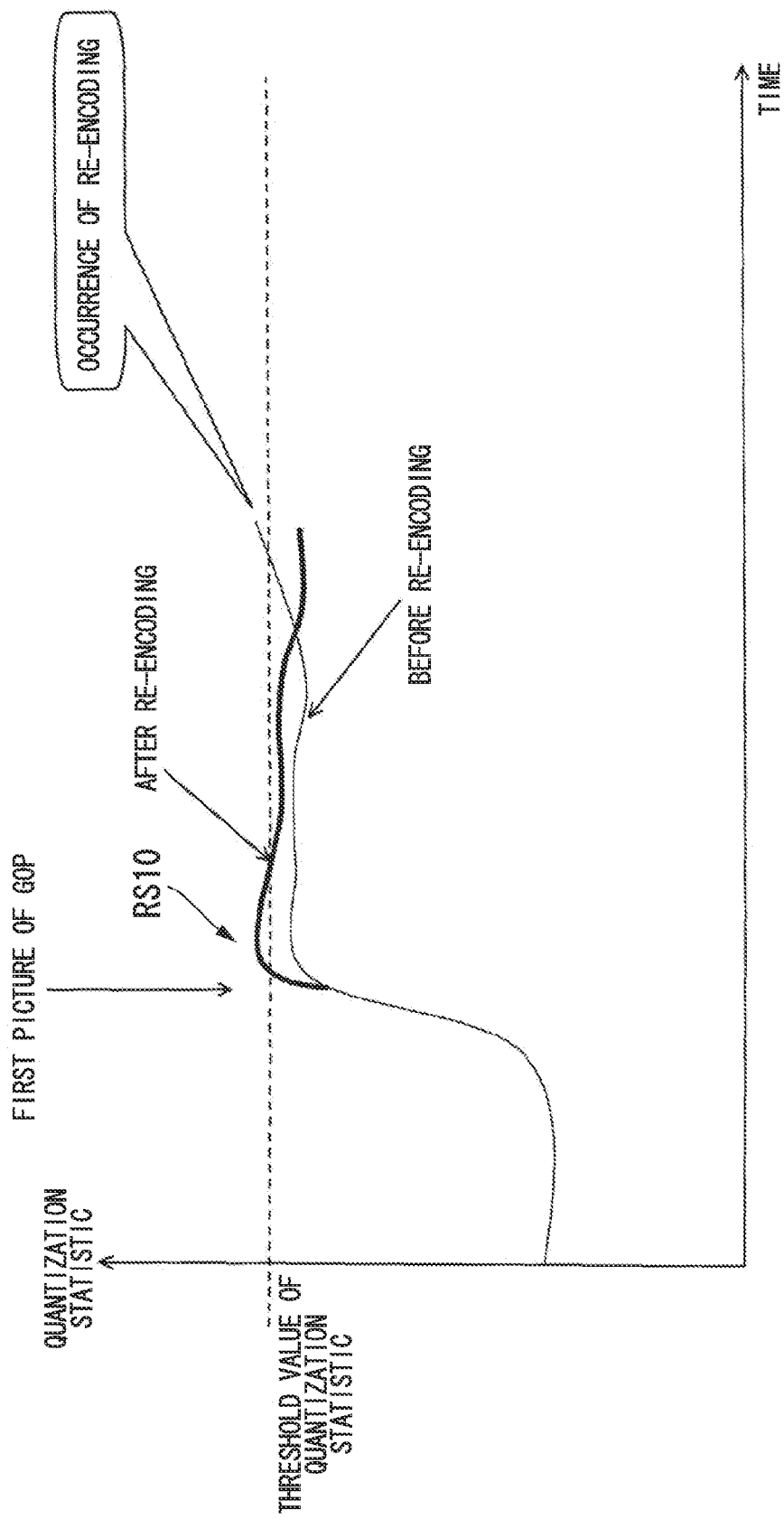
FIG. 10 is a conceptual diagram of a transition of a quantization statistic when a quantization statistic exceeding a predetermined threshold value could not have been avoided even by re-encoding.

FIG. 10 illustrates a conceptual diagram of a transition of the quantization statistic when re-encoding has been performed and the quantization statistic exceeding the threshold value could not have been avoided even by re-encoding. Case 3 may occur, for example, when the quantization statistic is already large at the head of the GOP from which the re-encoding starts, as illustrated in FIG. 10. In this case, an operation in which the quantization statistic calculation unit 40 detects that the quantization statistic exceeds the predetermined threshold value and re-encoding of the GOP is performed is similar to that in case 2. If the quantization statistic exceeds the predetermined threshold value during re-encoding of the GOP (S3 and S7), no further re-encoding is performed, and the encoding process is just continued (the process proceeds to S4). In FIG. 10, reference symbol RS10 indicates that the quantization statistic exceeding the threshold value could not have been avoided even by the re-encoding.

It is to be noted that as the quantization parameter at the time of re-encoding is greater than that at the time of normal encoding, at the time of re-encoding, the quantization statistic may exceed the threshold value in a picture earlier than a picture causing the re-encoding in the order of encoding. In order to reduce the possibility of such exceeding, if the quantization parameter at the time of re-encoding is greater than the threshold value of the quantization statistic, the quantization parameter at the time of re-encoding may be modified to be a value equal to the threshold value of the quantization statistic. However, if the quantization parameter at the time of normal encoding is greater than or equal to the quantization statistic, the value of the quantization parameter at the time of re-encoding is made equal to the value at the time of normal encoding so that the quantization parameter at the time of re-encoding is not smaller than that at the time of normal encoding.

Second Embodiment

Figure 11:
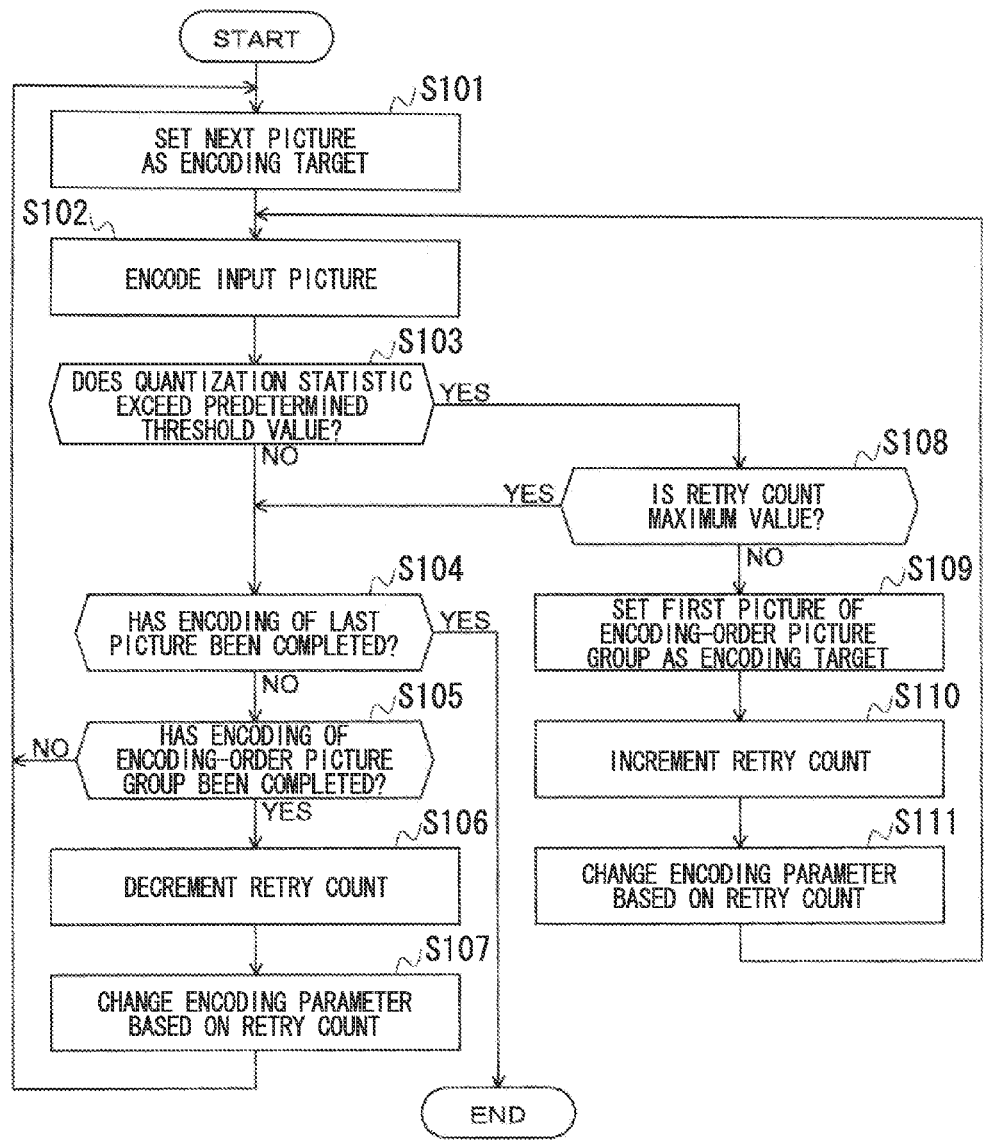
FIG. 11 is a process flowchart of a video encoding control method in accordance with a second embodiment of the present invention.

Hereinafter, a second embodiment of the present invention will be described in detail with reference to the drawings. FIG. 11 is a process flowchart illustrating a video encoding control method in accordance with the present embodiment.

First, a picture next to a picture for which encoding has ended in an input video signal is set as an encoding target (step S101). The input picture set as the encoding target is encoded using H.264 or any of other predetermined encoding schemes (step S102). A determination is made as to whether or not a quantization statistic of the input picture when the input picture is encoded exceeds a predetermined threshold value (step S103), and if the quantization statistic exceeds the predetermined threshold value, the process proceeds to step S108.

If the quantization statistic does not exceed the predetermined threshold value, a determination is made as to whether or not encoding of the last picture is completed (step S104), and if the encoding of the last picture is completed, the encoding process ends.

Otherwise, a determination is made as to whether or not encoding of an encoding-order picture group is completed (step S105). If the encoding of the encoding-order picture group is not completed, the process returns to step S101, and a similar encoding process continues for the next picture. If the encoding of the encoding-order picture group is completed, a retry count is decremented by 1 if the retry count is greater than or equal to 1 (step S106). It is to be noted that an initial value of the retry count is 0. Thereafter, the encoding parameter determined depending on the retry count in advance is set based on the retry count (step S107), the process returns to step S101, and the encoding process is performed from the first picture of the next encoding-order picture group.

If it is detected in step S103 that the quantization statistic exceeds the predetermined threshold value, a determination is made as to whether or not the value of the current retry count has reached a predetermined maximum value (step S108). If the retry count is the maximum value, no further re-encoding is performed, the process proceeds to step S104, and the encoding process is just continued.

If the retry count has not reached the maximum value, the first picture in the current encoding-order picture group is set as an encoding target in order to re-encode the current encoding-order picture group (step S109). Then, the retry count is incremented by 1 (step S110). Thereafter, one or both of two encoding parameters (a quantization parameter and pre-filter strength) are changed based on the retry count (for the quantization parameter, the step size is changed to be greater, and for the filter strength, a blurring degree is changed to be greater) (step S111), the process returns to step S102, and the encoding-order picture group that is being encoded is re-encoded.

In the present embodiment, basically, the encoding process is performed once, and each picture in the encoding-order picture group (e.g., a GOP) is repetitively encoded only if the re-encoding conditions are satisfied while reducing the generated bit rate in a stepwise manner until the re-encoding conditions are not satisfied, unlike conventional art b in which all frames of an input video are twice encoded. At the time of second and subsequent encoding, the encoding is performed using an encoding parameter with which the generated bit rate is reduced and which is determined depending on the retry count. Accordingly, a calculation amount can be reduced and deterioration in image quality due to re-encoding can be reduced, as compared to conventional art b in which all pictures of an input video are twice encoded.

As described above, the present embodiment changes the encoding parameters depending on the retry count at the time of re-encoding. Here, it is assumed that a pre-filter is applied to the input video at the time of encoding, and the encoding parameters to be changed are a quantization parameter and pre-filter strength. Both of the two encoding parameters may be changed or only any one of them may be changed.

For the quantization parameter, a predetermined offset value increasing in a stepwise manner depending on the retry count is added to the value of a quantization parameter determined at the time of normal encoding, and re-encoding is performed using such a greater quantization parameter.

For the pre-filter, it is assumed that a Gaussian filter is used in the present embodiment. The Gaussian filter can be produced by sampling a Gaussian distribution shown in the following equation with respect to x and y.

$$g(x,y) = \{1/(2\pi\sigma^2)\} \times \exp\{-(x^2+y^2)/(2\sigma^2)\}$$

As can be seen from the above equation, a blurring degree increases as the value of $\sigma$ increases. Since a high frequency component is reduced as the blurring degree increases, the generated bit rate at the time of encoding is reduced. Details of the Gaussian filter are described, for example, in Non-Patent Document 2 described above.

When $\sigma$ is equal to 0, the Gaussian filter is not applied and for example, a default encoding parameter $\sigma_0=0$ is used, and an encoding parameter for re-encoding $\sigma_c$ is used when the value of the retry count is c. The value of $\sigma_c$ becomes greater as the value of c becomes larger. $0<\sigma_1<\sigma_2<\ldots$ is satisfied. It is to be noted that, in the present embodiment, the type of a low pass filter does not matter. Further, for example, it is acceptable to employ the structure in which the default encoding parameter $\sigma_0$ is changed depending on the degree of complexity of each picture, and $\sigma_c$ is the sum of a predetermined offset and $\sigma_{c-1}$.

Further, in the present embodiment, it is assumed that the average value of quantization parameters of macro blocks of a picture is used as the quantization statistic.

In an embodiment that will be described below, it is assumed that encoding is performed using an encoding scheme in accordance with the H.264 standard. Further, it is assumed that the encoding-order picture group is a GOP. A conceptual diagram of the GOP when encoded is as illustrated in FIG. 5. It is assumed that one GOP includes 10 pictures, and a B picture and a P picture are alternately lined up in a display order, with an I picture being the first picture.

Figure 12:
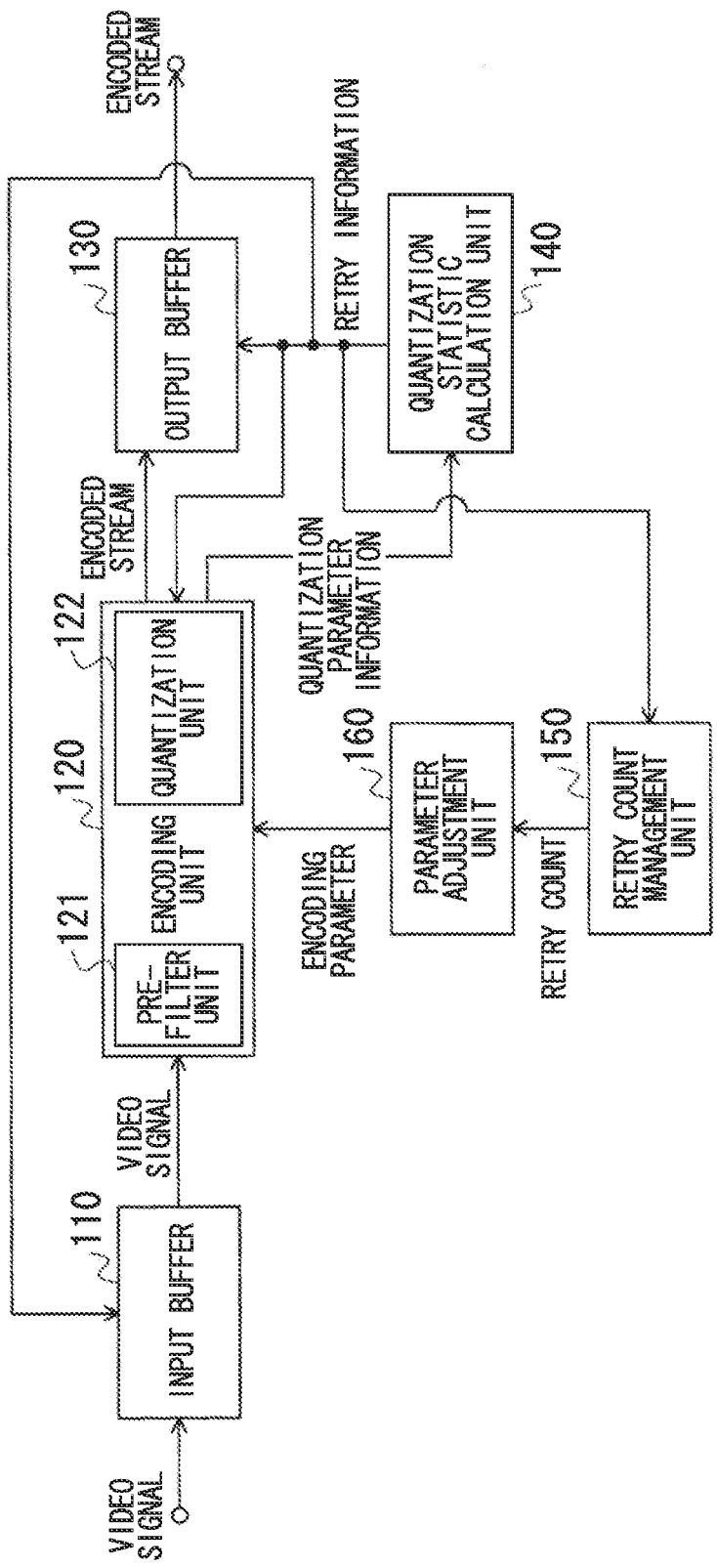
FIG. 12 is a diagram illustrating a configuration example of a video encoding apparatus in accordance with the second embodiment of the present invention.

An example of the configuration of the apparatus of the present embodiment is illustrated in FIG. 12. An input buffer 110 stores an input video signal and outputs a video signal that is an encoding target to an encoding unit 120. Further, if the input buffer 110 receives information indicating that re-encoding is to be performed (retry information) due to the quantization statistic of a picture exceeding the predetermined threshold value, from a quantization statistic calculation unit 140, which will be described below, the input buffer 110 outputs the video signal from the first picture in a GOP that is being encoded, to the encoding unit 120 again. Further, if the encoding of the GOP is completed without reception of the retry information, the input buffer 110 discards the stored video signal of the GOP.

The encoding unit 120 encodes the video signal input from the input buffer 110 and outputs an encoded stream to an output buffer 130. Further, the encoding unit 120 outputs a quantization parameter (quantization parameter information) of each macro block when having encoded the input video signal to the quantization statistic calculation unit 140. Further, if the encoding unit 120 receives the retry information from the quantization statistic calculation unit 140, the video signal from the first picture in the GOP that is being encoded is input from the input buffer 110 again and an encoding parameter for re-encoding is input from a parameter adjustment unit 160, and thus the encoding unit 120 performs re-encoding using the input encoding parameter for re-encoding.

The output buffer 130 outputs encoded streams of the GOP when all the encoded streams of the GOP have been stored, and the output buffer 130 discards the stored encoded streams of the GOP that is being encoded if the retry information is received from the quantization statistic calculation unit 140.

The quantization statistic calculation unit 140 obtains a quantization statistic which changes in units of pictures using the quantization parameter information input from the encoding unit 120. Then, if the quantization statistic exceeds the predetermined threshold value, the quantization statistic calculation unit 140 outputs the retry information to the input buffer 110, the encoding unit 120, a retry count management unit 150, and the output buffer 130 in order to notify that the quantization statistic exceeds the predetermined threshold value.

If the retry count management unit 150 receives the retry information from the quantization statistic calculation unit 140, the retry count management unit 150 adds 1 to the value of the current retry count and notifies the parameter adjustment unit 160 of the updated retry count. Further, in the case in which encoding of the GOP that is being currently encoded is completed without reception of the retry information from the quantization statistic calculation unit 140, if the value of the retry count is greater than or equal to 1, the retry count management unit 150 subtracts 1 from the value of the retry count and notifies the parameter adjustment unit 160 of the updated retry count. If the value of the retry count is 0 when encoding of the GOP is completed, the retry count management unit 150 notifies the parameter adjustment unit 160 of the retry count being 0.

When the parameter adjustment unit 160 receives the retry count from the retry count management unit 150, the parameter adjustment unit 160 inputs the encoding parameter determined depending on the retry count to the encoding unit 120. As a result, the encoding unit 120 performs encoding of the same GOP using the encoding parameter with which the generated bit rate decreases as the number of repetitions of re-encoding increases.

As described above, in the present embodiment, a concept of the retry count whose value increases if re-encoding occurs and decreases at a time when the encoding of the GOP is completed is introduced, and the retry count management unit 150 manages the retry count. It is assumed that with respect to this retry count, there is a predetermined upper limit value such as an upper limit of "3", and re-encoding of the same GOP may be performed until the retry count reaches the upper limit value. The offset value of the quantization parameter and the filter strength of the pre-filter at the time of encoding are changed depending on the value of the retry count.

If the retry count is 0, a default encoding parameter is used. In the case in which the retry count is other than 0, for example, when the upper limit value of the retry count is 3, the encoding parameters for re-encoding corresponding to the retry count of 1, 2, and 3 may be prepared as an encoding parameter table in advance, and the encoding parameter obtained from the encoding parameter table may be used for re-encoding.

The flow of an encoding process in the present embodiment will be described with reference to the flowchart in FIG. 11. In the following description, correspondence with the flowchart of FIG. 11 like S101, S102, . . . is recited in sentences.

A process of encoding a certain GOP will be described with respect to the following three cases separately.

[Case 1]: The quantization statistic has not exceeded a predetermined threshold value in encoding of the GOP.
[Case 2]: The quantization statistic has exceeded the predetermined threshold value a plurality of times in encoding of the GOP, but the quantization statistic exceeding the threshold value could have been avoided by re-encoding.
[Case 3]: The quantization statistic has exceeded the predetermined threshold value a plurality of times in encoding of the GOP, and the quantization statistic exceeding the threshold value could not have been avoided even by re-encoding.

[Process Example of Case 1]

First, case 1 in which the quantization statistic has not exceeded a predetermined threshold value in encoding of the GOP will be described. When a picture of the GOP is input to the input buffer 110, the input buffer 110 stores the picture and inputs the picture to the encoding unit 120 as an encoding target picture (S101). Then, the encoding unit 120 encodes the picture, outputs an encoded stream to the output buffer 130 (the output buffer 130 does not output the encoded stream but stores the encoded stream), and outputs quantization parameter information about the picture to the quantization statistic calculation unit 140 (S102).

Here, for example, if the retry count is assumed to have an initial value of 0, a default encoding parameter is used for encoding, and a filtering process in a pre-filter unit 121 is applied to the encoding target picture with pre-filter strength corresponding to the default encoding parameter. Further, a DCT coefficient generated in the present picture is quantized by a quantization unit 122 using the quantization parameter in accordance with the default encoding parameter. If the retry count is greater than or equal to 1, encoding is performed using a pre-filter and a quantization process with the filter strength and the quantization parameter determined depending on the retry count.

The quantization statistic calculation unit 140 calculates a quantization statistic for the picture based on the quantization parameter information input from the encoding unit 120. In this example, since the quantization statistic has not exceeded the predetermined threshold value, the quantization statistic calculation unit 140 does not output retry information (S103). If the encoding target picture is the last picture in the input video signal, the output buffer 130 outputs stored encoded streams, and the encoding process is completed (S104). On the other hand, if the encoding target picture is the last picture of the GOP, the output buffer 130 outputs the stored encoded streams, the input buffer 110 discards the stored pictures, and the process proceeds to the encoding process of the first picture in the next GOP (S105 to S107).

If the encoding of the GOP is completed without the quantization statistic exceeding the predetermined threshold value in encoding each picture as in this case 1, the retry count management unit 150 decrements the value of the current retry count by 1 unless the retry count is 0 (S106). If the re-encoding occurs in a GOP earlier than a GOP for which encoding is currently completed, the retry count may not be 0. The retry count management unit 150 notifies the parameter adjustment unit 160 of the changed retry count, the parameter adjustment unit 160 sets the encoding parameter corresponding to the notified retry count in the encoding unit 120, and encoding of the first picture of the next GOP starts.

[Process Example of Case 2]

Next, case 2 in which the quantization statistic has exceeded the predetermined threshold value a plurality of times in encoding of the GOP, but the quantization statistic exceeding the threshold value could have been avoided by re-encoding will be described. Here, a case in which the retry count at a time when the encoding of the GOP starts is 1 and re-encoding is performed twice in the same GOP will be described.

When a picture of the GOP is input to the input buffer 110, the input buffer 110 stores the picture and inputs the picture to the encoding unit 120 as an encoding target picture (S101). Then, the encoding unit 120 encodes the picture, outputs an encoded stream to the output buffer 130 (the output buffer 130 does not output the encoded stream but stores the encoded stream), and outputs quantization parameter information about the picture to the quantization statistic calculation unit 140 (S102). Here, an encoding parameter corresponding to the retry count equal to 1 is used for encoding.

The quantization statistic calculation unit 140 calculates a quantization statistic for the picture based on the quantization parameter information input from the encoding unit 120. As a result, if the quantization statistic calculation unit 140 detects that the quantization statistic for the picture exceeds the predetermined threshold value, the quantization statistic calculation unit 140 outputs the retry information to the encoding unit 120, the retry count management unit 150, the input buffer 110, and the output buffer 130 (S103).

Since the current retry count is 1 and it has not reached an upper limit value of 3 (S108), the input buffer 110 outputs the first picture of the stored GOP that is being encoded to the encoding unit 120 (S109). On the other hand, the retry count is incremented by 1 by the retry count management unit 150, and the retry count whose value is 2 is output to the parameter adjustment unit 160 (S110).

The parameter adjustment unit 160 reads the encoding parameter in the case in which the retry count is 2 from the encoding parameter table, and sets the encoding parameter in the encoding unit 120 (S111). The output buffer 130 discards encoded streams of the GOP that is being encoded.

In the encoding unit 120, as long as the quantization statistic does not exceed the predetermined threshold value, the pictures of the GOP are sequentially input from the input buffer 110 and encoding is carried out. In this encoding, if the quantization statistic exceeds the predetermined threshold value in the same GOP again, the retry count is incremented by 1 and the retry count becomes 3 through a process similar to the above-described process. As a result, the encoding parameter is changed to an encoding parameter corresponding to the retry count of 3, and then encoding is sequentially performed on the same GOP beginning from the first picture again.

In this encoding of the GOP, if the quantization statistic has no longer exceeded the predetermined threshold value, the retry count is decremented by 1 by the retry count management unit 150, the retry count becomes 2, and encoding of the next GOP is carried out. In this case, operations of the input buffer 110 and the output buffer 130 are similar to those in the above-described example.

Figure 13:
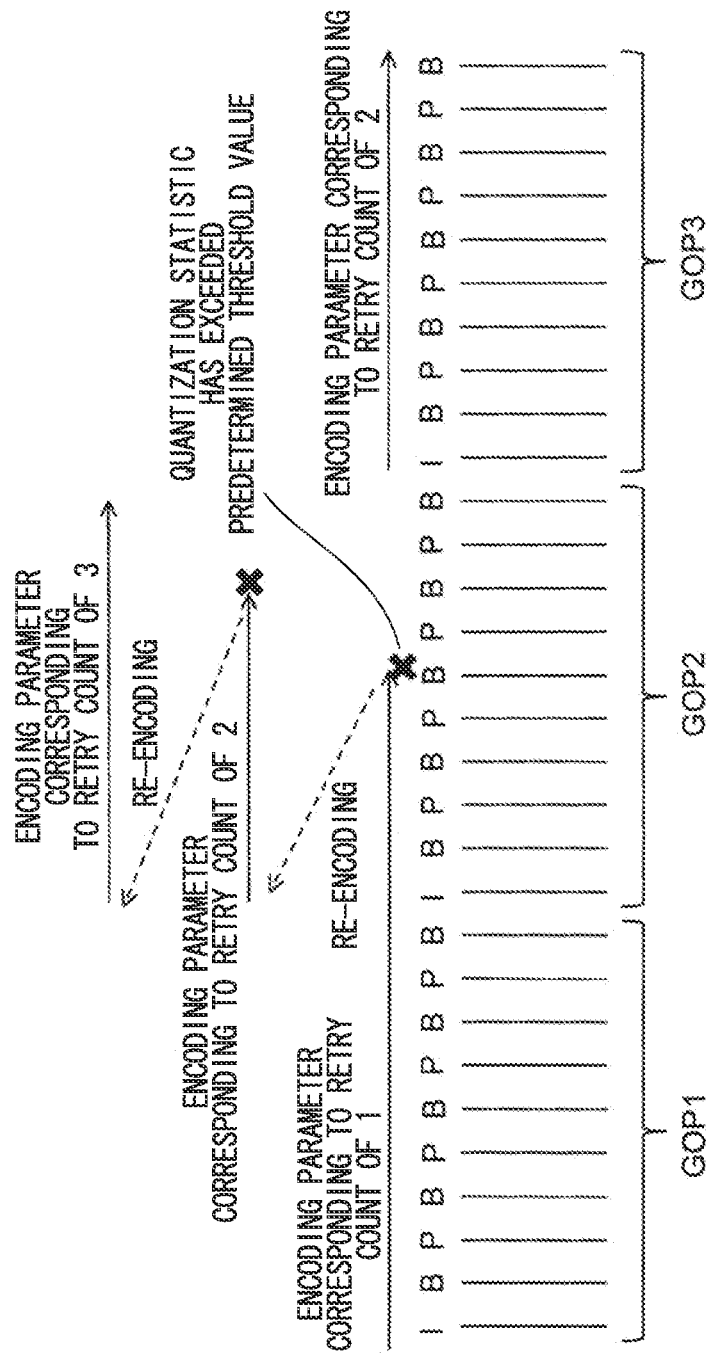
FIG. 13 is a conceptual diagram of a transition of a retry count and an encoding parameter.

A conceptual diagram of a transition of the retry count and the encoding parameter in the example of case 2 is illustrated in FIG. 13. In the example of FIG. 13, when the second GOP2 is being encoded in a state in which the retry count is 1, the quantization statistic exceeds the predetermined threshold value in encoding the sixth picture, and thus the retry count is set to 2 and GOP2 is re-encoded again from its first I picture using the encoding parameter corresponding to the retry count of 2. Even in this re-encoding, the quantization statistic exceeds the predetermined threshold value in the eighth picture and re-encoding is performed using the encoding parameter corresponding to the retry count of 3 with which the generated bit rate is small. In re-encoding performed again, since the quantization statistic has not exceeded the predetermined threshold value, the retry count is decremented by 1 when encoding of GOP2 is completed, and the process proceeds to encoding of next GOP3 using the encoding parameter corresponding to the retry count of 2.

A conceptual diagram of a transition of a CPB residual bit rate when the re-encoding is performed is as illustrated in FIG. 8. A portion indicated by a bold line is a CPB residual bit rate after re-encoding. In re-encoding, since a blurring degree is strengthened by a pre-filter and a quantization parameter is greater than the default encoding parameter, the generated bit rate is reduced and the transition of the CPB residual bit rate is that as illustrated, for example, in FIG. 8. As a result, the CPB residual bit rate in a picture for which the re-encoding has occurred increases at the time of the re-encoding, and the occurrence of great deterioration in image quality of the picture can be avoided.

Further, a conceptual diagram of a transition of the quantization statistic when re-encoding is performed is as illustrated in FIG. 9. As illustrated in FIG. 9, the quantization statistics of the pictures for which re-encoding has started increase because the encoding parameter at the time of re-encoding is changed, but this leaves a margin in the CPB residual bit rate as illustrated in FIG. 8, and thus the quantization statistic in the picture for which re-encoding has occurred becomes smaller than that before re-encoding.

[Process Example of Case 3]

Lastly, case 3 in which the quantization statistic has exceeded the predetermined threshold value a plurality of times in encoding the same GOP and the quantization statistic exceeding the threshold value could not have been avoided even by re-encoding will be described.

The retry count is assumed to reach 3 during encoding of a certain GOP, similar to case 2. Further, if the quantization statistic calculation unit 140 detects that the quantization statistic exceeds the predetermined threshold value in encoding the same GOP (S103), the retry count management unit 150 detects that the retry count reaches the upper limit value (S108), and thus re-encoding is not performed, and the encoding process is carried out.

A conceptual diagram of a transition of the quantization statistic when re-encoding has been performed and the quantization statistic exceeding the threshold value could not have been avoided even by re-encoding is as illustrated in FIG. 10. Case 3 may occur, for example, when the quantization statistic is already large at the head of the GOP from which the re-encoding starts, as illustrated in FIG. 10.

It is to be noted that as the quantization parameter at the time of re-encoding is greater than that at the time of normal encoding, at the time of re-encoding, the quantization statistic may exceed the threshold value in a picture earlier than a picture causing the re-encoding in the order of encoding. In order to reduce the possibility of such exceeding, an offset value of the quantization parameter corresponding to each value of the retry count may be determined as follows.

An offset value of the quantization parameter (which is a predetermined value determined in advance) corresponding to the maximum value of the retry count (3 in the above-described embodiment) is added to the quantization parameter at the time of normal encoding, and if a resultant value exceeds the threshold value of the quantization statistic, the offset value of the quantization parameter corresponding to the maximum value of the retry count is modified to be equal to the threshold value. Then, offset values corresponding to the other values of the retry count are determined based on such an offset value (e.g., in the above-described embodiment, when the offset value corresponding to the maximum value of the retry count is A, offset values of the retry count of 0, 1 and 2 may be determined by equally dividing A, like 0, A/3, and 2×(A/3)). However, if the quantization parameter at the time of normal encoding is greater than or equal to the quantization statistic, the offset values corresponding to all the values of the retry count are set to 0 so that the quantization parameter at the time of re-encoding is not smaller than that at the time of normal encoding. Further, if a value obtained by adding the predetermined offset value of the quantization parameter corresponding to the maximum value of the retry count to the quantization parameter at the time of normal encoding does not exceed the threshold value of the quantization statistic, the offset values corresponding to the other values of the retry count may be determined based on such an offset value.

Third Embodiment

Figure 14:
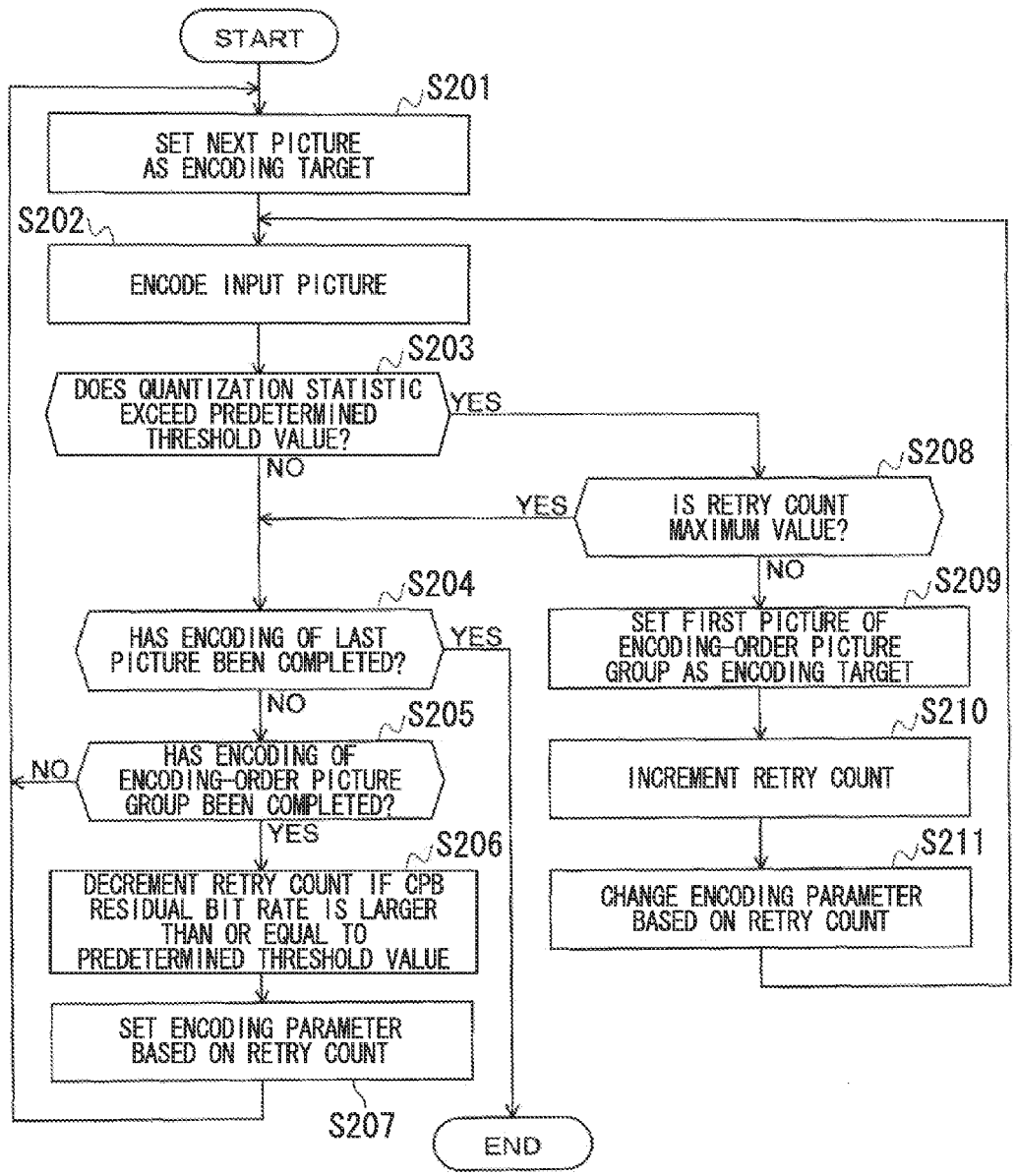
FIG. 14 is a process flowchart of a video encoding control method in accordance with a third embodiment of the present invention.

Hereinafter, a third embodiment of the present invention will be described in detail with reference to the drawings. FIG. 14 is a process flowchart illustrating a video encoding control method in accordance with the present embodiment.

First, a picture next to a picture for which encoding has ended in an input video signal is set as an encoding target (step S201). The input picture set as the encoding target is encoded using H.264 or any of other predetermined encoding schemes (step S202). A determination is made as to whether or not a quantization statistic of the input picture when the input picture is encoded exceeds a predetermined threshold value (step S203), and if the quantization statistic exceeds the predetermined threshold value, the process proceeds to step S208.

If the quantization statistic does not exceed the predetermined threshold value, a determination is made as to whether or not encoding of the last picture is completed (step S204), and if encoding of the last picture is completed, the encoding process ends.

Otherwise, a determination is made as to whether or not encoding of an encoding-order picture group is completed (step S205). If the encoding of the encoding-order picture group is not completed, the process returns to step S201, and a similar encoding process continues for the next picture.

If encoding of the encoding-order picture group is completed, a determination is made as to whether or not the following conditions are satisfied, and a retry count is decremented by 1 only if the conditions are satisfied (step S206).

Condition 1: The retry count is greater than or equal to 1.
Condition 2: A CPB residual bit rate is larger than or equal to a predetermined threshold value.

If the retry count is 0 or if the CPB residual bit rate is smaller than the predetermined threshold value, the retry count is not decremented and is maintained as an original value.

Thereafter, the encoding parameter that is determined depending on the retry count in advance is set based on the retry count (step S207), the process returns to step S201, and the encoding process is performed from the first picture of the next encoding-order picture group.

If it is detected in step S203 that the quantization statistic exceeds the predetermined threshold value, a determination is made as to whether or not the value of the current retry count has reached a predetermined maximum value (step S208). If the retry count is the maximum value, no further re-encoding is performed, the process proceeds to step S204, and the encoding process is just continued.

If the retry count has not reached the maximum value, the first picture in the current encoding-order picture group is set as an encoding target in order to re-encode the current encoding-order picture group (step S209). Then, the retry count is incremented by 1 (step S210). Thereafter, one or both of two encoding parameters (a quantization parameter and pre-filter strength) are changed based on the retry count (for the quantization parameter, the step size is changed to be greater, and for the filter strength, a blurring degree is changed to be greater) (step S211), the process returns to step S202, and the encoding-order picture group that is being encoded is re-encoded.

In the present embodiment, basically, the encoding process is performed once, and each picture in the encoding-order picture group (e.g., a GOP) is repetitively encoded only if the re-encoding conditions are satisfied while reducing the generated bit rate in a stepwise manner until the re-encoding conditions are not satisfied, unlike conventional art b in which all frames of an input video are twice encoded. At the time of second and subsequent encoding, the encoding is performed using an encoding parameter with which the generated bit rate is reduced and which is determined depending on the retry count. Accordingly, a calculation amount can be reduced and deterioration in image quality due to re-encoding can be reduced, as compared to conventional art b in which all pictures of an input video are twice encoded.

As described above, the present embodiment changes an encoding parameter depending on the retry count at the time of re-encoding. Here, it is assumed that a pre-filter is applied to the input video at the time of encoding, and encoding parameters to be changed are a quantization parameter and pre-filter strength. Both of the two encoding parameters may be changed or only any one of them may be changed.

For the quantization parameter, a predetermined offset value increasing in a stepwise manner depending on the retry count is added to the value of a quantization parameter determined at the time of normal encoding, and re-encoding is performed using such a greater quantization parameter.

For the pre-filter, it is assumed that a Gaussian filter is used in the present embodiment. The Gaussian filter can be produced by sampling a Gaussian distribution shown in the following equation with respect to x and y.

$$g(x,y) = \{1/(2\pi\sigma^2)\} \times \exp\{-(x^2+y^2)/(2\sigma^2)\}$$

As can be seen from the above equation, a blurring degree increases as the value of a increases. Since a high frequency component is reduced as the blurring degree increases, the generated bit rate at the time of encoding is reduced. Details of the Gaussian filter are described, for example, in Non-Patent Document 2 described above.

When $\sigma$ is equal to 0, the Gaussian filter is not applied and for example, a default encoding parameter $\sigma_0=0$ is used, and an encoding parameter for re-encoding $\sigma_c$ is used when the value of the retry count is c. The value of $\sigma_c$ becomes greater as the value of c becomes larger. $0<\sigma_1<\sigma_2<\ldots$ is satisfied. It is to be noted that, in the present embodiment, the type of a low pass filter does not matter. Further, for example, it is acceptable to employ the structure in which the default encoding parameter $\sigma_0$ is changed depending on the degree of complexity of each picture, and $\sigma_c$ is the sum of a predetermined offset and $\sigma_{c-1}$.

Further, in the present embodiment, it is assumed that the average value of quantization parameters of macro blocks of a picture is used as the quantization statistic.

In an embodiment that will be described below, it is assumed that encoding is performed using an encoding scheme in accordance with the H.264 standard. Further, it is assumed that the encoding-order picture group is a GOP. A conceptual diagram of the GOP when encoded is as illustrated in FIG. 5. It is assumed that one GOP includes 10 pictures, and a B picture and a P picture are alternately lined up in a display order, with an I picture being the first picture.

Figure 15:
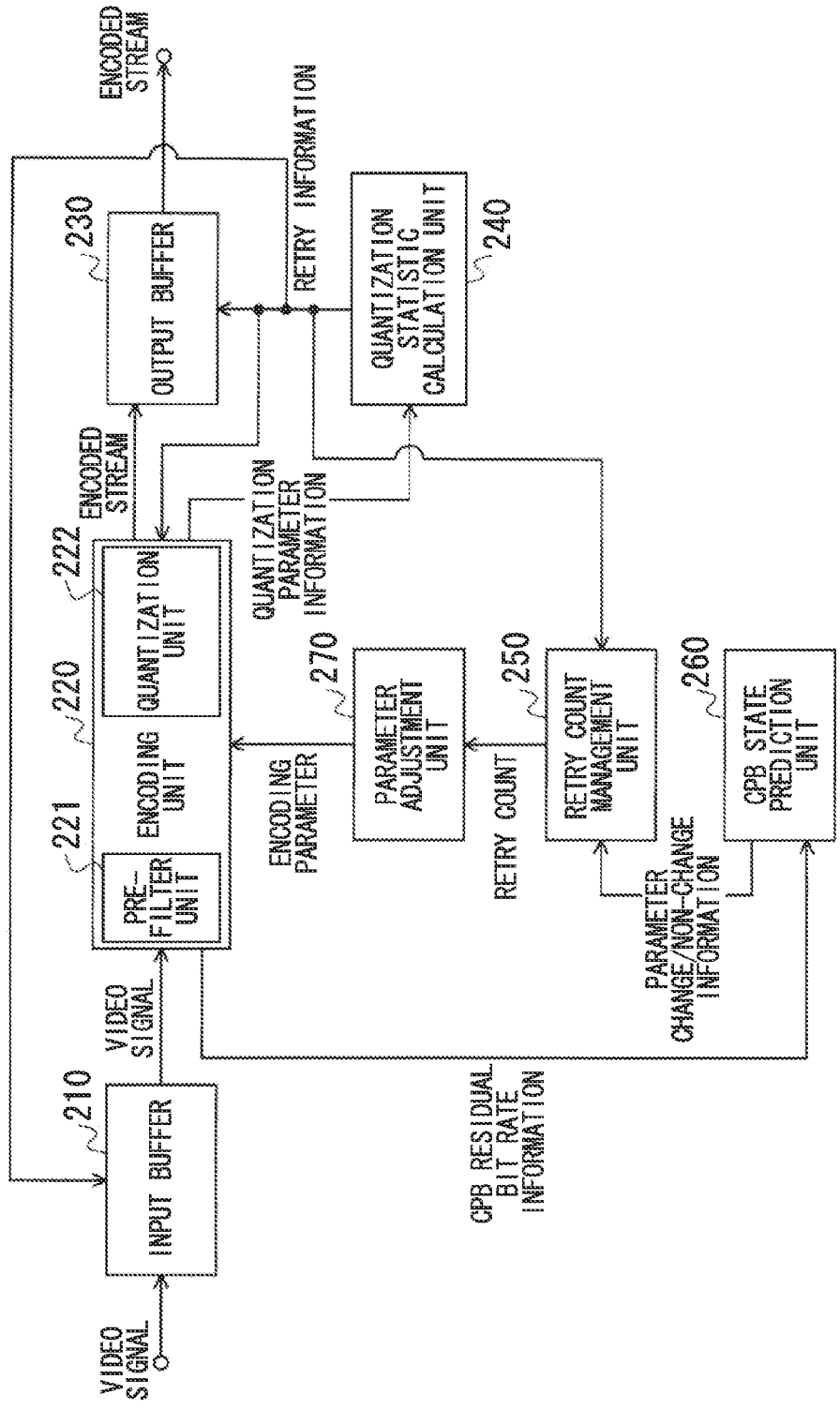
FIG. 15 is a diagram illustrating a configuration example of a video encoding apparatus in accordance with the third embodiment of the present invention.

An example of the configuration of the apparatus of the present embodiment is illustrated in FIG. 15. An input buffer 210 stores an input video signal and outputs a video signal as an encoding target to an encoding unit 220. Further, if the input buffer 210 receives information indicating that re-encoding is to be performed (retry information) due to the quantization statistic of a picture exceeding the predetermined threshold value, from a quantization statistic calculation unit 240, which will be described below, the input buffer 210 outputs the video signal from the first picture in a GOP that is being encoded, to the encoding unit 220 again. Further, if the encoding of the GOP is completed without reception of the retry information, the input buffer 210 discards the stored video signal of the GOP.

The encoding unit 220 encodes the video signal input from the input buffer 210, and outputs an encoded stream to an output buffer 230. Further, the encoding unit 220 outputs a quantization parameter (quantization parameter information) of each macro block when having encoded the input video signal to the quantization statistic calculation unit 240. Further, the encoding unit 220 notifies a CPB state prediction unit 260 of CPB residual bit rate information at a time when the encoding of the GOP is completed.

Further, if the encoding unit 220 receives the retry information from the quantization statistic calculation unit 240, the video signal from the first picture in the GOP that is being encoded is input from the input buffer 210 again and an encoding parameter for re-encoding is input from a parameter adjustment unit 270, and thus the encoding unit 220 performs re-encoding using the input encoding parameter for re-encoding.

The output buffer 230 outputs encoded streams of the GOP when all the encoded streams of the GOP have been stored, and the output buffer 230 discards the stored encoded streams of the GOP that is being encoded if the retry information is received from the quantization statistic calculation unit 240.

The quantization statistic calculation unit 240 obtains a quantization statistic which changes in units of pictures using the quantization parameter information input from the encoding unit 220. Then, if the quantization statistic exceeds the predetermined threshold value, the quantization statistic calculation unit 240 outputs the retry information to the input buffer 210, the encoding unit 220, a retry count management unit 250, and the output buffer 230 in order to notify that the quantization statistic exceeds the predetermined threshold value.

If the retry count management unit 250 receives the retry information from the quantization statistic calculation unit 240, the retry count management unit 250 adds 1 to the value of the current retry count and notifies the parameter adjustment unit 270 of the updated retry count. Further, in the case in which encoding of the GOP that is being currently encoded is completed without reception of the retry information from the quantization statistic calculation unit 240, if the value of the retry count is greater than or equal to 1, the retry count management unit 250 subtracts 1 from the value of the retry count and notifies the parameter adjustment unit 270 of the updated retry count. However, if parameter change/non-change information notified from the CPB state prediction unit 260 indicates "no parameter change", the retry count management unit 250 does not subtract 1 from the retry count even if the retry count is greater than or equal to 1. Further, if the retry count is 0, the retry count management unit 250 also does not subtract 1 from the retry count, and notifies the parameter adjustment unit 270 of the value of the current retry count.

The CPB state prediction unit 260 determines whether or not a CPB residual bit rate is larger than or equal to the predetermined threshold value based on the CPB residual bit rate information notified from the encoding unit 220 at a time when the encoding of the GOP is completed, and if the CPB residual bit rate is larger than or equal to the threshold value, the CPB state prediction unit 260 notifies the retry count management unit 250 that the encoding parameter is to be changed, as the parameter change/non-change information. In contrast, if the CPB residual bit rate is smaller than the threshold value, the CPB state prediction unit 260 notifies the retry count management unit 250 that the encoding parameter is not to be changed, as the parameter change/non-change information.

When the parameter adjustment unit 270 receives the retry count from the retry count management unit 250, the parameter adjustment unit 270 inputs the encoding parameter determined depending on the retry count to the encoding unit 220. As a result, the encoding unit 220 performs encoding of the same GOP using the encoding parameter with which the generated bit rate decreases as the number of repetitions of re-encoding increases.

As described above, in the present embodiment, a concept of the retry count whose value increases if re-encoding occurs and decreases at a time when the encoding of the GOP is completed is introduced, and the retry count management unit 250 manages the retry count. It is assumed that with respect to this retry count, there is a predetermined upper limit value, such as an upper limit of "3", and re-encoding of the same GOP may be performed until the retry count reaches the upper limit value. The offset value of the quantization parameter and the filter strength of the pre-filter at the time of encoding are changed depending on the value of the retry count.

If the retry count is 0, a default encoding parameter is used. In the case in which the retry count is other than 0, for example, when the upper limit value of the retry count is 3, the encoding parameters for re-encoding corresponding to the retry count of 1, 2, and 3 may be prepared as an encoding parameter table in advance, and the encoding parameter obtained from the encoding parameter table may be used for re-encoding.

The flow of an encoding process in the present embodiment will be described with reference to the flowchart of FIG. 14. In the following description, correspondence with the flowchart of FIG. 14 like S201, S202, . . . is recited in sentences.

A process of encoding a certain GOP will be described with respect to the following three cases separately.

[Case 1]: The quantization statistic has not exceeded a predetermined threshold value in encoding of the GOP.

[Case 2]: The quantization statistic has exceeded the predetermined threshold value a plurality of times in encoding of the GOP, but the quantization statistic exceeding the threshold value could have been avoided by re-encoding.

[Case 3]: The quantization statistic has exceeded the predetermined threshold value a plurality of times in encoding of the GOP, and the quantization statistic exceeding the threshold value could not have been avoided even by re-encoding.

[Process Example of Case 1]

First, case 1 in which the quantization statistic has not exceeded a predetermined threshold value in encoding of the GOP will be described. When a picture of the GOP is input to the input buffer 210, the input buffer 210 stores the picture and inputs the picture to the encoding unit 220 as an encoding target picture (S201). Then, the encoding unit 220 encodes the picture, outputs an encoded stream to the output buffer 230 (the output buffer 230 does not output the encoded stream but stores the encoded stream), and outputs quantization parameter information about the picture to the quantization statistic calculation unit 240 (S202).

Here, for example, when the retry count is assumed to have an initial value of 0, a default encoding parameter is used for encoding, and a filtering process in a pre-filter unit 221 is applied to the encoding target picture with pre-filter strength corresponding to the default encoding parameter. Further, a DCT coefficient generated in the present picture is quantized by a quantization unit 222 using the quantization parameter in accordance with the default encoding parameter. If the retry count is greater than or equal to 1, encoding is performed using a pre-filter and a quantization process with the filter strength and the quantization parameter determined depending on the retry count.

The quantization statistic calculation unit 240 calculates a quantization statistic for the picture based on the quantization parameter information input from the encoding unit 220. In this example, since the quantization statistic has not exceeded the predetermined threshold value, the quantization statistic calculation unit 240 does not output retry information (S203). If the encoding target picture is the last picture in the input video signal, the output buffer 230 outputs stored encoded streams, and the encoding process is completed (S204). On the other hand, if the encoding target picture is the last picture of the GOP, the output buffer 230 outputs the stored encoded streams, the input buffer 210 discards the stored pictures, and the process proceeds to the encoding process of the first picture in the next GOP (S205 to S207).

If the encoding of the GOP is completed without the quantization statistic exceeding the predetermined threshold value as in this case 1, the encoding unit 220 notifies the CPB state prediction unit 260 of the CPB residual bit rate information at a time when the encoding of the GOP is completed. The CPB state prediction unit 260 determines whether or not the CPB residual bit rate is larger than or equal to the predetermined threshold value, and if the CPB residual bit rate is larger than or equal to the threshold value, the CPB state prediction unit 260 notifies the retry count management unit 250 that the encoding parameter is to be changed, as the parameter change/non-change information. In contrast, if the CPB residual bit rate is smaller than the threshold value, the CPB state prediction unit 260 notifies the retry count management unit 250 that the encoding parameter is not to be changed, as the parameter change/non-change information. The retry count management unit 250 decrements the value of the current retry count by 1 only if the parameter change/non-change information indicates that the encoding parameter is to be changed (S206).

In other words, if the re-encoding occurs in a GOP earlier than the GOP for which encoding is currently completed, the retry count may not be 0. In this case, the retry count management unit 250 changes the retry count in accordance with the notification of the parameter change/non-change information from the CPB state prediction unit 260, and notifies the parameter adjustment unit 270 of the changed retry count. The parameter adjustment unit 270 sets the encoding parameter corresponding to the notified retry count in the encoding unit 220, and encoding of the first picture of the next GOP starts.

[Process Example of Case 2]

Next, case 2 in which the quantization statistic has exceeded the predetermined threshold value a plurality of times in encoding of the GOP, but the quantization statistic exceeding the threshold value could have been avoided by re-encoding will be described. Here, a case in which the retry count at a time when the encoding of the GOP starts is 1 and the re-encoding is performed twice in the same GOP will be described.

When a picture of the GOP is input to the input buffer 210, the input buffer 210 stores the picture and inputs the picture to the encoding unit 220 as an encoding target picture (S201). Then, the encoding unit 220 encodes the picture, outputs an encoded stream to the output buffer 230 (the output buffer 230 does not output the encoded stream but stores the encoded stream), and outputs quantization parameter information about the picture to the quantization statistic calculation unit 240 (S202). Here, an encoding parameter corresponding to the retry count equal to 1 is used for encoding.

The quantization statistic calculation unit 240 calculates a quantization statistic for the picture based on the quantization parameter information input from the encoding unit 220. As a result, if the quantization statistic calculation unit 240 detects that the quantization statistic for the picture exceeds the predetermined threshold value, the quantization statistic calculation unit 240 outputs the retry information to the encoding unit 220, the retry count management unit 250, the input buffer 210, and the output buffer 230 (S203).

Since the current retry count is 1 and it has not reached an upper limit value of 3 (S208), the input buffer 210 outputs the first picture of the stored GOP that is being encoded to the encoding unit 220 (S209). On the other hand, the retry count is incremented by 1 by the retry count management unit 250, and the retry count whose value is 2 is output to the parameter adjustment unit 270 (S210).

The parameter adjustment unit 270 reads the encoding parameter in the case in which the retry count is 2 from the encoding parameter table, and sets the encoding parameter in the encoding unit 220 (S211). The output buffer 230 discards encoded streams of the GOP that is being encoded.

In the encoding unit 220, as long as the quantization statistic does not exceed the predetermined threshold value, the pictures of the GOP are sequentially input from the input buffer 210 and encoding is carried out. In this encoding, if the quantization statistic exceeds the predetermined threshold value in the same GOP again, the retry count is incremented by 1 and the retry count becomes 3 through a process similar to the above-described process. As a result, the encoding parameter is changed to an encoding parameter corresponding to the retry count of 3, and then encoding is sequentially performed on the same GOP beginning from the first picture again.

In this encoding of the GOP, if the quantization statistic has no longer exceeded the predetermined threshold value, the encoding unit 220 notifies the CPB state prediction unit 260 of the CPB residual bit rate information. If the CPB residual bit rate is larger than or equal to the predetermined threshold value, the CPB state prediction unit 260 sets the parameter change/non-change information as "change"; otherwise, the CPB state prediction unit 260 sets the parameter change/non-change information as "no change", and the CPB state prediction unit 260 notifies the retry count management unit 250 of the parameter change/non-change information.

If the notified parameter change/non-change information is "change", the retry count is decremented by 1 by the retry count management unit 250, the retry count becomes 2, and encoding of the next GOP is carried out. In this case, operations of the input buffer 210 and the output buffer 230 are similar to those in the above-described example. If the parameter change information is "no change", the retry count is maintained as 3, and encoding of the next GOP is carried out.

A conceptual diagram of a transition of the retry count and the encoding parameter in the example of case 2 is illustrated in FIG. 13. In the example of FIG. 13, when the second GOP2 is being encoded in a state in which the retry count is 1, the quantization statistic exceeds the predetermined threshold value in encoding the sixth picture, and thus the retry count is set to 2, and GOP2 is re-encoded again from its first I picture using the encoding parameter corresponding to the retry count of 2. Even in this re-encoding, the quantization statistic exceeds the predetermined threshold value in the eighth picture, and re-encoding is performed using an encoding parameter corresponding to the retry count of 3 with which the generated bit rate is small.

Since the quantization statistic does not exceed the predetermined threshold value in performing re-encoding again, a determination is made as to whether or not the CPB residual bit rate is larger than or equal to the predetermined threshold value. Here, since the CPB residual bit rate is larger than or equal to the predetermined threshold value, the retry count is decremented by 1 when encoding of GOP2 is completed, and the process proceeds to encoding of next GOP3 using the encoding parameter corresponding to the retry count of 2.

A conceptual diagram of a transition of a CPB residual bit rate when the re-encoding is performed is illustrated in FIG. 8. A portion indicated by a bold line is a CPB residual bit rate after re-encoding. In re-encoding, since a blurring degree is strengthened by a pre-filter and a quantization parameter is greater than the default encoding parameter, the generated bit rate is reduced and the transition of the CPB residual bit rate is that as illustrated, for example, in FIG. 8. As a result, the CPB residual bit rate in a picture for which the re-encoding has occurred increases at the time of the re-encoding, and the occurrence of great deterioration in image quality of the picture can be avoided.

Further, a conceptual diagram of a transition of the quantization statistic when re-encoding is performed is as illustrated in FIG. 9. As illustrated in FIG. 9, the quantization statistics of the pictures for which re-encoding has started increase because the encoding parameter at the time of re-encoding is changed, but this leaves a margin in the CPB residual bit rate as illustrated in FIG. 8, and thus the quantization statistic in the picture for which re-encoding has occurred becomes smaller than that before re-encoding.

[Process Example of Case 3]

Lastly, case 3 in which the quantization statistic has exceeded the predetermined threshold value a plurality of times in encoding the same GOP and the quantization statistic exceeding the threshold value could not have been avoided even by re-encoding will be described.

The retry count is assumed to reach 3 during encoding of a certain GOP, similar to case 2. Further, if the quantization statistic calculation unit 240 detects that the quantization statistic exceeds the predetermined threshold value in encoding the same GOP (S203), the retry count management unit 250 detects that the retry count reaches the upper limit value (S208), and thus re-encoding is not performed, and the encoding process is carried out.

A conceptual diagram of a transition of the quantization statistic when re-encoding has been performed and the quantization statistic exceeding the threshold value could not have been avoided even by the re-encoding is as illustrated in FIG. 10. Case 3 may occur, for example, when the quantization statistic is already large at the head of the GOP from which the re-encoding starts, as illustrated in FIG. 10.

It is to be noted that as the quantization parameter at the time of re-encoding is greater than that at the time of normal encoding, at the time of re-encoding, the quantization statistic may exceed the threshold value in a picture earlier than a picture causing the re-encoding in the order of encoding. In order to reduce the possibility of such exceeding, an offset value of the quantization parameter corresponding to each value of the retry count may be determined as follows.

An offset value of the quantization parameter (which is a predetermined value determined in advance) corresponding to the maximum value of the retry count (3 in the above-described embodiment) is added to the quantization parameter at the time of normal encoding, and if a resultant value exceeds the threshold value of the quantization statistic, the offset value of the quantization parameter corresponding to the maximum value of the retry count is modified to be equal to the threshold value. Then, offset values corresponding to the other values of the retry count are determined based on such an offset value (e.g., in the above-described embodiment, when the offset value corresponding to the maximum value of the retry count is A, offset values of the retry count of 0, 1 and 2 may be determined by equally dividing A, like 0, A/3, and 2×(A/3)). However, if the quantization parameter at the time of normal encoding is greater than or equal to the quantization statistic, the offset values corresponding to all the values of the retry count are set to 0 so that the quantization parameter at the time of re-encoding is not smaller than that at the time of normal encoding. Further, if a value obtained by adding the predetermined offset value of the quantization parameter corresponding to the maximum value of the retry count to the quantization parameter at the time of normal encoding does not exceed the threshold value of the quantization statistic, the offset values corresponding to the other values of the retry count may be determined based on such an offset value.

Fourth Embodiment

Figure 16:
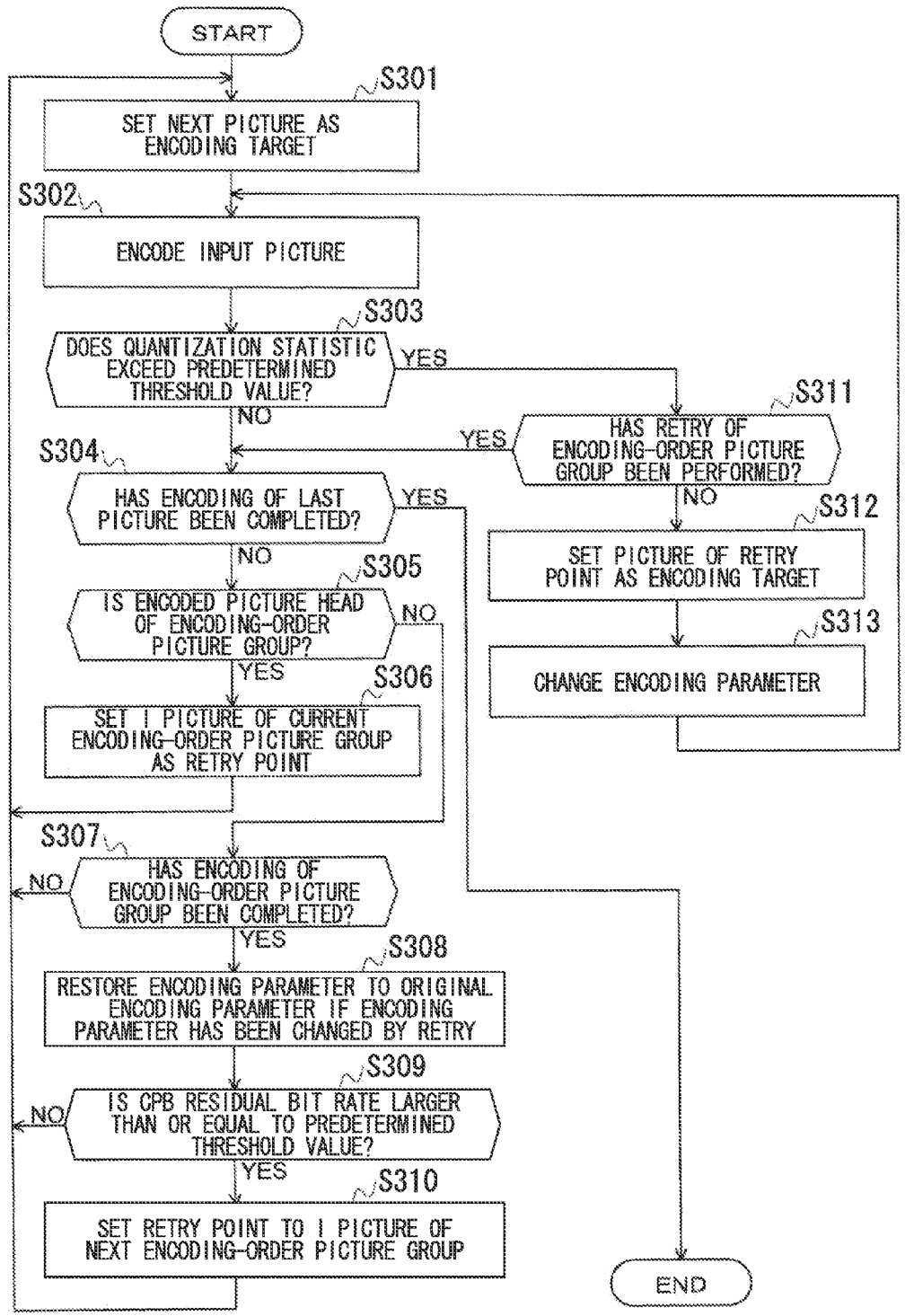
FIG. 16 is a process flowchart illustrating a video encoding control method in accordance with a fourth embodiment of the present invention.

Hereinafter, a fourth embodiment of the present invention will be described in detail with reference to the drawings. FIG. 16 is a process flowchart illustrating a video encoding control method in accordance with the present embodiment.

First, a picture next to a picture for which encoding has ended in an input video signal is set as an encoding target (step S301). The input picture set as the encoding target is encoded using H.264 or any of other predetermined encoding schemes (step S302). A determination is made as to whether or not a quantization statistic of the input picture when the input picture is encoded exceeds a predetermined threshold value (step S303), and if the quantization statistic exceeds the predetermined threshold value, the process proceeds to step S311.

If the quantization statistic does not exceed the predetermined threshold value, a determination is made as to whether or not encoding of the last picture is completed (step S304), and if encoding of the last picture is completed, the encoding process ends.

Otherwise, a determination is made as to whether or not the encoded picture is the first I picture of the encoding-order picture group (step S305). If the currently encoded picture is the first I picture of the encoding-order picture group, the I picture is set as a retry point (step S306). This is a process for updating the retry point after it has been confirmed that a re-encoding condition (the quantization statistic exceeds the predetermined threshold value) is not satisfied in the next I picture, because the retry point is still set to the head of an immediately previous encoding-order picture group if a CPB residual bit rate is smaller than a predetermined threshold value in step S309, which will be described below. It is to be noted that if the retry point is set in step S310, the retry point is set to the same position again, but a disadvantage does not occur on the process. Then, the process returns to step S301, and encoding of the next picture is carried out.

If the encoded picture is not the head of the encoding-order picture group, a determination is made as to whether or not encoding of the encoding-order picture group is completed (step S307). If the encoding of the encoding-order picture group is not completed, the process returns to step S301, and the encoding process continues to be similarly performed on the next picture. If the encoding of the encoding-order picture group is completed, in the case in which the encoding parameter has been changed by re-encoding of the encoding-order picture group (retry), the encoding parameter is restored to a value at the time of normal encoding (step S308).

Further, a determination is made as to whether or not the CPB residual bit rate is larger than or equal to the predetermined threshold value at a time when the encoding of the encoding-order picture group is completed (step S309). If the CPB residual bit rate is larger than or equal to the predetermined threshold value, the retry point is set to the first I picture of the next encoding-order picture group (step S310). Then, the process returns to step S301, and encoding of the next encoding-order picture group is carried out sequentially from its head.

If the CPB residual bit rate is smaller than the predetermined threshold value, the retry point is not updated, the process returns to step S301, and encoding of the next encoding-order picture group is carried out.

If it is detected in step S303 that the quantization statistic exceeds the predetermined threshold value, a determination is made as to whether or not the current encoding-order picture group has been re-encoded (the retry has already been performed) (step S311). If the retry has already been performed, no further re-encoding is performed, the process proceeds to step S304, and the encoding process is just continued.

If the retry has not yet been performed, the picture at the retry point is set as an encoding target in order to re-encode the current encoding-order picture group (step S312). Then, one or both of two encoding parameters (a quantization parameter and pre-filter strength) are changed (for the quantization parameter, the step size is changed to be greater, and for the filter strength, a blurring degree is changed to be greater) (step S313), the process returns to step S302, and the encoding-order picture group that is being encoded is re-encoded.

In other words, the encoding-order picture group (e.g., a GOP) is twice encoded only if the quantization statistic exceeds the predetermined threshold value, unlike conventional art b in which all frames of an input video are twice encoded. At the time of second encoding, encoding is performed with an encoding parameter to reduce the generated bit rate. Only if the re-encoding conditions are satisfied, only an encoding-order picture group satisfying the conditions is re-encoded (it is to be noted that exceptionally, re-encoding may be performed from an immediately previous encoding-order picture group), thereby reducing deterioration in image quality while suppressing CPB underflow. Accordingly, a calculation amount can be reduced as compared to conventional art b in which all pictures of an input video are twice encoded.

Figure 17:
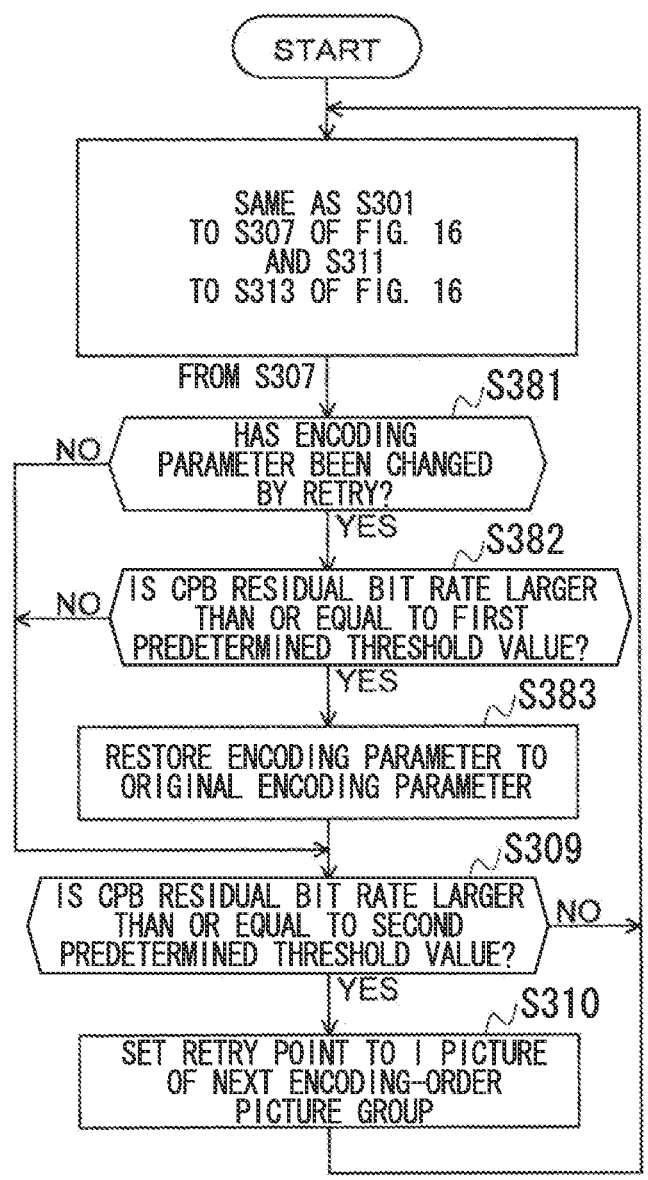
FIG. 17 is a process flowchart of a variant of the video encoding control method in accordance with the fourth embodiment of the present invention.

FIG. 17 is a process flowchart illustrating a video encoding control method in accordance with a variant of the present embodiment. The present embodiment may be implemented by replacing the process of step S308 illustrated in FIG. 16 with a process of steps S381 to S383 illustrated in FIG. 17. Processes other than step S308 are substantially similar to those in FIG. 16.

Following the process of step S307 of FIG. 16, a determination is made as to whether or not the encoding parameter has been changed by the retry (step S381). If the encoding parameter has not been changed by the retry, the process proceeds to step S309. If the encoding parameter has been changed by the retry, a determination is made as to whether or not the CPB residual bit rate is larger than or equal to a first predetermined threshold value (step S382). If the CPB residual bit rate is smaller than the predetermined threshold value, the encoding parameter is maintained as the encoding parameter used for the re-encoding, and only if the CPB residual bit rate is larger than or equal to the predetermined threshold value, the encoding parameter is restored to an original default encoding parameter (step S383). Then, the process proceeds to step S309 in which a determination is made as to whether or not the CPB residual bit rate is larger than or equal to a second predetermined threshold value, and this process and the process of step S310 are similar to the processes of steps S309 and S310 illustrated in FIG. 16. It is to be noted that the first threshold value and the second threshold value may be the same values or different values.

As described above, in the variant illustrated in FIG. 17, the encoding parameter is restored to the value at the time of normal encoding only if the CPB residual bit rate exceeds a predetermined amount at a time when the encoding of the encoding-order picture group is completed. This is for the following reason. Even if the CPB residual bit rate is small when encoding of the encoding-order picture group is completed, restoration of the encoding parameter to the value at the time of normal encoding further increases the generated bit rate, so that the re-encoding conditions are highly likely to be satisfied in encoding pictures in the next encoding-order picture group. In the process of FIG. 17, if the CPB residual bit rate is small, the encoding parameter is not changed, so that occurrence of the re-encoding is suppressed in encoding of the next encoding-order picture group and a calculation amount is further reduced, as compared to the process of FIG. 16.

As described above, the present embodiment changes the encoding parameter at the time of re-encoding. Here, it is assumed that a pre-filter is applied to the input video at the time of encoding, and the encoding parameters to be changed are a quantization parameter and pre-filter strength. Both of the two encoding parameters may be changed or only any one of them may be changed.

For the quantization parameter, a predetermined offset value is added to the value of a quantization parameter at the time of normal encoding, and re-encoding is performed using such a greater quantization parameter.

For the pre-filter, it is assumed that a Gaussian filter is used in the present embodiment. The Gaussian filter can be produced by sampling a Gaussian distribution shown in the following equation with respect to x and y.

$$g(x,y)=\{1/(2\pi\sigma^2)\}\times\exp\{-(x^2+y^2)/(2\sigma^2)\}$$

As can be seen from the above equation, a blurring degree increases as the value of σ increases. Since a high frequency component is reduced as the blurring degree increases, the generated bit rate at the time of encoding is reduced. Details of the Gaussian filter are described, for example, in Non-Patent Document 2 described above.

When σ is equal to 0, the Gaussian filter is not applied and for example, a default encoding parameter $\sigma_0=0$ and an encoding parameter for re-encoding $\sigma_1>0$ are used. It is to be noted that, in the present embodiment, the type of a low pass filter does not matter. Further, how to strengthen the blurring degree at the time of re-encoding may be arbitrarily determined in advance. For example, it is acceptable to employ the structure in which the default encoding parameter $\sigma_0$ is changed depending on the degree of complexity of each picture, and $\sigma_1$ is set to the sum of a predetermined offset and $\sigma_0$.

Further, in the present embodiment, it is assumed that the average value of quantization parameters of macro blocks of a picture is used as the quantization statistic.

For encoding, it is assumed that encoding in accordance with the H.264 standard is performed. Further, in the present embodiment, it is assumed that the encoding-order picture group is a GOP. A conceptual diagram of the GOP when encoded is as illustrated in FIG. 5. It is assumed that one GOP includes 10 pictures, and a B picture and a P picture are alternately lined up in a display order, with an I picture being the first picture.

Figure 18:
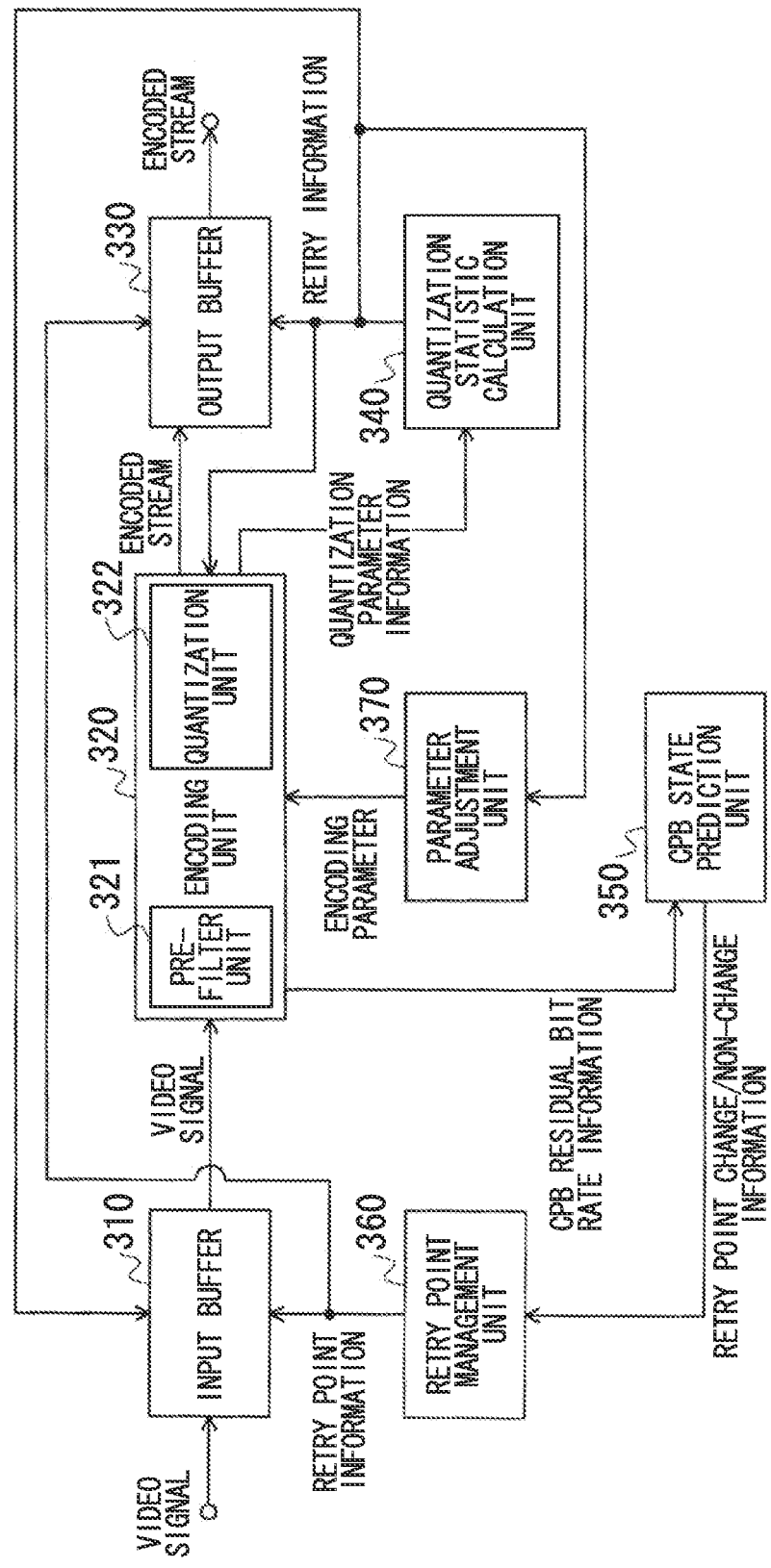
FIG. 18 is a diagram illustrating a configuration example of a video encoding apparatus in accordance with the fourth embodiment of the present invention.

An example of the configuration of the apparatus of the present embodiment is illustrated in FIG. 18. An input buffer 310 stores an input video signal and outputs a video signal that is an encoding target to an encoding unit 320. Further, if the input buffer 310 receives information indicating that re-encoding is to be performed (retry information) due to the quantization statistic of a picture exceeding the predetermined threshold value, from a quantization statistic calculation unit 340, which will be described below, the input buffer 310 outputs the video signal from the first picture in a GOP set as a retry point to the encoding unit 320 again. Further, if retry point information is input from a retry point management unit 360, the input buffer 310 discards the stored video signal of the GOP earlier than the retry point.

The encoding unit 320 encodes the video signal input from the input buffer 310, and outputs an encoded stream to an output buffer 330. Further, the encoding unit 320 outputs a quantization parameter (quantization parameter information) generated when the input video signal is encoded, to the quantization statistic calculation unit 340. Further, if the encoding unit 320 receives the retry information from the quantization statistic calculation unit 340, the video signal from the first picture in the GOP indicated by the retry point is input from the input buffer 310 again, and an encoding parameter for re-encoding is input from a parameter adjustment unit 370, and thus the encoding unit 220 performs re-encoding using the input encoding parameter for re-encoding. Further, the encoding unit 320 outputs CPB residual bit rate information at a time when the encoding of the GOP is completed to a CPB state prediction unit 350.

The output buffer 330 outputs encoded streams determined to be output, that is, encoded streams as an encoding result determined not to require re-encoding based on the retry point information from the retry point management unit 360. In contrast, if the output buffer 330 receives the retry information from the quantization statistic calculation unit 340, the output buffer 330 discards the stored encoded streams of the GOP that is being encoded.

The quantization statistic calculation unit 340 obtains a quantization statistic which changes in units of pictures using the quantization parameter information input from the encoding unit 320. Then, if the quantization statistic exceeds the predetermined threshold value, the quantization statistic calculation unit 340 outputs the retry information to the input buffer 310, the encoding unit 320, the parameter adjustment unit 370, and the output buffer 330 in order to notify that the quantization statistic exceeds the predetermined threshold value.

The CPB state prediction unit 350 determines whether or not the CPB residual bit rate is larger than or equal to the predetermined threshold value, and if the CPB residual bit rate is larger than or equal to the threshold value, the CPB state prediction unit 350 notifies the retry point management unit 360 of information indicating that the retry point of the next GOP is its first I picture, as retry point change/non-change information. In contrast, if the CPB residual bit rate is smaller than the threshold value, the CPB state prediction unit 350 notifies the retry point management unit 360 of information indicating that the retry point of the first picture of the next GOP is the first picture (an I picture) of a GOP immediately before the next GOP, as the retry point change/non-change information.

If the retry change/non-change information indicates that the retry point of the first picture of the GOP to be now encoded is the first picture of an immediately previous GOP, the retry point management unit 360 notifies the input buffer 310 of the retry point, and if re-encoding does not occur in encoding of the first picture, the retry point management unit 360 notifies the input buffer 310 that the retry point is set to the first picture of the currently encoded GOP from when the next picture is encoded. Further, if the retry change/non-change information indicates that the retry point is the first picture of the GOP to be now encoded, the retry point management unit 360 notifies the input buffer 310 and the output buffer 330 of the retry point. Here, the notification information is referred to as retry point information. As described above, at the time of re-encoding, the input buffer 310 inputs a video signal to the encoding unit 320, from the picture based on the retry point information, and the output buffer 330 outputs only encoded streams determined to be output based on the retry point information.

If the parameter adjustment unit 370 receives the retry information from the quantization statistic calculation unit 340, the parameter adjustment unit 370 inputs the encoding parameter for re-encoding to the encoding unit 320 as described above. As a result, at the time of re-encoding, the encoding unit 320 performs encoding of the same GOP using an encoding parameter with which the generated bit rate decreases.

The flow of an encoding process in the present embodiment will be described with reference to the flowchart of FIG. 16. In the following description, correspondence with the flowchart of FIG. 16 like S301, S302, . . . is recited in sentences.

A process of encoding certain GOPs in which the first GOP is GOP1 and the next GOP is GOP2 will be described with respect to the following four cases separately.

[Case 1]: Encoding of GOP1 has been completed without the re-encoding condition that the quantization statistic exceeds the predetermined threshold value being satisfied in encoding GOP1, and the re-encoding condition has not been satisfied even in encoding the first picture of next GOP2.

[Case 2]: Encoding of GOP1 has been completed, and the re-encoding condition has been satisfied in encoding the first picture of next GOP2, so that re-encoding has been necessary.

[Case 3]: The re-encoding condition has been satisfied in encoding an intermediate picture of GOP2, so that re-encoding has been necessary.

[Case 4]: The re-encoding condition has been satisfied in encoding an intermediate picture of GOP2, and the quantization statistic exceeding the threshold value could not have been avoided even by re-encoding.

[Process Example of Case 1]

First, case 1 in which the quantization statistic has not exceeded the predetermined threshold value in encoding GOP1 (in the case in which the re-encoding condition has not been satisfied) will be described. When a picture of GOP1 is input to the input buffer 310, the input buffer 310 stores the picture and inputs the picture to the encoding unit 320 as an encoding target picture (S301). Then, the encoding unit 320 encodes the picture, outputs an encoded stream to the output buffer 330 (the output buffer 330 does not output the encoded stream but stores the encoded stream), and outputs quantization parameter information about the picture to the quantization statistic calculation unit 340 (S302).

Here, a default encoding parameter is used for encoding, and a filtering process in a pre-filter unit 321 is applied to the encoding target picture with pre-filter strength corresponding to the default encoding parameter. Further, a DCT coefficient generated in the present picture is quantized by a quantization unit 322 using the quantization parameter in accordance with the default encoding parameter.

The quantization statistic calculation unit 340 calculates a quantization statistic for the picture based on the quantization parameter information input from the encoding unit 320. In this example, since the quantization statistic has not exceeded the predetermined threshold value, the quantization statistic calculation unit 340 does not output retry information (S303). If the encoding target picture is the last picture in the input video signal, the output buffer 330 outputs stored encoded streams, and the encoding process is completed (S304).

If the encoding target picture is the first picture in GOP1 (S305), the retry point management unit 360 sets the first picture (an I picture) in GOP1 as a retry point (S306) and then the encoding unit 320 performs encoding of the next picture.

Or else, if the encoding target picture is the last picture of the GOP (S307), in the case in which the encoding parameter for re-encoding has been used in re-encoding, the parameter adjustment unit 370 changes the encoding parameter to the default encoding parameter (S308).

On the other hand, the encoding unit 320 outputs CPB residual bit rate information to the CPB state prediction unit 350, and the CPB state prediction unit 350 determines whether or not the CPB residual bit rate is larger than or equal to the predetermined threshold value (S309). The CPB state prediction unit 350 notifies the retry point management unit 360 of a determination result as the retry point change/non-change information described above. If the retry point change/non-change information indicates that the retry point is not to be changed (the CPB residual bit rate is smaller than the threshold value), the retry point management unit 360 notifies the input buffer 310 of the retry point being the first picture in the GOP1, as the retry point information.

Then, the process proceeds to the encoding process of the first I picture in GOP2 (S302), and if the quantization statistic does not exceed the predetermined threshold value in encoding the I picture (S303), the retry point management unit 360 notifies the input buffer 310 and the output buffer 330 that the retry point is the first picture in GOP2 (S306). In other words, if re-encoding occurs in a subsequent picture in GOP2, re-encoding is performed from the first picture in GOP2.

If the CPB residual bit rate is sufficient at a time when the above-described encoding of GOP1 is completed, the retry point change/non-change information indicating that the retry point is to be changed is output from the CPB state prediction unit 350 to the retry point management unit 360, and the retry point management unit 360 notifies the input buffer 310 that the retry point is the first picture in GOP2, as the retry point information (S310). In this case, even if the quantization statistic exceeds the predetermined threshold value in any picture of GOP2 later, re-encoding is performed from the first picture in GOP2.

[Process Example of Case 2]

Next, case 2 in which the quantization statistic has exceeded the predetermined threshold value in encoding of the first picture in GOP2, but then the quantization statistic exceeding the threshold value could have been avoided by re-encoding will be described. If the retry point change/non-change information at a time when encoding of GOP1 is completed indicates that the retry point is not to be changed due to the CPB residual bit rate being small as in case 1, the retry point management unit 360 notifies the input buffer 310 that the retry point is the first I picture of GOP1.

The process proceeds to the encoding process of the first I picture in GOP2, and if the quantization statistic calculation unit 340 detects that the quantization statistic in the picture exceeds the predetermined threshold value (S303), the input buffer 310 inputs pictures sequentially from the first picture of GOP1 to the encoding unit 320 based on the retry information from the quantization statistic calculation unit 340, and the encoding unit 320 performs re-encoding. In this case, as the encoding parameter, an encoding parameter for re-encoding set from the parameter adjustment unit 370 is used (S313). In this re-encoding, the pre-filtering process by the pre-filter unit 321 is applied to the encoding target picture with the pre-filter strength corresponding to the encoding parameter for re-encoding (the blurring degree is greater than the default encoding parameter). Further, a DCT coefficient generated in the present picture is quantized by the quantization unit 322 with a quantization parameter in accordance with the encoding parameter for re-encoding (the quantization step size is greater than the default encoding parameter).

If encoding up to the last picture of GOP1 is completed by re-encoding of GOP1, the retry point is set to the first picture in the GOP1 or the first picture in GOP2 depending on the CPB residual bit rate at this time, and then a process of encoding the first picture in GOP2 is carried out.

[Process Example of Case 3]

The foregoing Case 2 describes the example in which re-encoding is necessary since the quantization statistic exceeds the predetermined threshold value in encoding of the first picture of GOP2. In contrast, if the quantization statistic in a picture other than the first picture in GOP2 exceeds the predetermined threshold value, re-encoding is similarly performed from the first picture in GOP2 using the encoding parameter for re-encoding.

A conceptual diagram of a change in the encoding parameter when re-encoding is performed on an intermediate picture in GOP2 is as illustrated in FIG. 7. In the example of FIG. 7, since the quantization statistic exceeds the predetermined threshold value in encoding of the sixth picture in GOP2, the encoding parameter for re-encoding to reduce the generated bit rate is set and GOP2 is re-encoded from its first I picture. Since the quantization statistic does not exceed the predetermined threshold value by re-encoding, the encoding parameter for re-encoding is restored to the default encoding parameter in encoding next GOP3, and the encoding process is continued.

A conceptual diagram of a transition of a CPB residual bit rate when re-encoding is performed is as illustrated in FIG. 8. A portion indicated by a bold line is a CPB residual bit rate after re-encoding. In re-encoding, since a blurring degree is strengthened by a pre-filter and a quantization parameter is greater than the default encoding parameter, the generated bit rate is reduced, and the transition of the CPB residual bit rate is that as illustrated, for example, in FIG. 8. As a result, the CPB residual bit rate in a picture for which the re-encoding has occurred increases at the time of the re-encoding, and the occurrence of great deterioration in image quality of the picture can be avoided.

Further, a conceptual diagram of a transition of the quantization statistic when re-encoding is performed is as illustrated in FIG. 9. As illustrated in FIG. 9, the quantization statistics of the pictures for which re-encoding has started increase because an encoding parameter at the time of re-encoding is changed, but this leaves a margin in the CPB residual bit rate as illustrated in FIG. 8, and thus the quantization statistic in a picture for which re-encoding has occurred becomes smaller than that before re-encoding.

[Process Example of Case 4]

Lastly, case 4 in which the quantization statistic has exceeded the predetermined threshold value in encoding an intermediate picture in GOP2, and the quantization statistic exceeding the threshold value could not have been avoided even by re-encoding will be described.

A conceptual diagram of a transition of the quantization statistic when re-encoding has been performed and the quantization statistic exceeding the threshold value could not have been avoided even by re-encoding is as illustrated in FIG. 10. Case 4 may occur, for example, when the quantization statistic is already large at the head of the GOP for which re-encoding starts, as illustrated in FIG. 10. In this case, an operation in which the quantization statistic exceeding the predetermined threshold value is detected by the quantization statistic calculation unit 340 and re-encoding of GOP2 is performed is similar to that in case 3. If the quantization statistic exceeds the predetermined threshold value during re-encoding of GOP2 (S303 and S311), no further re-encoding is performed, and the encoding process is just continued (a transition to S304).

It is to be noted that as the quantization parameter at the time of re-encoding is greater than that at the time of normal encoding, at the time of re-encoding, the quantization statistic may exceed the threshold value in a picture earlier than a picture causing the re-encoding in the order of encoding. In order to reduce the possibility of such exceeding, if the quantization parameter at the time of re-encoding is greater than the threshold value of the quantization statistic, the quantization parameter at the time of re-encoding may be modified to be a value equal to the threshold value of the quantization statistic. However, if the quantization parameter at the time of normal encoding is greater than or equal to the quantization statistic, the value of the quantization parameter at the time of re-encoding is made equal to the value at the time of normal encoding so that the quantization parameter at the time of re-encoding is not smaller than that at the time of normal encoding.

Fifth Embodiment

Figure 19:
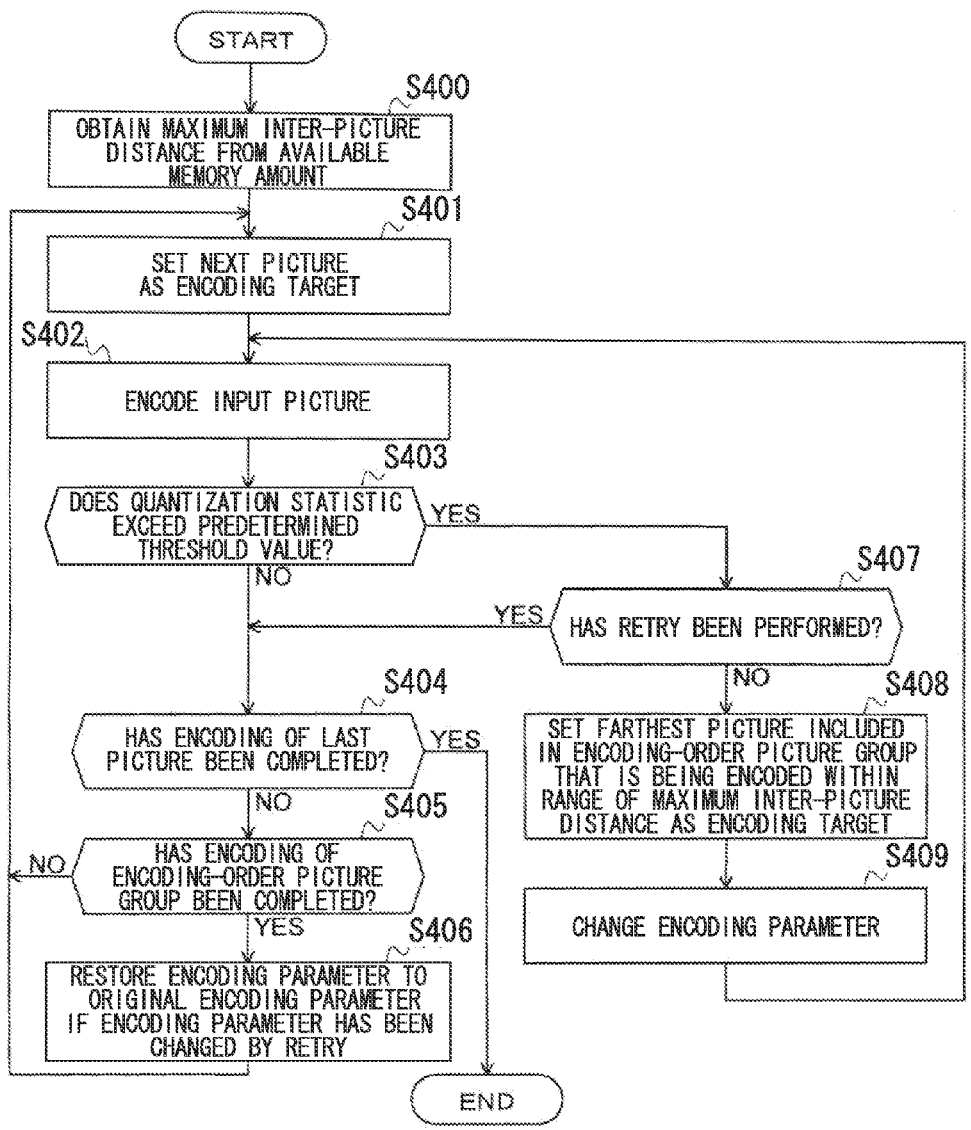
FIG. 19 is a process flowchart illustrating a video encoding control method in accordance with a fifth embodiment of the present invention.

Hereinafter, a fifth embodiment of the present invention will be described in detail with reference to the drawings. FIG. 19 is a process flowchart illustrating a video encoding control method in accordance with the present embodiment.

For an M-th picture and an N-th picture (N>M) in the order of encoding, N-M is referred to as an inter-picture distance. First, the maximum inter-picture distance that is an inter-picture distance that can be traced back to the maximum within a limit of a memory at the time of re-encoding is obtained based on information of an available amount of the memory given from the outside, and it is stored (S400).

Next, a picture next to a picture for which the encoding has ended in an input video signal (the first picture of the input video signal when the encoding starts) is set as an encoding target (step S401). The input picture set as the encoding target is encoded using H.264 or any of other predetermined encoding schemes (step S402). A determination is made as to whether or not a quantization statistic of the input picture when the input picture is encoded exceeds a predetermined threshold value (step S403), and if the quantization statistic exceeds the predetermined threshold value, the process proceeds to step S407.

If the quantization statistic does not exceed the predetermined threshold value, a determination is made as to whether or not encoding of the last picture is completed (step S404). If the encoding of the last picture is completed, the encoding process ends.

Otherwise, a determination is made as to whether or not encoding of an encoding-order picture group is completed (step S405). If the encoding of the encoding-order picture group is not completed, the process returns to step S401, and a similar encoding process continues for the next picture. If the encoding of the encoding-order picture group is completed, if the encoding parameter has been changed by re-encoding of the encoding-order picture group (retry), the encoding parameter is restored to a value at the time of normal encoding (step S406), the process returns to step S401, and the encoding process is performed from the first picture of the next encoding-order picture group.

If it is detected in step S403 that the quantization statistic exceeds the predetermined threshold value, a determination is made as to whether or not the current encoding-order picture group has been re-encoded (the retry has already been performed) (step S407). If the retry has already been performed, no further re-encoding is performed, the process proceeds to step S404, and the encoding process is just continued.

If the retry has not yet been performed, a retry point is set in order to re-encode pictures in the current encoding-order picture group. In other words, the farthest picture included in the encoding-order picture group that is being encoded within the range of the maximum inter-picture distance calculated in step S400 is set as an encoding target (step S408). Then, one or both of two encoding parameters (a quantization parameter and pre-filter strength) are changed (for the quantization parameter, the step size is changed to be greater, and for the filter strength, a blurring degree is changed to be greater) (step S409), the process returns to step S402, and re-encoding is performed from the picture in the encoding-order picture group set as the retry point.

In accordance with the re-encoding process described above, a plurality of pictures in the encoding-order picture group (e.g., a GOP) are twice encoded only if the quantization statistic of the encoded picture is too large, unlike conventional art b in which all frames of an input video are twice encoded. At the time of second encoding, only the plurality of pictures in the encoding-order picture group that is being currently encoded are re-encoded using an encoding parameter with which the CPB residual bit rate further increases. As a result, deterioration in image quality when the video moves from a simple scene to a complex scene can be reduced and a calculation amount can be reduced, as compared to conventional art b in which all pictures of an input video are twice encoded. Further, a memory required as an input buffer and an output buffer may have only the size corresponding to a predetermined number of pictures, so that memory reduction can be achieved.

Figure 20:
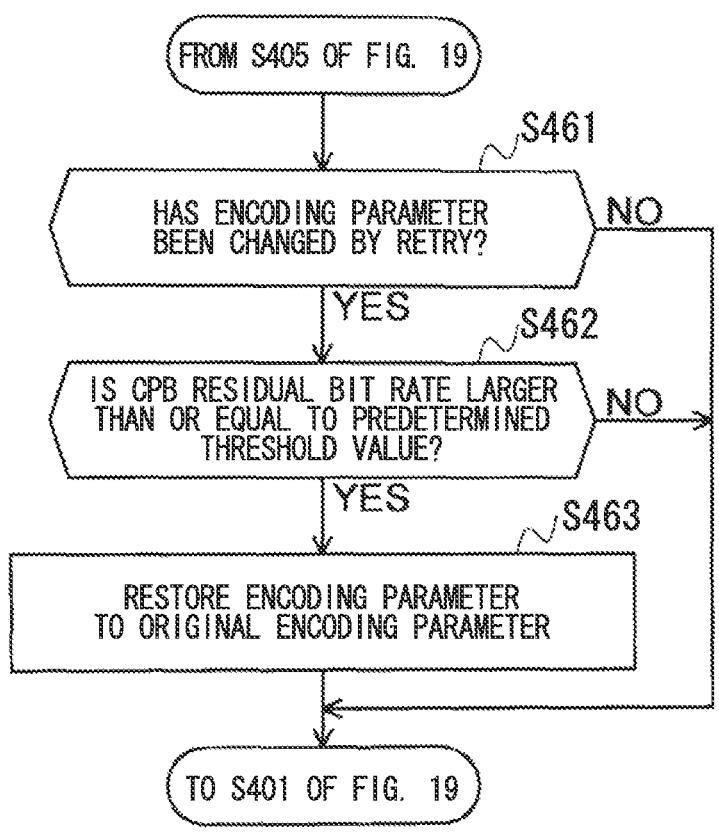
FIG. 20 is a process flowchart of a variant of the video encoding control method in accordance with the fifth embodiment of the present invention.

FIG. 20 is a process flowchart illustrating a video encoding control method in accordance with a variant of the present embodiment. The present embodiment may be implemented by replacing the process of step S406 illustrated in FIG. 19 with a process of steps S461 to S463 illustrated in FIG. 20. Processes other than step S406 are similar to those in FIG. 19.

Following the process of step S405 of FIG. 19, a determination is made as to whether or not the encoding parameter has been changed by retry (step S461). If the encoding parameter has not been changed by the retry, the process returns to step S401 of FIG. 19. If the encoding parameter has been changed by the retry, a determination is made as to whether or not the CPB residual bit rate is larger than or equal to a predetermined threshold value (step S462). If the CPB residual bit rate is smaller than the predetermined threshold value, the encoding parameter is maintained as the encoding parameter used in re-encoding. Only if the CPB residual bit rate is larger than or equal to the predetermined threshold value, the encoding parameter is restored to an original default encoding parameter (step S463). Then, the process returns to step S401 of FIG. 19, and the process proceeds to encoding of the next encoding-order picture group.

In the variant illustrated in FIG. 20, the encoding parameter is restored to the value at the time of normal encoding only if the CPB residual bit rate exceeds a predetermined amount at a time when the encoding of the encoding-order picture group is completed. This is for the following reason. Even if the CPB residual bit rate is small when the encoding of an encoding-order picture group is completed, restoration of the encoding parameter to the value at the time of normal encoding further increases the generated bit rate, and thus the quantization statistic of the encoded picture is highly likely to exceed the predetermined threshold value again in encoding of the next encoding-order picture group. In the process of FIG. 20, if the CPB residual bit rate is small, the encoding parameter is not changed, so that occurrence of the re-encoding is suppressed in encoding of the next encoding-order picture group and a calculation amount is further reduced, as compared to the process of FIG. 19.

As described above, the present embodiment changes the encoding parameter at the time of re-encoding. Here, it is assumed that a pre-filter is applied to the input video at the time of encoding, and the encoding parameters to be changed are a quantization parameter and pre-filter strength. Both of the two encoding parameters may be changed or only any one of them may be changed.

For the quantization parameter, a predetermined offset value is added to the value of a quantization parameter at the time of normal encoding and re-encoding is performed using a greater quantization parameter.

For the pre-filter, it is assumed that a Gaussian filter is used in the present embodiment. The Gaussian filter can be produced by sampling a Gaussian distribution shown in the following equation with respect to x and y.

$$g(x,y) = \{1/(2\pi\sigma^2)\} \times \exp\{-(x^2+y^2)/(2\sigma^2)\}$$

As can be seen from the above equation, a blurring degree increases as the value of σ increases. Since a high frequency component is reduced as the blurring degree increases, the generated bit rate at the time of encoding is reduced. Details of the Gaussian filter are described, for example, in Non-Patent Document 2 described above.

When σ is equal to 0, the Gaussian filter is not applied and for example, a default encoding parameter $\sigma_0 = 0$ and an encoding parameter for re-encoding $\sigma_1 > 0$ are used. It is to be noted that, in the present embodiment, the type of a low pass filter does not matter. Further, how to strengthen the blurring degree at the time of re-encoding may be arbitrarily determined in advance. For example, it is acceptable to employ the structure in which the default encoding parameter $\sigma_0$ is changed depending on the degree of complexity of each picture and $\sigma_1$ is set to the sum of a predetermined offset and $\sigma_0$.

Further, in the present embodiment, it is assumed that the average value of quantization parameters of macro blocks of a picture is used as the quantization statistic.

For encoding, it is assumed that encoding in accordance with the H.264 standard is performed. Further, in the present embodiment, it is assumed that the encoding-order picture group is a GOP. A conceptual diagram of the GOP when encoded is as illustrated in FIG. 5. It is assumed that one GOP includes 10 pictures, and a B picture and a P picture are alternately lined up in a display order, with an I picture being the first picture.

Figure 21:
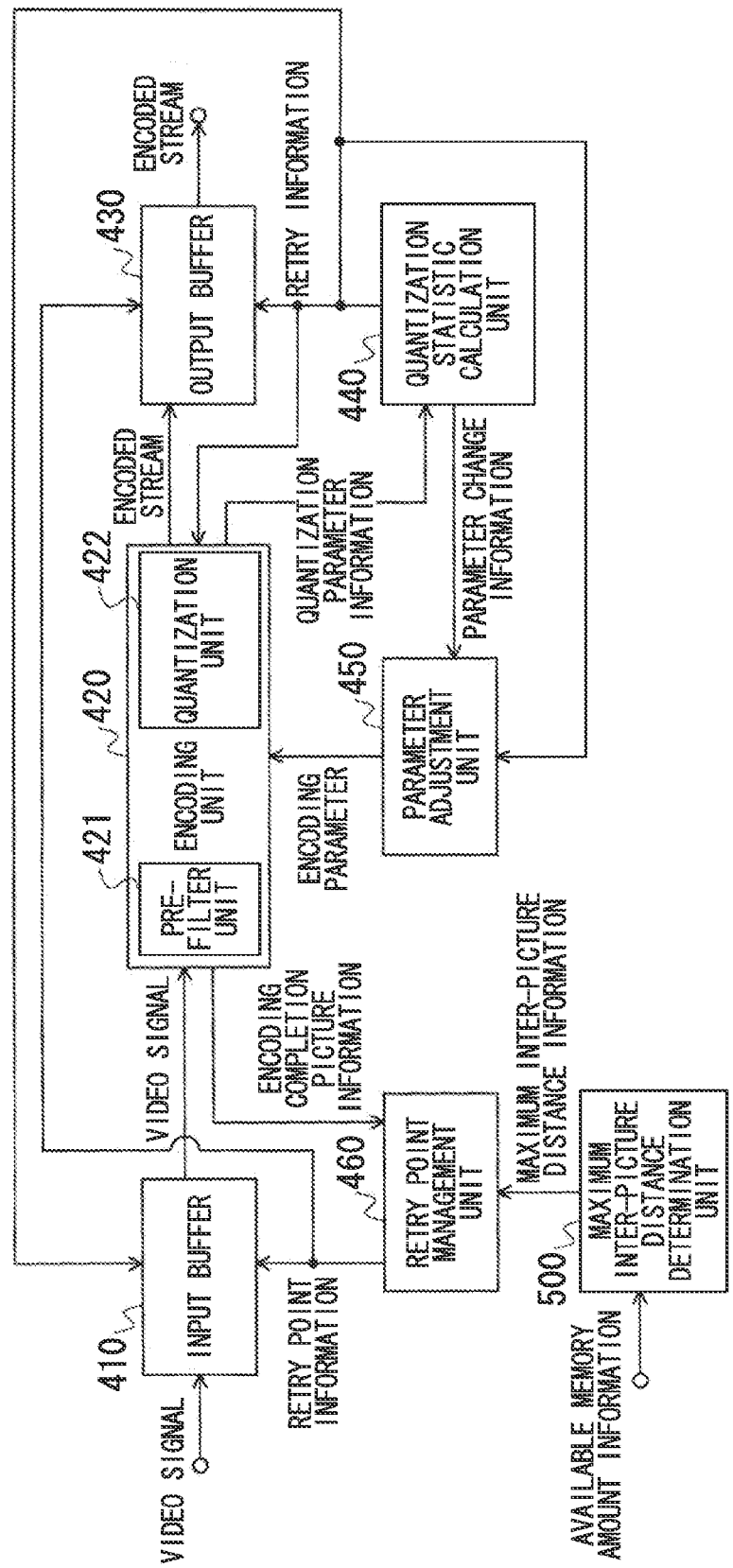
FIG. 21 is a diagram illustrating a configuration example of a video encoding apparatus in accordance with the fifth embodiment of the present invention.

An example of the configuration of the apparatus of the present embodiment is illustrated in FIG. 21. A maximum inter-picture distance determination unit 500 is notified of an available memory amount (available memory amount information) from the outside, and obtains the maximum inter-picture distance that can be traced back to the maximum at the time of re-encoding based thereon. In the present embodiment, an input video signal of the GOP that is being encoded is stored in an input buffer 410 and an encoded stream of the GOP that is being encoded is stored in an output buffer 430 in order to cope with re-encoding. The maximum inter-picture distance determination unit 500 obtains an inter-picture distance in which the total sum of the required memory amount in the worst case of the input buffer 410 and the output buffer 430 and another used memory amount is smaller than or equal to the available memory amount, while decreasing the value of the maximum inter-picture distance from an initial value of the maximum inter-picture distance that is set to the length of a GOP, to thereby determine the maximum inter-picture distance.

Here, an exemplary calculation of the required memory amount for obtaining the maximum inter-picture distance will be described. First, the required memory amount of the input buffer 410 is as follows.

Required memory amount of input buffer=(maximum inter-picture distance+1)×(data amount of one picture)

On the other hand, the required memory amount of the output buffer 430 is the maximum bit rate that can be generated without causing CPB underflow under limitations of the size of the CPB and a bit rate. Specifically, the maximum bit rate that can be generated is obtained when data input to the CPB in accordance with the bit rate has been all used (the CPB residual bit rate is 0 after encoding of the GOP) in a state in which the CPB residual bit rate immediately before encoding of the GOP starts is equal to the size of the CPB. As a calculation equation in terms of the number of bits, the required memory amount of the output buffer is represented as the following equation.

Required memory amount of output buffer=(bit rate/number of pictures per second)×(maximum inter-picture distance+1)+(size of CPB in number of bits)

Further, the data amount of the following data may need to be calculated. In the case of H.264, a decoded picture produced during encoding of a GOP need be kept as a reference picture in order to cope with re-encoding (if it is not kept, there is no reference picture when encoding is performed from a retry point at the time of re-encoding). Since a picture in the GOP does not refer to a picture earlier than the GOP, assuming that I and P pictures are stored in a decoded picture buffer (DPB) as reference pictures, a memory becomes sufficient in all situations by securing the memory as follows.

If re-encoding occurs in the last picture in the GOP, it is sufficient to prepare a memory corresponding to the number of I and P pictures in the encoding-order picture group earlier than a picture from which re-encoding starts (a picture in the maximum inter-picture distance) in the order of encoding.

Figure 22:
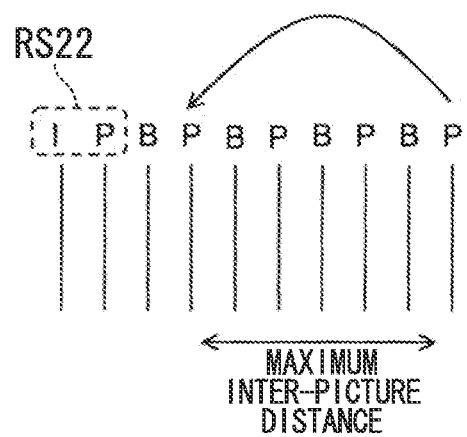
FIG. 22 is a conceptual diagram describing the memory amount required for reference pictures.

FIG. 22 illustrates a conceptual diagram for describing this required memory amount. For example, it is assumed that the GOP includes 10 pictures, and the maximum inter-picture distance is 6, as illustrated in FIG. 22. The number of pictures to be held in the input buffer 410 is a maximum of 7. On the other hand, in the example of FIG. 22, decoded pictures of the first I picture and the next P picture need also be held as reference pictures in the memory, for re-encoding. Compared with a case in which the maximum inter-picture distance is equal to the length of the GOP, a DPB for two pictures (reference symbol RS22 in FIG. 22) of the first I picture and the second P picture need be additionally held in the case as illustrated in FIG. 22, but the number of pictures to be held in the input buffer 410 is reduced by 3. In other words, as the maximum inter-picture distance is smaller, the memory amount for reference pictures increases, but a reduction in the number of pictures to be stored in the input buffer 410 is larger, and thus it can be seen that a small maximum inter-picture distance reduces the required memory amount.

Further, in H.264, a motion vector of a reference picture may be referred to, and thus a memory for the motion vector may be necessary. In addition, the required memory depending on, for example, the configuration of an encoder is calculated. An inter-picture distance in which the total sum of these memories is smaller than or equal to the available memory amount is obtained, to thereby determine the maximum inter-picture distance.

It is to be noted that in implementing the present invention, the maximum inter-picture distance may be calculated in the outside and given to the maximum inter-picture distance determination unit 500, instead of notifying the maximum inter-picture distance determination unit 500 of the available memory amount from the outside and calculating the maximum inter-picture distance.

The maximum inter-picture distance determination unit 500 notifies a retry point management unit 460 of determined maximum inter-picture distance information.

The input buffer 410 stores an input video signal and outputs the video signal as an encoding target to an encoding unit 420. Further, if the input buffer 410 receives information indicating that re-encoding is to be performed (retry information) due to the quantization statistic exceeding the predetermined threshold value, from a quantization statistic calculation unit 440, which will be described below, the input buffer 410 outputs a video signal to the encoding unit 420 from a picture of a retry point notified from the retry point management unit 460 again. Further, if the input buffer 410 is notified of retry point information from the retry point management unit 460, the input buffer 410 discards data of a video signal corresponding to stored pictures before the retry point.

The encoding unit 420 encodes the video signal input from the input buffer 410, and outputs an encoded stream to the output buffer 430. Further, when encoding of the picture is completed, the encoding unit 420 outputs a quantization parameter (quantization parameter information) generated when the input video signal is encoded, to the quantization statistic calculation unit 440, and outputs information indicating that picture encoding is completed (encoding completion picture information) to the retry point management unit 460. Further, if the encoding unit 420 receives the retry information from the quantization statistic calculation unit 440, the video signal from the picture of the retry point in the GOP that is being encoded is input from the input buffer 410 again, and an encoding parameter for re-encoding is input from a parameter adjustment unit 450, and thus the encoding unit 420 performs re-encoding using the input encoding parameter for re-encoding.

The output buffer 430 stores an encoded stream that is an encoding result of the GOP, and if the output buffer 430 is notified of the retry point information from the retry point management unit 460, the output buffer 430 outputs stored encoded streams corresponding to the pictures before the retry point, the data is removed from the output buffer 430. Further, if the retry information is received from the quantization statistic calculation unit 440, the stored encoded streams of the GOP that is being encoded are discarded.

The quantization statistic calculation unit 440 obtains a quantization statistic which changes in units of pictures using the quantization parameter information input from the encoding unit 420. Then, if the quantization statistic exceeds the predetermined threshold value, the quantization statistic calculation unit 440 outputs the retry information to the input buffer 410, the encoding unit 420, the parameter adjustment unit 450, and the output buffer 430 in order to notify that the quantization statistic exceeds the predetermined threshold value.

If the parameter adjustment unit 450 receives the retry information from the quantization statistic calculation unit 440, the parameter adjustment unit 450 inputs the encoding parameter for re-encoding to the encoding unit 420 as described above. As a result, at the time of re-encoding, the encoding unit 420 performs encoding of the same GOP using the encoding parameter with which the generated bit rate decreases.

The retry point management unit 460 notifies the input buffer 410 and the output buffer 430 of the retry point information indicating which picture is a retry point when the quantization statistic exceeds the predetermined threshold value in the encoding of the next picture based on the encoding completion picture information and the maximum inter-picture distance information.

The flow of an encoding process in the present embodiment will be described with reference to the flowchart of FIG. 19.

In the following description, correspondence with the flowchart of FIG. 19 like S401, S402, . . . is recited in sentences.

A process of encoding a certain GOP will be described with respect to the following three cases separately.
  [Case 1]: The quantization statistic has not exceeded a predetermined threshold value in encoding of the GOP.
  [Case 2]: The quantization statistic has exceeded the predetermined threshold value in encoding of the GOP, but the quantization statistic exceeding the threshold value could have been avoided by re-encoding.
  [Case 3]: The quantization statistic has exceeded the predetermined threshold value in encoding of the GOP, and the quantization statistic exceeding the threshold value could not have been avoided even by re-encoding.

[Process Example of Case 1]

First, case 1 in which the quantization statistic has not exceeded a predetermined threshold value in encoding of the GOP will be described. When a picture of the GOP is input to the input buffer 410, the input buffer 410 stores the picture and inputs the picture to the encoding unit 420 as an encoding target picture (S401). Then, the encoding unit 420 encodes the picture, outputs an encoded stream to the output buffer 430 (the output buffer 430 does not output the encoded stream but stores the encoded stream), and outputs quantization parameter information about the picture to the quantization statistic calculation unit 440. Further, the encoding unit 420 outputs encoding completion picture information to the retry point management unit 460 (S402).

Here, a default encoding parameter is used for encoding, and a filtering process in a pre-filter unit 421 is applied to the encoding target picture with pre-filter strength corresponding to the default encoding parameter. Further, a DCT coefficient generated in the present picture is quantized by a quantization unit 422 using the quantization parameter in accordance with the default encoding parameter.

The quantization statistic calculation unit 440 calculates a quantization statistic for the picture based on the quantization parameter information input from the encoding unit 420. In this example, since the quantization statistic has not exceeded the predetermined threshold value, the quantization statistic calculation unit 440 does not output retry information (S403). If the encoding target picture is the last picture in the input video signal, the output buffer 430 outputs stored encoded streams, and the encoding process is completed (S404). On the other hand, if the encoding target picture is the last picture of the GOP, the output buffer 430 outputs the stored encoded streams, the input buffer 410 discards the stored pictures, and the process proceeds to the encoding process of the first picture in the next GOP (S405). Here, since re-encoding has not occurred in the GOP, the encoding parameter is not changed and the process proceeds to the encoding process of the first picture in the next GOP (S406).

[Process Example of Case 2]

Next, case 2 in which the quantization statistic has exceeded the predetermined threshold value in encoding of the GOP, but the quantization statistic exceeding the threshold value could have been avoided by re-encoding will be described. When a picture of the GOP is input to the input buffer 410, the input buffer 410 stores the picture and inputs the picture to the encoding unit 420 as an encoding target picture (S401). Then, the encoding unit 420 encodes the picture, outputs an encoded stream to the output buffer 430 (the output buffer 430 does not output the encoded stream but stores the encoded stream), and outputs quantization parameter information about the picture to the quantization statistic calculation unit 440 (S402). Here, a default encoding parameter is used in the encoding.

The quantization statistic calculation unit 440 calculates a quantization statistic for the picture based on the quantization parameter information input from the encoding unit 420. As a result, if the quantization statistic calculation unit 440 detects that the quantization statistic for the picture exceeds the predetermined threshold value, the quantization statistic calculation unit 440 outputs the retry information to the encoding unit 420, the parameter adjustment unit 450, the input buffer 410, and the output buffer 430 (S403).

If the retry has not yet occurred for the GOP that is being encoded (S407), the input buffer 410 outputs the picture of the stored GOP that is being encoded in a position indicated by the retry point, to the encoding unit 420 (S408), and the parameter adjustment unit 450 outputs an encoding parameter for re-encoding to the encoding unit 420 (S409). Further, the output buffer 430 discards encoded streams of the GOP that is being encoded. Then, the encoding unit 420 encodes pictures from the input retry point using the encoding parameter for re-encoding.

Here, the encoding parameter for re-encoding is used in the encoding, and a pre-filtering process in the pre-filter unit 421 is applied to the encoding target picture with pre-filter strength corresponding to the encoding parameter for re-encoding (a blurring degree is greater than the default encoding parameter). Further, a DCT coefficient generated in the present picture is quantized by the quantization unit 422 using the quantization parameter in accordance with the encoding parameter for re-encoding (the quantization step size is greater than the default encoding parameter).

Then, as long as the quantization statistic does not exceed the predetermined threshold value, the pictures of the GOP are sequentially input from the input buffer 410 to the encoding unit 420 and the encoding process is performed by the encoding unit 420. Then, when encoding of the last picture of the GOP is completed (S405), encoded streams of the GOP are output from the output buffer 430, the encoding unit 420 sets the encoding parameter to the default encoding parameter (S406), and the process proceeds to the encoding process of the next GOP. It is to be noted that an operation when encoding of the last picture of the input video is completed is performed similar to that in case 1 described above.

A conceptual diagram of a change in the encoding parameter when re-encoding has been performed is illustrated in FIG. 7. In the example of FIG. 7, since the quantization statistic exceeds the predetermined threshold value in encoding the sixth picture of the second GOP2, the encoding parameter for re-encoding to reduce the generated bit rate is set and GOP2 is re-encoded from its first I picture within a range of the maximum inter-picture distance. Since the quantization statistic does not exceed the predetermined threshold value by the re-encoding, the encoding parameter for re-encoding is restored to the default encoding parameter in encoding next GOP3, and the encoding process is continued.

A conceptual diagram of a transition of the CPB residual bit rate when the re-encoding is performed is illustrated in FIG. 8. A portion indicated by a bold line is a CPB residual bit rate after re-encoding. In re-encoding, since a blurring degree is strengthened by a pre-filter and a quantization parameter is greater than the default encoding parameter, the generated bit rate is reduced and the transition of the CPB residual bit rate is that as illustrated, for example, in FIG. 8. As a result, the CPB residual bit rate in a picture for which the re-encoding has occurred increases at the time of the re-encoding, and the occurrence of great deterioration in image quality of the picture can be avoided.

A conceptual diagram of a transition of the quantization statistic when re-encoding is performed is as illustrated in FIG. 9. As illustrated in FIG. 9, the quantization statistics of the pictures for which re-encoding has started increase because the encoding parameter at the time of re-encoding is changed, but this leaves a margin in the CPB residual bit rate as illustrated in FIG. 8, and thus the quantization statistic in the picture for which re-encoding has occurred becomes smaller than that before re-encoding.

Figure 23:
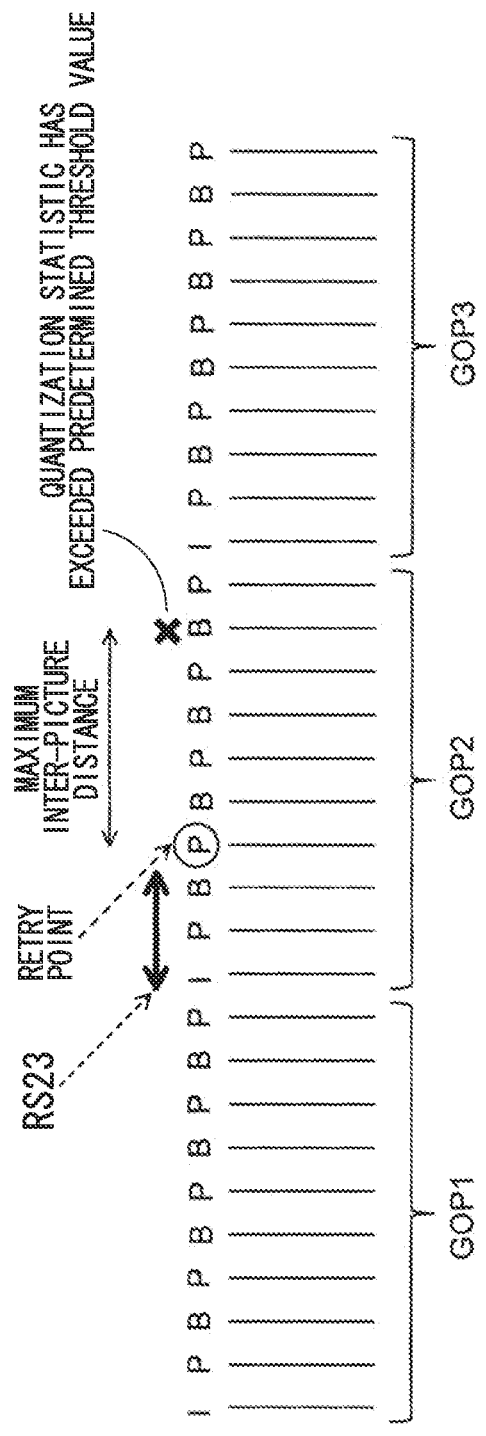
FIG. 23 is a diagram illustrating memory reduction of an input buffer and an output buffer through limitation of a retry point to the maximum inter-picture distance.

FIG. 23 is a diagram describing a memory reduction of the input buffer and the output buffer through limitation of a retry point to the maximum inter-picture distance. A case in which the retry point is set in accordance with the present embodiment will be described as "case A". For example, it is also conceivable that a picture from which re-encoding starts when the quantization statistic exceeds the predetermined threshold value is always set to the first picture of the encoding-order picture group (e.g., a GOP), unlike the present embodiment. This is referred to as "case B". Comparing case A with case B, for example, in case A, when the currently encoded picture is the ninth B picture of GOP2 and the maximum inter-picture distance is "5" as illustrated in FIG. 23, the retry point is the fourth picture (a P picture) of the GOP2, and the first to third pictures of the GOP2 earlier than the retry point are not used for re-encoding. For this reason, data in the input buffer 410 and the output buffer 430 corresponding to these pictures need not be held and may be discarded (reference symbol RS23 in FIG. 23). In contrast, in a case such as case B, from the start of encoding of the first picture in GOP2 to the completion of encoding of the last picture in GOP2, it is necessary for data corresponding to these pictures in GOP2 to be held in the input buffer 410 and the output buffer 430, and thus the required memory amount increases. In the present embodiment (case A), since the maximum inter-picture distance is calculated and the retry point is set, it is possible to reduce the memory amount, as compared to case B.

[Process Example of Case 3]

Lastly, case 3 in which the quantization statistic has exceeded the predetermined threshold value in encoding of the GOP and the quantization statistic exceeding the threshold value could not have been avoided even by re-encoding will be described.

A conceptual diagram of a transition of the quantization statistic when re-encoding has been performed and the quantization statistic exceeding the threshold value could not have been avoided even by re-encoding is as illustrated in FIG. 10. Case 3 may occur, for example, when the quantization statistic is already large at the head of the GOP from which the re-encoding starts, as illustrated in FIG. 10. In this case, an operation in which the quantization statistic calculation unit 440 detects that the quantization statistic exceeds the predetermined threshold value and re-encoding of the GOP is performed is similar to that in case 2. If the quantization statistic exceeds the predetermined threshold value during re-encoding of the GOP (S403 and S407), no further re-encoding is performed, and the encoding process is just continued (the process proceeds to S404).

It is to be noted that as the quantization parameter at the time of re-encoding is greater than that at the time of normal encoding, at the time of re-encoding, the quantization statistic may exceed the threshold value in a picture earlier than a picture causing the re-encoding in the order of encoding. In order to reduce the possibility of such exceeding, if the quantization parameter at the time of re-encoding is greater than the threshold value of the quantization statistic, the quantization parameter at the time of re-encoding may be modified to be a value equal to the threshold value of the quantization statistic. However, if the quantization parameter at the time of normal encoding is greater than or equal to the quantization statistic, the value of the quantization parameter at the time of re-encoding is made equal to the value at the time of normal encoding so that the quantization parameter at the time of re-encoding is not smaller than that at the time of normal encoding.

The process of the video encoding control described above can be realized by a computer and a software program, and the program may be recorded in a computer-readable recording medium or may be provided via a network.

While the embodiments of the present invention have been described in detail with reference to the drawings, a specific configuration is not limited to these embodiments and, for example, designs (addition, omission, substitution, and other changes) without departing from the gist of the present invention are also included. The present invention is not limited to the above description and is limited by only the appended claims.

INDUSTRIAL APPLICABILITY

The present invention may be used, for example, for video encoding technology for encoding a video signal. In accordance with the present invention, the video signal can be encoded so that a hypothetical buffer, such as a coded picture buffer in a hypothetical decoder, does not fail and deterioration in image quality does not increase.

DESCRIPTION OF REFERENCE SYMBOLS 10 input buffer
20 encoding unit
21 pre-filter unit
22 quantization unit
30 output buffer
40 quantization statistic calculation unit
50 parameter adjustment unit
110 input buffer
120 encoding unit
121 pre-filter unit
122 quantization unit
130 output buffer
140 quantization statistic calculation unit
150 retry count management unit
160 parameter adjustment unit
210 input buffer
220 encoding unit
221 pre-filter unit
222 quantization unit
230 output buffer
240 quantization statistic calculation unit
250 retry count management unit
260 CPB state prediction unit
270 parameter adjustment unit
310 input buffer
320 encoding unit
321 pre-filter unit
322 quantization unit
330 output buffer
340 quantization statistic calculation unit
350 CPB state prediction unit
360 retry point management unit
370 parameter adjustment unit
410 input buffer
420 encoding unit
421 pre-filter unit
422 quantization unit
430 output buffer
440 quantization statistic calculation unit
450 parameter adjustment unit
460 retry point management unit
500 maximum inter-picture distance determination unit

The invention claimed is:

1. A video encoding control method which encodes an input video signal by controlling a generated bit rate so that a hypothetical buffer in a decoder does not overflow or underflow, the method comprising utilizing a processor and a memory device storing instructions causing the processor to execute the following operations:
sequentially encoding each picture in an encoding-order picture group in accordance with a predetermined encoding parameter, the encoding-order picture group including a predetermined number of pictures and being a collection of successive pictures in the order of encoding;
calculating a quantization statistic of each picture based on quantization parameter information used to encode each picture each time each picture is encoded, and checking whether the quantization statistic exceeds a predetermined threshold value; and
if the quantization statistic exceeds the predetermined threshold value, changing the encoding parameter so that the generated bit rate resulting from encoding is reduced and performing re-encoding from a first picture of an encoding-order picture group that is being encoded using the changed encoding parameter,
wherein when sequentially encoding, each picture in the encoding-order picture group is sequentially encoded in accordance with an encoding parameter set depending on a retry count indicating the number of times of the re-encoding, and
when performing the re-encoding, the retry count is incremented if the quantization statistic exceeds the predetermined threshold value and the encoding parameter is changed to an encoding parameter with which the generated bit rate resulting from encoding is reduced as the value of the retry count increases.

2. The video encoding control method according to claim 1, comprising checking a residual bit rate of the hypothetical buffer if the quantization statistic of each encoded picture does not exceed the predetermined threshold value until encoding of a last picture in the encoding-order picture group is completed, not changing the value of the retry count if the residual bit rate is smaller than a predetermined residual bit rate threshold value or the retry count is 0, and decrementing the retry count if the residual bit rate is larger than or equal to the residual bit rate threshold value and the retry count is not 0.

3. The video encoding control method according to claim 1, comprising decrementing the retry count if the quantization statistic of each encoded picture does not exceed the predetermined threshold value until encoding of a last picture in the encoding-order picture group is completed.

4. The video encoding control method according to claim 1, wherein
the encoding parameter is a quantization parameter, filter strength of a pre-filter for the input video signal, or both of the quantization parameter and the filter strength,
when the encoding parameter is the quantization parameter, an encoding parameter in which a step size of the quantization parameter increases as the value of the retry count increases is set, and when the encoding parameter is the filter strength of the pre-filter, an encoding parameter in which a blurring degree by a filtering process increases as the value of the retry count increases is set.

5. A video encoding control method which encodes an input video signal by controlling a generated bit rate so that a hypothetical buffer in a decoder does not overflow or underflow, the method comprising:

sequentially encoding each picture in an encoding-order picture group in accordance with a predetermined encoding parameter, the encoding-order picture group including a predetermined number of pictures, with a first picture being an intra-predictive encoded picture, and being a collection of successive pictures in the order of encoding;

calculating a quantization statistic of each picture based on quantization parameter information used to encode each picture each time each picture is encoded, and checking whether the quantization statistic exceeds a predetermined threshold value;

if the quantization statistic exceeds the predetermined threshold value, changing the encoding parameter so that the generated bit rate resulting from encoding is reduced, and performing re-encoding from a first picture of the encoding-order picture group set as a retry point using the changed encoding parameter; and when encoding of the encoding-order picture group is completed, checking a residual bit rate of the hypothetical buffer, setting the retry point to a first picture in a next encoding-order picture group if the residual bit rate is larger than or equal to a predetermined residual bit rate threshold value, not changing the retry point if the residual bit rate of the hypothetical buffer is smaller than the predetermined residual bit rate threshold value, and setting the retry point to the first picture in the next encoding-order picture group if the quantization statistic does not exceed the predetermined threshold value in encoding of the first picture in the next encoding-order picture group.

6. A video encoding control method which encodes an input video signal by controlling a generated bit rate so that a hypothetical buffer in a decoder does not overflow or underflow, the method comprising:

sequentially encoding each picture in an encoding-order picture group in accordance with a predetermined encoding parameter, the encoding-order picture group including a predetermined number of pictures and being a collection of successive pictures in the order of encoding;

calculating a quantization statistic of each picture based on quantization parameter information used to encode each picture each time each picture is encoded, and checking whether the quantization statistic exceeds a predetermined threshold value;

if the quantization statistic exceeds the predetermined threshold value, changing the encoding parameter so that the generated bit rate resulting from encoding is reduced, performing re-encoding from a picture in an encoding-order picture group that is being encoded set as a retry point using the changed encoding parameter; and setting the retry point so as to indicate a position of the picture from which the re-encoding starts based on a maximum inter-picture distance that is the number of maximum pictures capable of being traced back as re-encoding target pictures at the time of the re-encoding.

7. The video encoding control method according to claim 5, wherein if the quantization statistic of each encoded picture does not exceed the predetermined threshold value until encoding of a last picture in the encoding-order picture group is completed in the re-encoding of the encoding-order picture group, an encoding parameter used to encode a next encoding-order picture group is restored to the value of an encoding parameter at the time of normal encoding.

8. The video encoding control method according to claim 6, wherein if the quantization statistic of each encoded picture does not exceed the predetermined threshold value until encoding of a last picture in the encoding-order picture group is completed in the re-encoding of the encoding-order picture group, an encoding parameter used to encode a next encoding-order picture group is restored to the value of an encoding parameter at the time of normal encoding.

9. The video encoding control method according to claim 5, wherein
if the quantization statistic does not exceed the predetermined threshold value until encoding of a last picture in the encoding-order picture group is completed in the re-encoding of the encoding-order picture group, a residual bit rate of the hypothetical buffer is checked,
an encoding parameter used to encode a next encoding-order picture group is not changed if the residual bit rate is smaller than a predetermined residual bit rate threshold value, and
the encoding parameter is restored to the value of an encoding parameter at the time of normal encoding if the residual bit rate is larger than or equal to the predetermined residual bit rate threshold value.

10. The video encoding control method according to claim 6, wherein
if the quantization statistic does not exceed the predetermined threshold value until encoding of a last picture in the encoding-order picture group is completed in the re-encoding of the encoding-order picture group, a residual bit rate of the hypothetical buffer is checked,
an encoding parameter used to encode a next encoding-order picture group is not changed if the residual bit rate is smaller than a predetermined residual bit rate threshold value, and
the encoding parameter is restored to the value of an encoding parameter at the time of normal encoding if the residual bit rate is larger than or equal to the predetermined residual bit rate threshold value.

11. The video encoding control method according to claim 5, wherein
the encoding parameter is a quantization parameter, filter strength of a pre-filter for the input video signal, or both of the quantization parameter and the filter strength, and
the encoding parameter is changed to increase a step size of the quantization parameter at the time of the re-encoding when the encoding parameter is the quantization parameter and to increase a blurring degree by a filtering process when the encoding parameter is the filter strength of the pre-filter, at the time of the re-encoding of the encoding-order picture group.

12. The video encoding control method according to claim 6, wherein
the encoding parameter is a quantization parameter, filter strength of a pre-filter for the input video signal, or both of the quantization parameter and the filter strength, and
the encoding parameter is changed to increase a step size of the quantization parameter at the time of the re-encoding when the encoding parameter is the quantization parameter and to increase a blurring degree by a filtering process when the encoding parameter is the filter strength of the pre-filter, at the time of the re-encoding of the encoding-order picture group.

13. A video encoder which encodes an input video signal by controlling a generated bit rate so that a hypothetical buffer in a decoder does not overflow or underflow, comprising:
an encoding circuit which sequentially encodes each picture of an encoding-order picture group in accordance with a predetermined encoding parameter, the encoding-order picture group including a predetermined number of pictures and being a collection of successive pictures in the order of encoding;
a quantization statistic calculation circuit which calculates a quantization statistic of each picture based on quantization parameter information used to encode each picture each time each picture is encoded, checks whether the quantization statistic exceeds a predetermined threshold value, and outputs retry information if detecting that the quantization statistic exceeds the predetermined threshold value; and
a parameter adjustment circuit which, if the retry information is output, changes the encoding parameter so that the generated bit rate resulting from encoding is reduced and notifies the encoding circuit of the changed encoding parameter,
wherein if the retry information is output, the encoding circuit re-encodes the input video signal from a first picture in an encoding-order picture group that is being encoded, using the encoding parameter changed by the parameter adjustment circuit,
wherein the encoding circuit sequentially encodes each picture of the encoding-order picture group in accordance with an encoding parameter set depending on a retry count indicating the number of times of re-encoding,
the video encoder includes a retry count management circuit which increments the retry count if the retry information is output and decrements the retry count if the retry information is not output until encoding of a last picture in the encoding-order picture group is completed, and
the parameter adjustment circuit sets an encoding parameter with which the generated bit rate resulting from encoding is reduced as the value of the retry count increases, and notifies the encoding circuit of the set encoding parameter, the encoding parameter being determined depending on the retry count.

14. The video encoder according to claim 13, comprising a buffer state prediction circuit which outputs parameter change/non-change information indicating that a parameter change is required or a parameter change is not required depending on whether a residual bit rate of the hypothetical buffer is larger than or equal to a predetermined residual bit rate threshold value, if encoding is completed without the quantization statistic not exceeding the predetermined threshold value until the last picture in the encoding-order picture group is encoded,
wherein when the retry count management circuit receives the parameter change/non-change information from the buffer state prediction circuit, the retry count management circuit does not change the value of the retry count if the parameter change/non-change information indicates that the parameter change is not required or the retry count is 0, and decrements the retry count if the parameter change/non-change information indicates that the parameter change is required and the retry count is not 0.

15. A video encoder which encodes an input video signal by controlling a generated bit rate so that a hypothetical buffer in a decoder does not overflow or underflow, comprising:
an encoding circuit which sequentially encodes each picture in an encoding-order picture group in accordance with a predetermined encoding parameter, the encoding-order picture group including a predetermined number of pictures and being a collection of successive pictures in the order of encoding;
a quantization statistic calculation circuit which calculates a quantization statistic of each picture based on quantization parameter information used to encode each picture each time each picture is encoded, checks whether the quantization statistic exceeds a predetermined threshold value, and outputs retry information if detecting that the quantization statistic exceeds the predetermined threshold value;
a parameter adjustment circuit which, if the retry information is output, changes the encoding parameter so that the generated bit rate resulting from encoding is reduced, and notifies the encoding circuit of the changed encoding parameter;
a buffer state prediction circuit which checks a residual bit rate of the hypothetical buffer when encoding of the encoding-order picture group is completed and determines whether the residual bit rate is larger than or equal to a predetermined residual bit rate threshold value; and
a retry point management circuit which, in accordance with a determination result of the buffer state prediction circuit, sets a retry point to a first picture in a next encoding-order picture group if the residual bit rate of the hypothetical buffer is larger than or equal to the predetermined residual bit rate threshold value, does not change the retry point if the residual bit rate of the hypothetical buffer is smaller than the predetermined residual bit rate threshold value, and sets the retry point to the first picture in the next encoding-order picture group if the quantization statistic does not exceed the predetermined threshold value in encoding of the first picture in the next encoding-order picture group,
wherein if the retry information is output, the encoding circuit re-encodes the input video signal from the first picture in the encoding-order picture group set as the retry point using the encoding parameter changed by the parameter adjustment circuit.

16. A video encoder which encodes an input video signal by controlling a generated bit rate so that a hypothetical buffer in a decoder does overflow or underflow, comprising:
an encoding circuit which sequentially encode each picture in an encoding-order picture group in accordance with a predetermined encoding parameter, the encoding-order picture group including a predetermined number of pictures and being a collection of successive pictures in the order of encoding;
a quantization statistic calculation circuit which calculates a quantization statistic of each picture based on quantization parameter information used to encode each picture each time each picture is encoded, checks whether the quantization statistic exceeds a predetermined threshold value, and outputs retry information if detecting that the quantization statistic exceeds the predetermined threshold value;
a parameter adjustment circuit which, if the retry information is output, changes the encoding parameter so that the generated bit rate resulting from encoding is reduced, and notifies the encoding circuit of the changed encoding parameter; and a retry point management circuit which sets a retry point indicating a position of a picture from which re-encoding starts based on a maximum inter-picture distance that is the number of maximum pictures capable of being traced back as re-encoding target pictures at the time of the re-encoding, wherein if the retry information is output, the encoding circuit re-encodes the input video signal from the picture set as the retry point in an encoding-order picture group that is being encoded using the encoding parameter changed by the parameter adjustment circuit.

17. A non-transitory computer-readable recording medium which stores a video encoding program for causing a computer to execute a video encoding control method comprising:

sequentially encoding each picture in an encoding-order picture group in accordance with a predetermined encoding parameter, the encoding-order picture group including a predetermined number of pictures and being a collection of successive pictures in the order of encoding;

calculating a quantization statistic of each picture based on quantization parameter information used to encode each picture each time each picture is encoded, and checking whether the quantization statistic exceeds a predetermined threshold value; and if the quantization statistic exceeds the predetermined threshold value, changing the encoding parameter so that a generated bit rate resulting from encoding is reduced and performing re-encoding from a first picture of an encoding-order picture group that is being encoded using the changed encoding parameter, wherein when sequentially encoding, each picture in the encoding-order picture group is sequentially encoded in accordance with an encoding parameter set depending on a retry count indicating the number of times of the re-encoding, and when performing the re-encoding, the retry count is incremented if the quantization statistic exceeds the predetermined threshold value and the encoding parameter is changed to an encoding parameter with which the generated bit rate resulting from encoding is reduced as the value of the retry count increases.

18. A non-transitory computer-readable recording medium which stores a video encoding program for causing a computer to execute a video encoding control method comprising:

sequentially encoding each picture in an encoding-order picture group in accordance with a predetermined encoding parameter, the encoding-order picture group including a predetermined number of pictures, with a first picture being an intra-predictive encoded picture, and being a collection of successive pictures in the order of encoding;

calculating a quantization statistic of each picture based on quantization parameter information used to encode each picture each time each picture is encoded, and checking whether the quantization statistic exceeds a predetermined threshold value;

if the quantization statistic exceeds the predetermined threshold value, changing the encoding parameter so that a generated bit rate resulting from encoding is reduced, and performing re-encoding from a first picture of the encoding-order picture group set as a retry point using the changed encoding parameter; and when encoding of the encoding-order picture group is completed, checking a residual bit rate of the hypothetical buffer, setting the retry point to a first picture in a next encoding-order picture group if the residual bit rate is larger than or equal to a predetermined residual bit rate threshold value, not changing the retry point if the residual bit rate of the hypothetical buffer is smaller than the predetermined residual bit rate threshold value, and setting the retry point to the first picture in the next encoding-order picture group if the quantization statistic does not exceed the predetermined threshold value in encoding of the first picture in the next encoding-order picture group.

19. A non-transitory computer-readable recording medium which stores a video encoding program for causing a computer to execute a video encoding control method comprising:

sequentially encoding each picture in an encoding-order picture group in accordance with a predetermined encoding parameter, the encoding-order picture group including a predetermined number of pictures and being a collection of successive pictures in the order of encoding;

calculating a quantization statistic of each picture based on quantization parameter information used to encode each picture each time each picture is encoded, and checking whether the quantization statistic exceeds a predetermined threshold value;

if the quantization statistic exceeds the predetermined threshold value, changing the encoding parameter so that a generated bit rate resulting from encoding is reduced, performing re-encoding from a picture in an encoding-order picture group that is being encoded set as a retry point using the changed encoding parameter; and setting the retry point so as to indicate a position of the picture from which the re-encoding starts based on a maximum inter-picture distance that is the number of maximum pictures capable of being traced back as re-encoding target pictures at the time of the re-encoding.

* * * * *